Sept. 2, 1952 M. J. FIRST 2,609,241
BRUSHMAKING MACHINE
Filed May 15, 1950 30 Sheets-Sheet 1

INVENTOR
MELVIN J. FIRST
BY
*Pennie, Edmonds, Morton and Barrows*
HIS ATTORNEYS

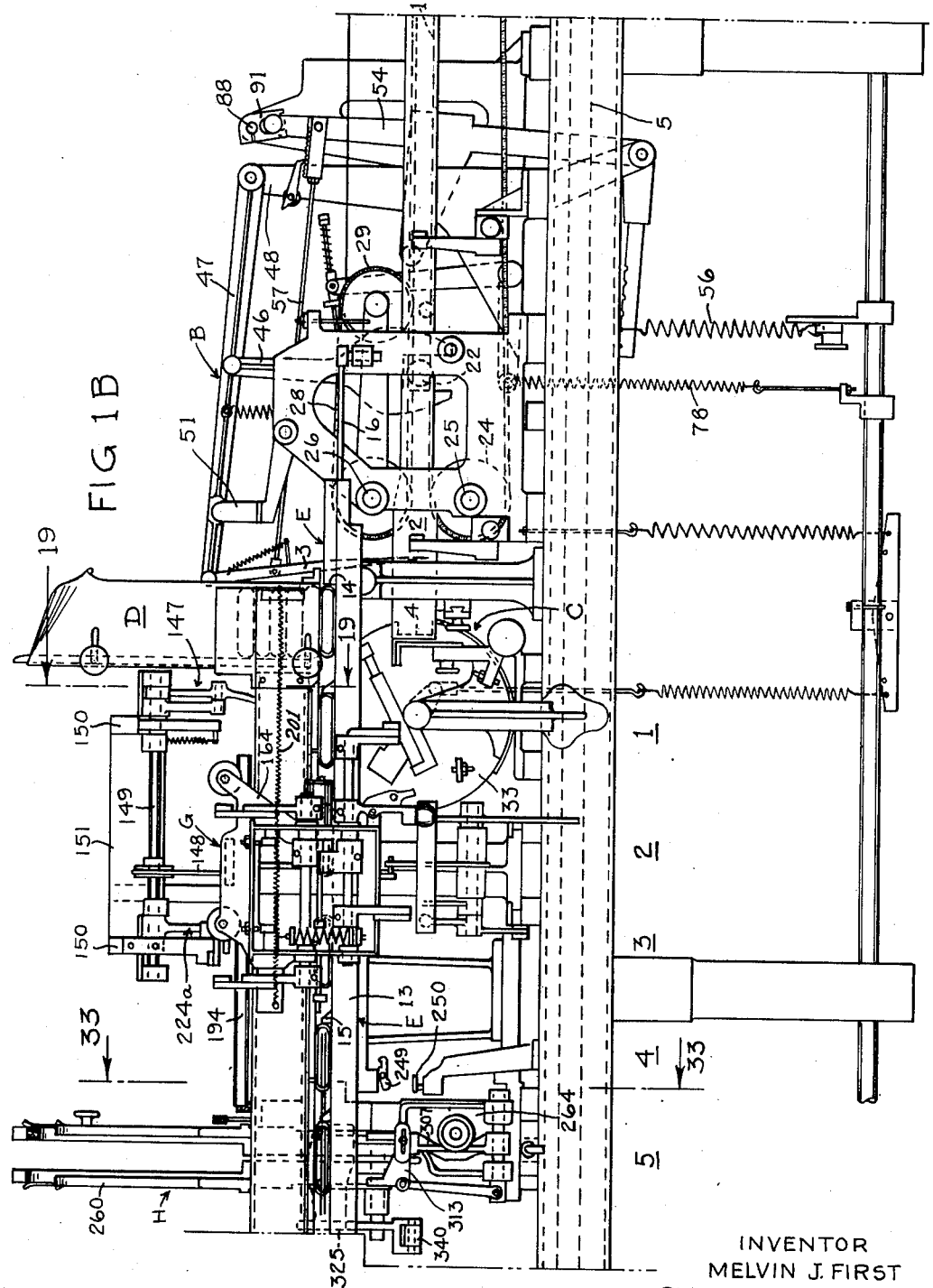

Sept. 2, 1952  M. J. FIRST  2,609,241
BRUSHMAKING MACHINE
Filed May 15, 1950  30 Sheets-Sheet 3
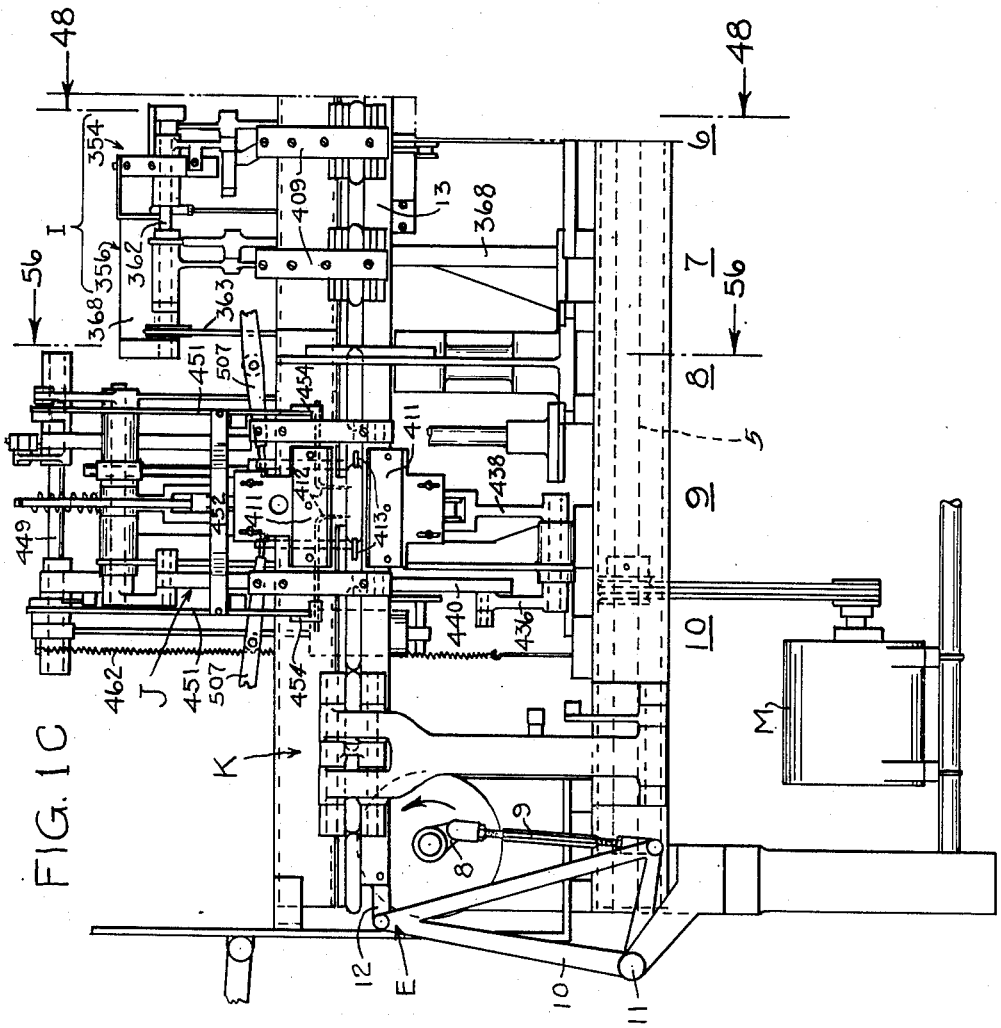
INVENTOR
MELVIN J. FIRST
BY
Pennie Edmonds, Morton and Barrows
HIS ATTORNEYS Sept. 2, 1952    M. J. FIRST    2,609,241
BRUSHMAKING MACHINE Filed May 15, 1950    30 Sheets-Sheet 4

INVENTOR
MELVIN J. FIRST
BY
Pennie, Edmonds, Morton and Barrows
HIS ATTORNEYS

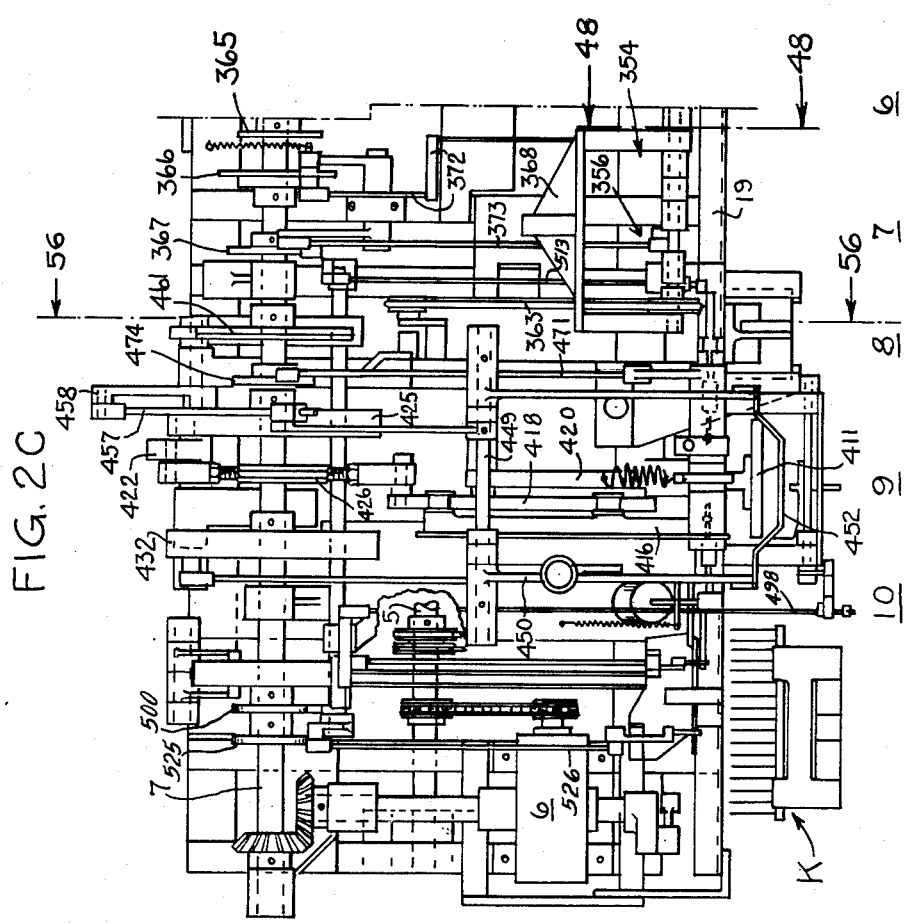

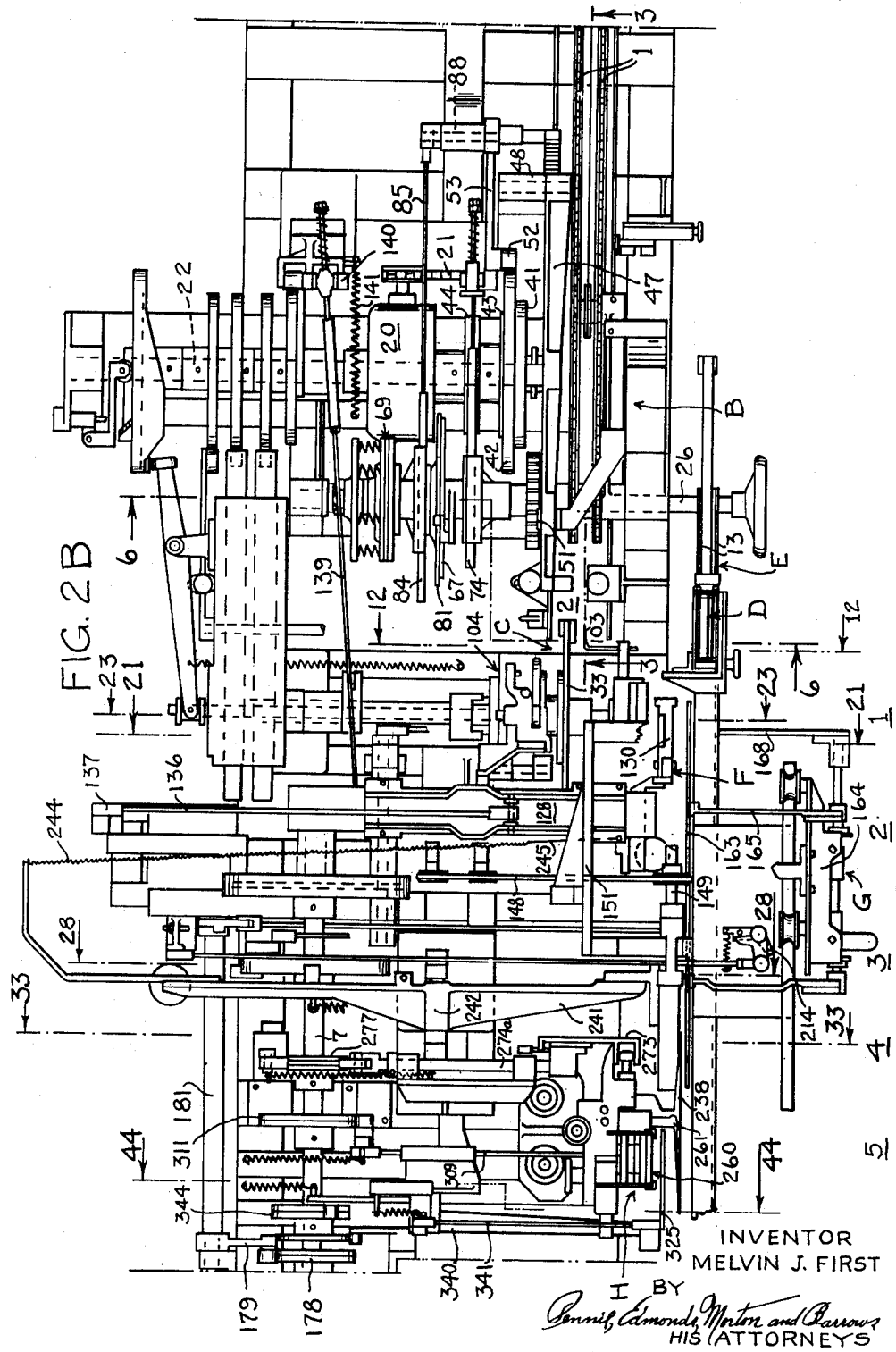

Sept. 2, 1952  M. J. FIRST  2,609,241
BRUSHMAKING MACHINE
Filed May 15, 1950  30 Sheets-Sheet 7
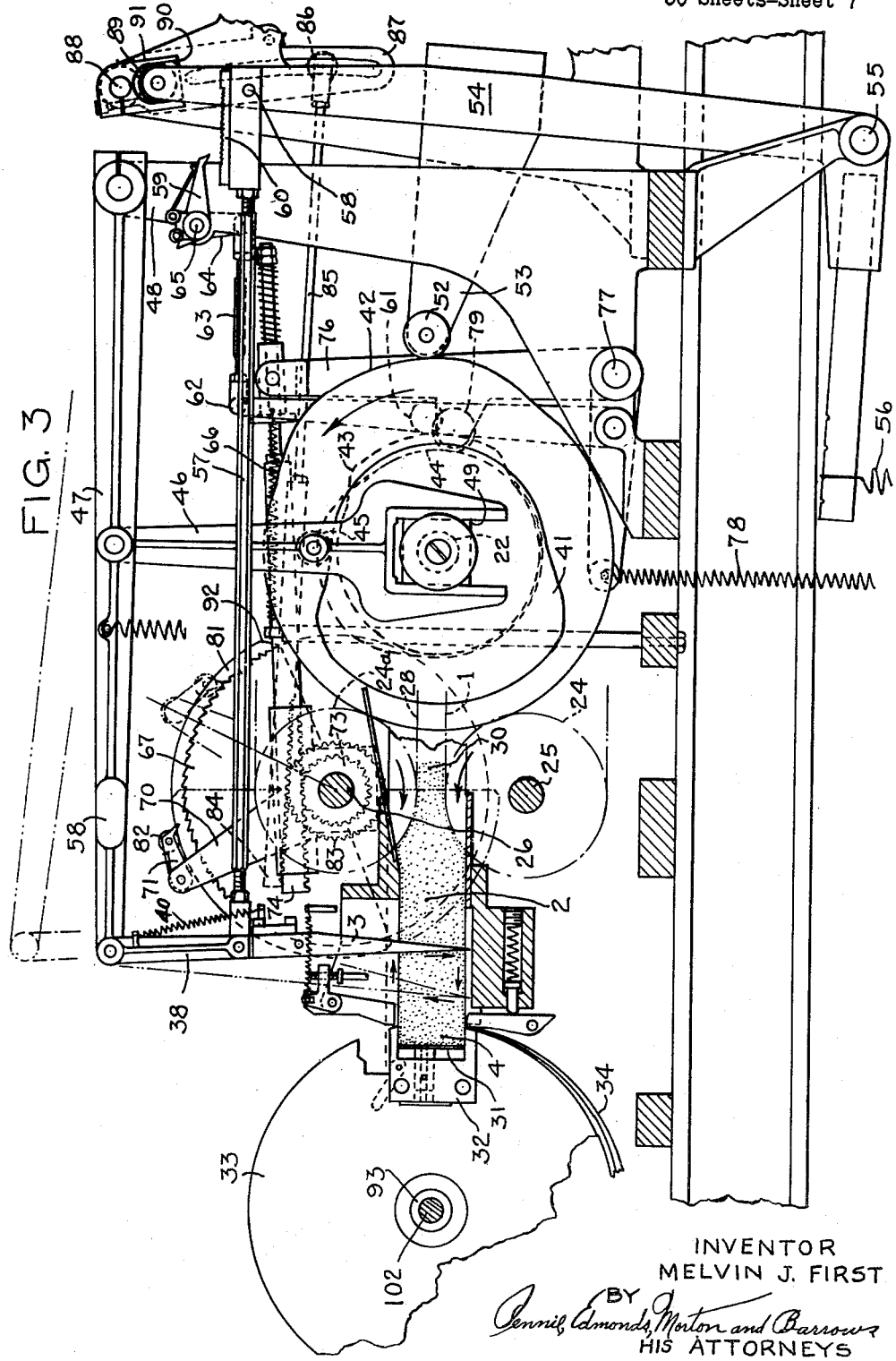
INVENTOR
MELVIN J. FIRST
BY
Pennie, Edmonds, Morton and Barrows
HIS ATTORNEYS

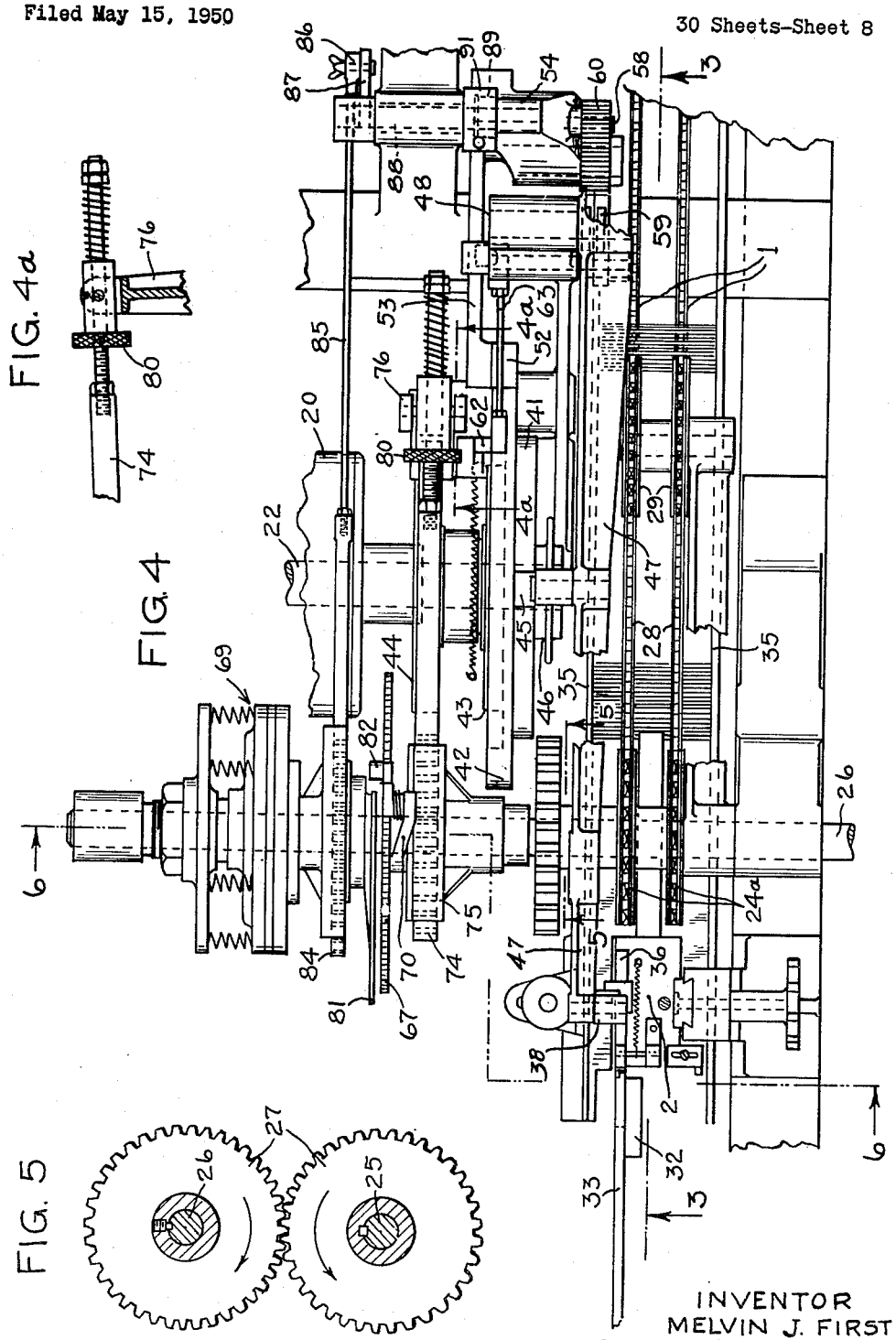

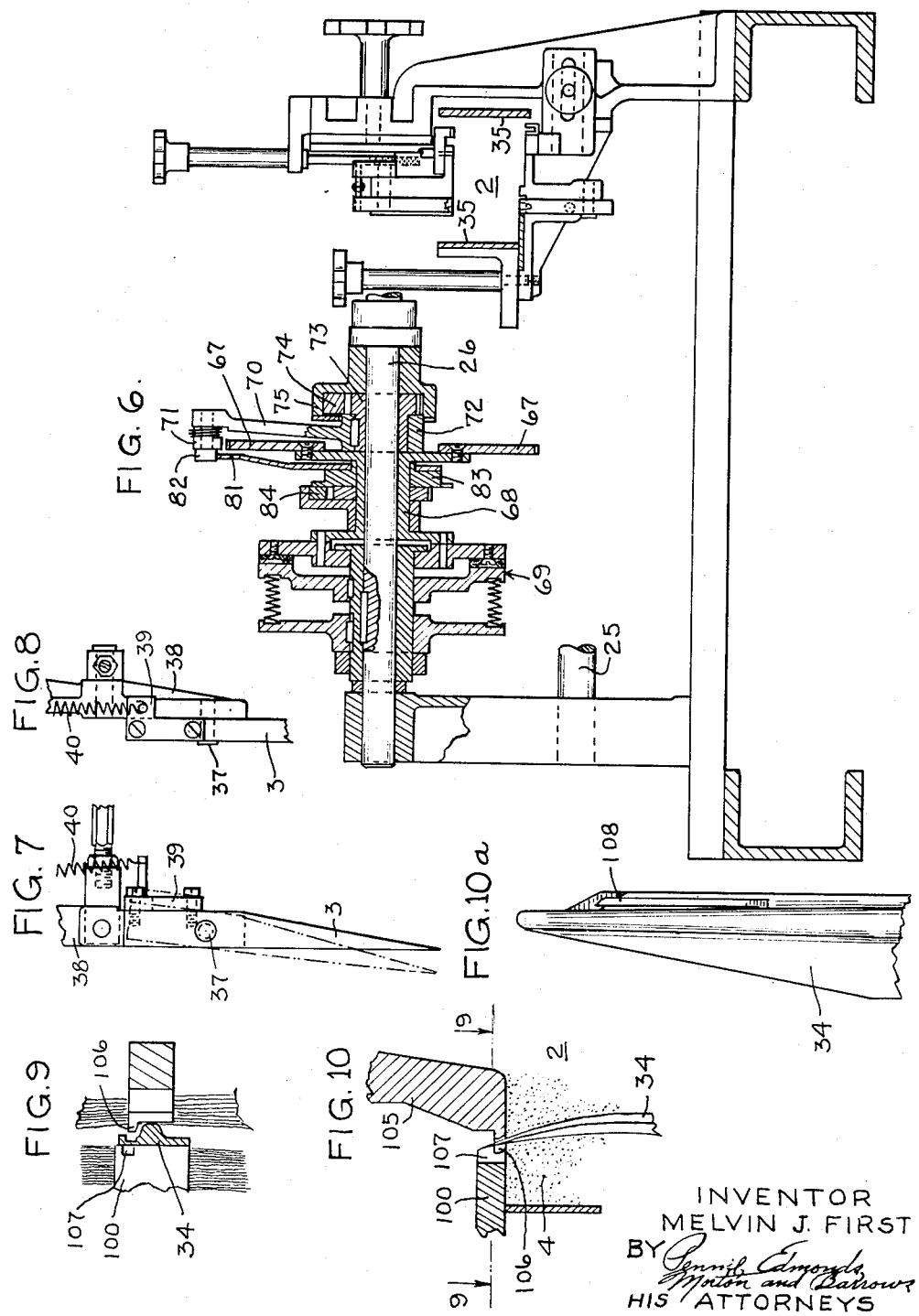

Sept. 2, 1952   M. J. FIRST   2,609,241
BRUSHMAKING MACHINE
Filed May 15, 1950   30 Sheets-Sheet 10
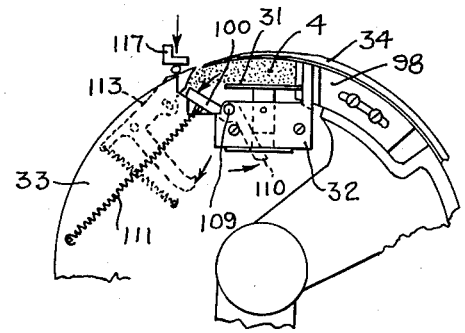
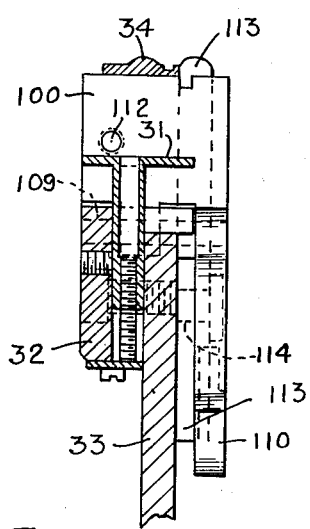
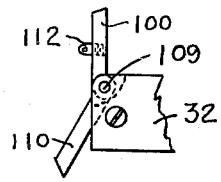
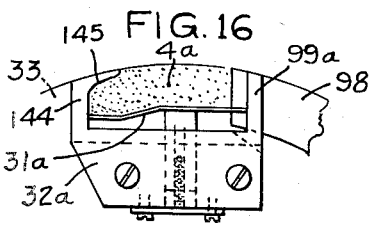
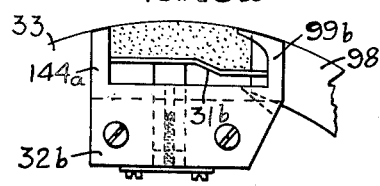
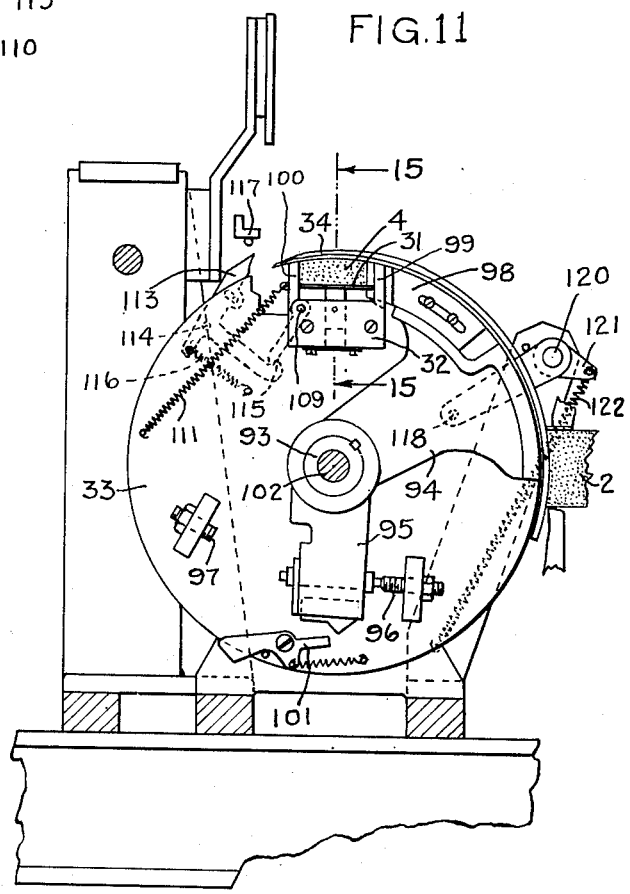
INVENTOR
MELVIN J. FIRST
BY
HIS ATTORNEYS Sept. 2, 1952 M. J. FIRST 2,609,241
BRUSHMAKING MACHINE
Filed May 15, 1950 30 Sheets-Sheet 11
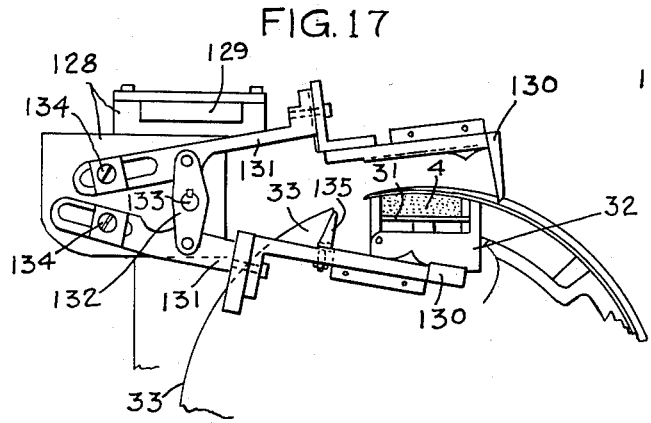
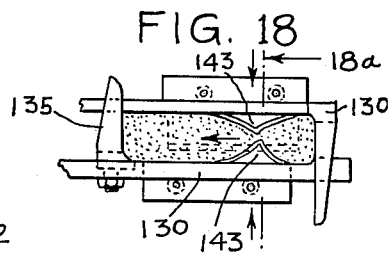
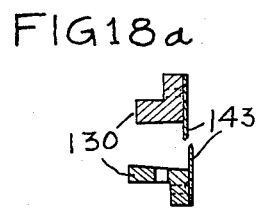
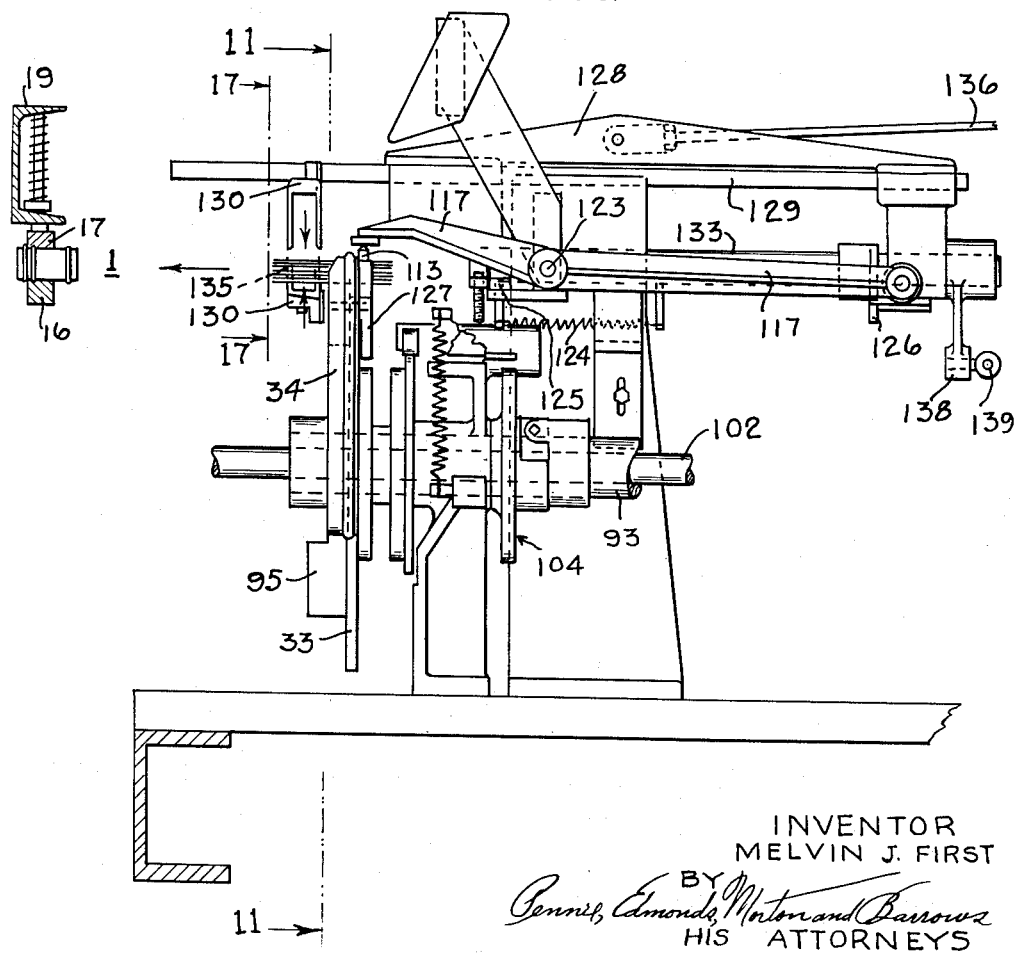
INVENTOR
MELVIN J. FIRST
BY
Pennie, Edmonds, Morton and Barrows
HIS ATTORNEYS Sept. 2, 1952  M. J. FIRST  2,609,241
BRUSHMAKING MACHINE
Filed May 15, 1950  30 Sheets-Sheet 12
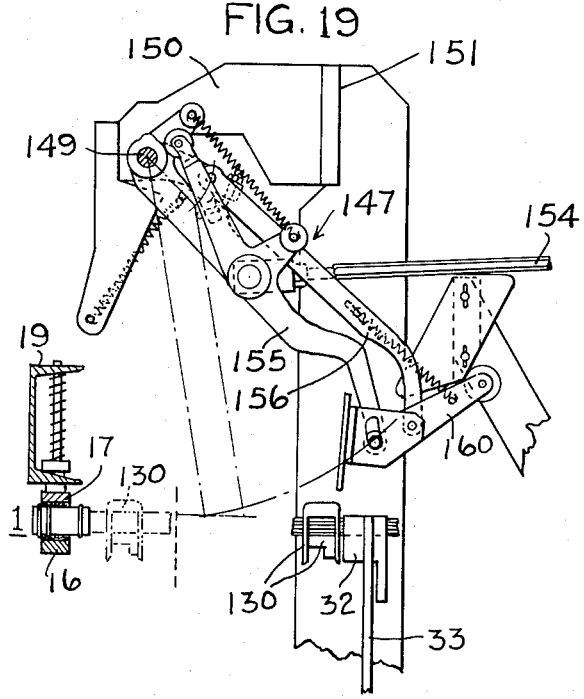
INVENTOR
MELVIN J. FIRST
BY
Pennie, Edmonds, Morton and Barrows
HIS ATTORNEYS Sept. 2, 1952
M. J. FIRST
2,609,241
BRUSHMAKING MACHINE
Filed May 15, 1950
30 Sheets-Sheet 13
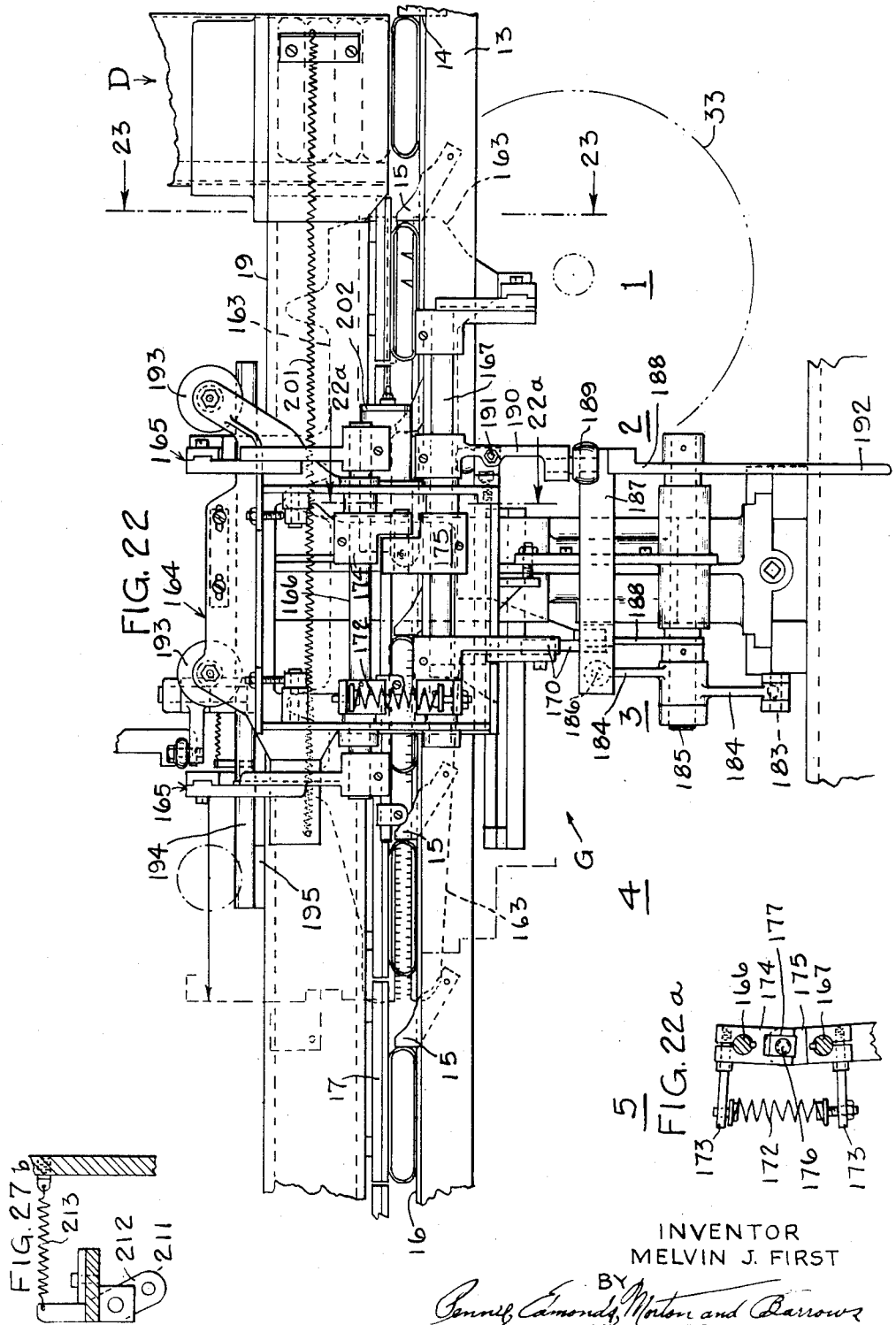
INVENTOR
MELVIN J. FIRST
BY
Pennie, Edmonds, Morton and Barrows
HIS ATTORNEYS

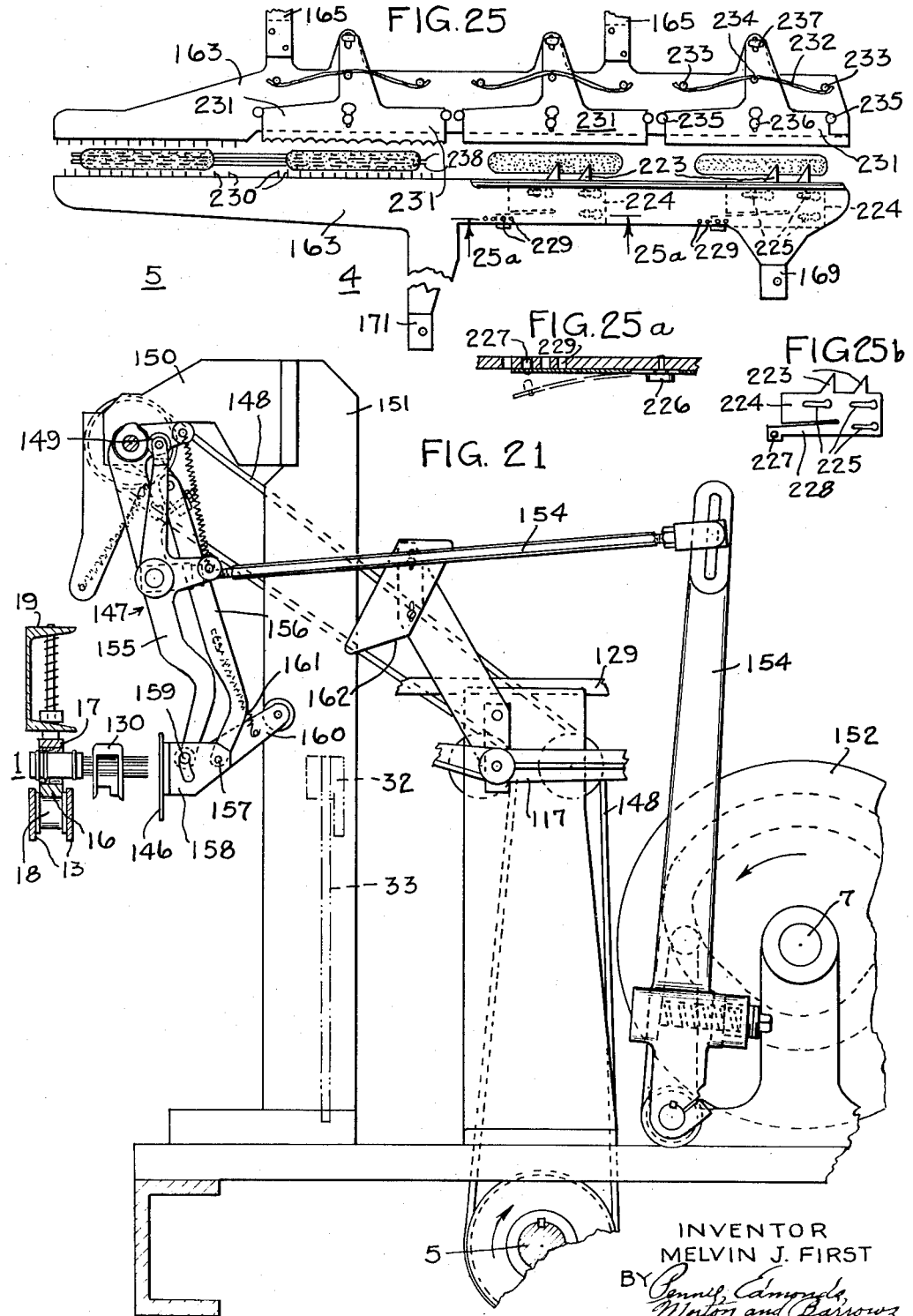

Sept. 2, 1952 M. J. FIRST 2,609,241
BRUSHMAKING MACHINE
Filed May 15, 1950 30 Sheets-Sheet 15
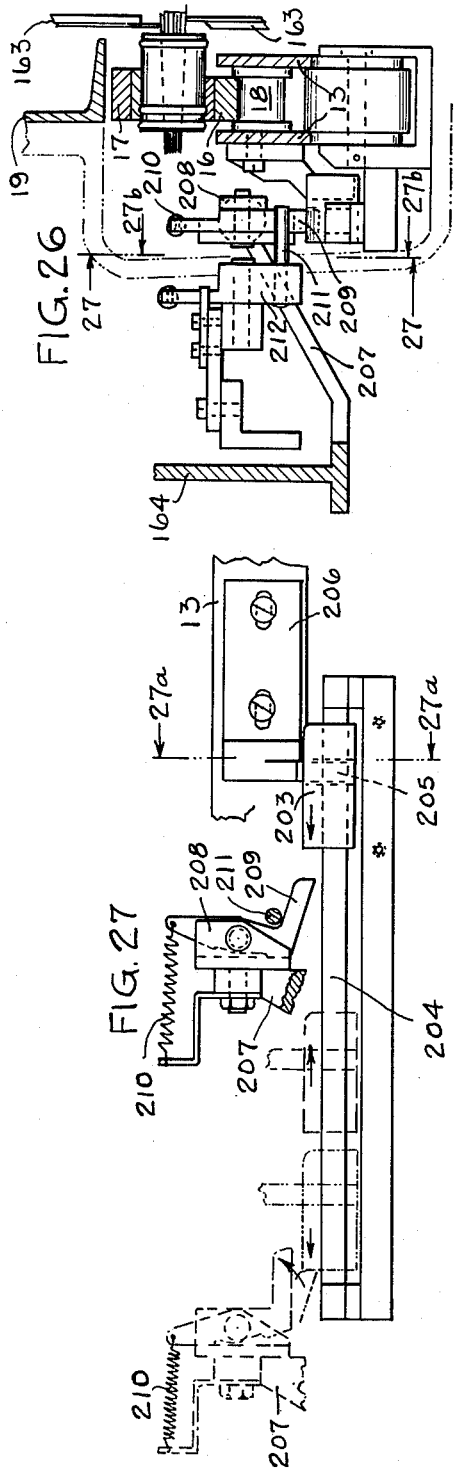
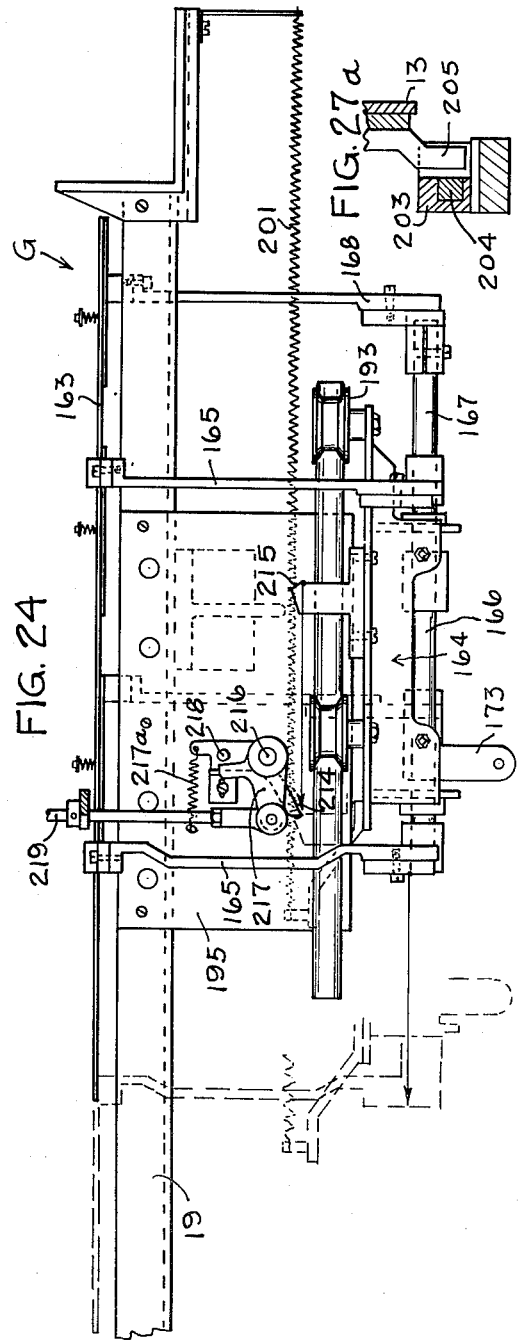
INVENTOR
MELVIN J. FIRST
BY
Pennie, Edmonds, Morton and Barrows
HIS ATTORNEYS

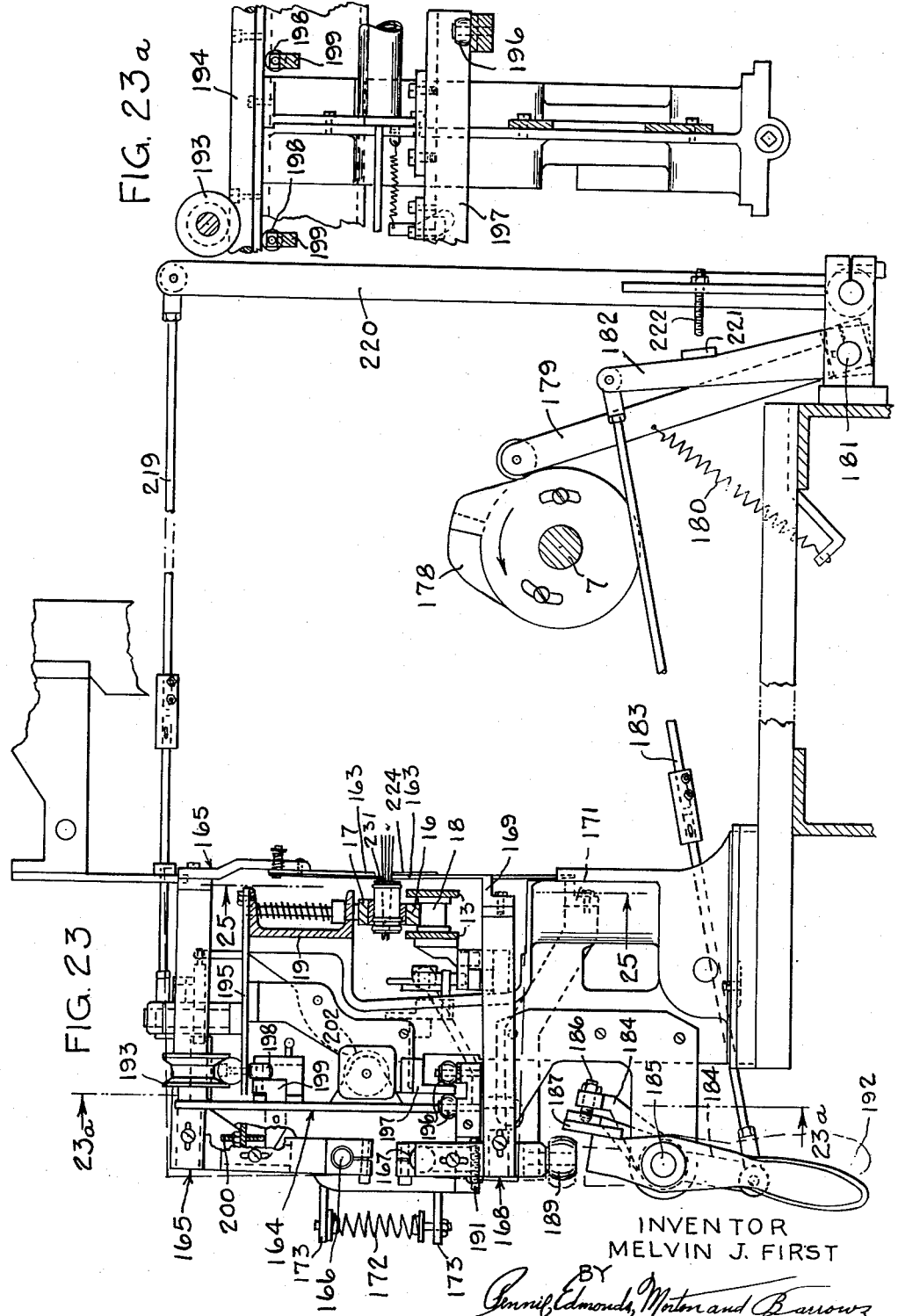

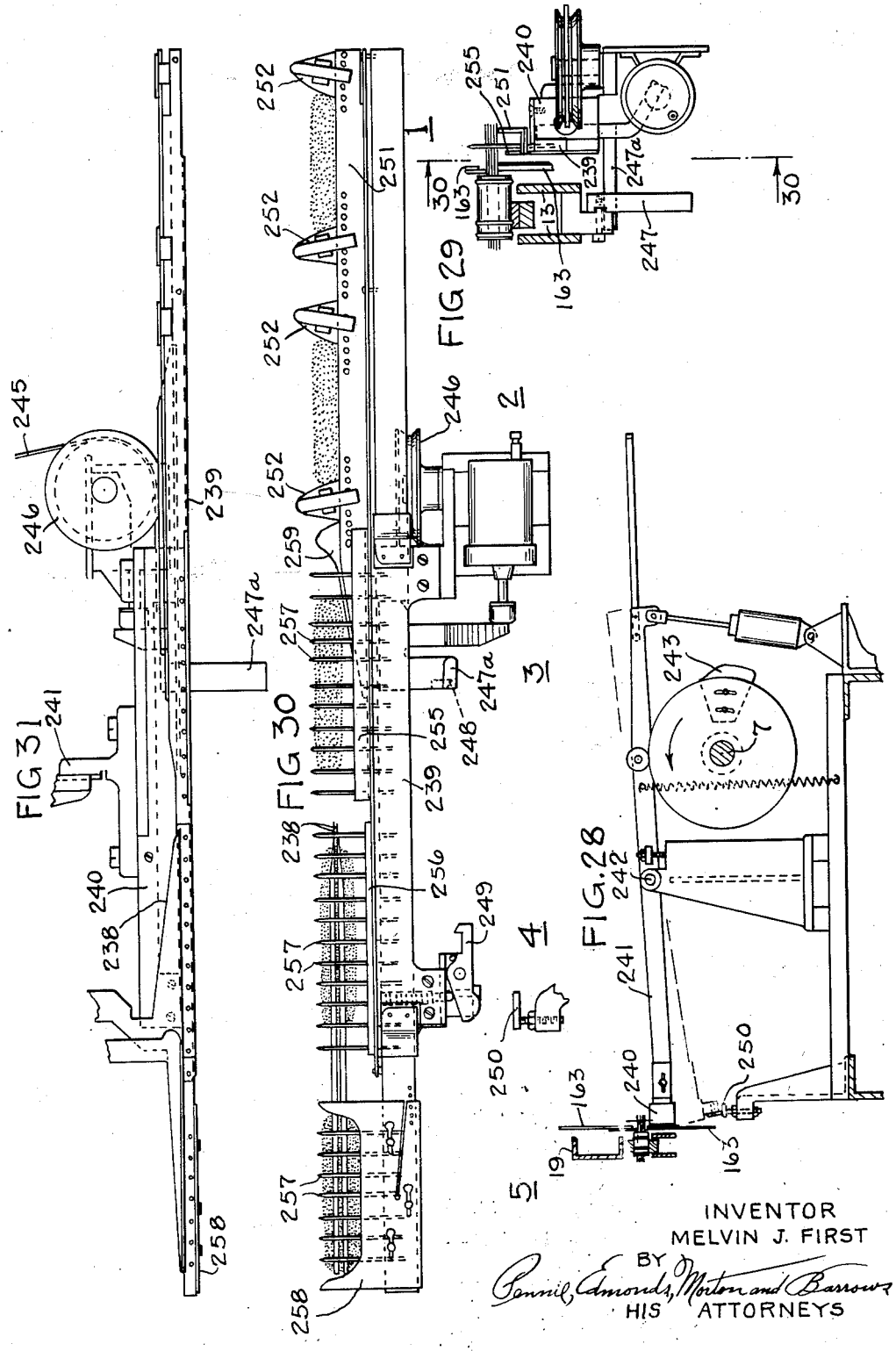

Sept. 2, 1952     M. J. FIRST     2,609,241
BRUSHMAKING MACHINE
Filed May 15, 1950     30 Sheets-Sheet 18
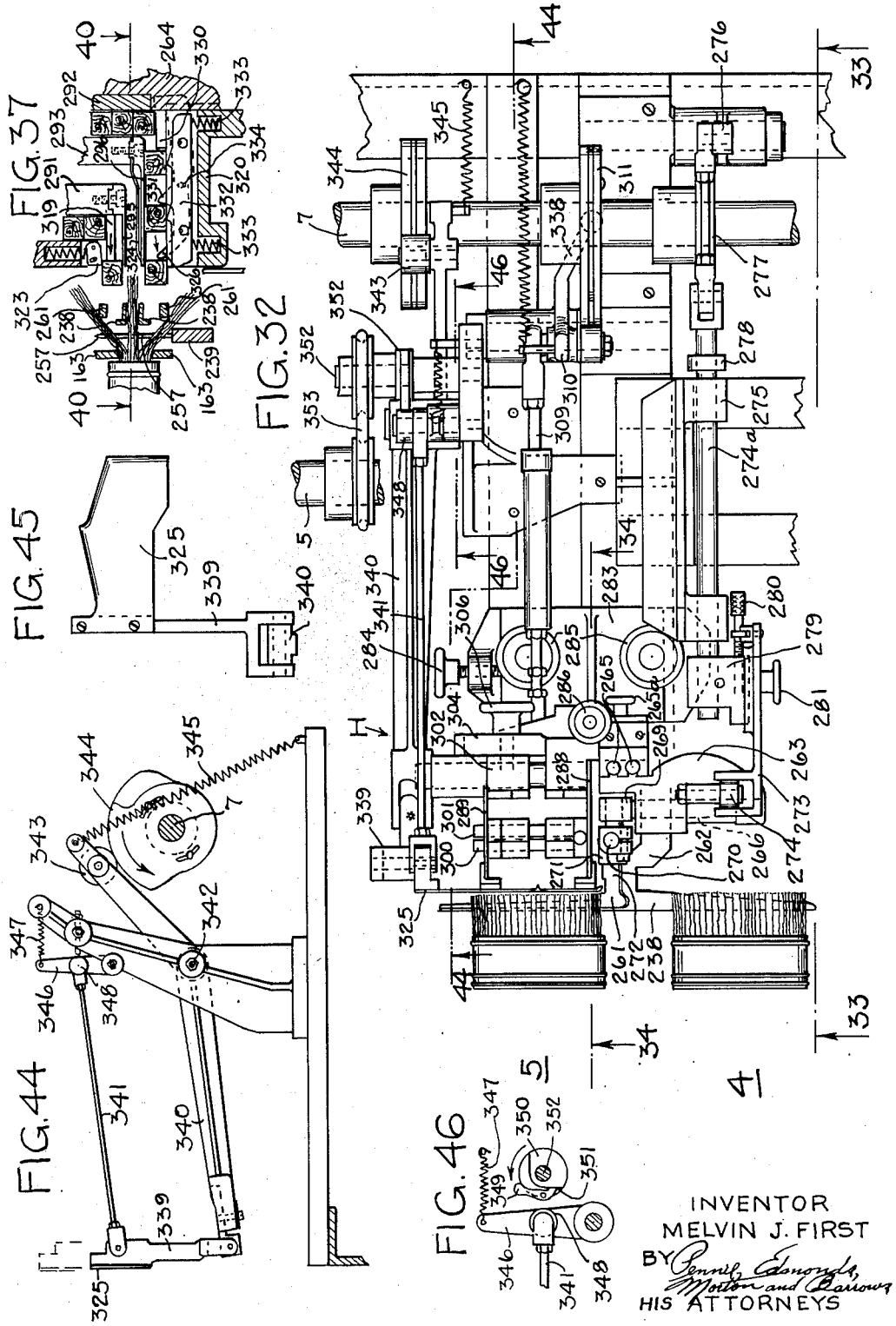
INVENTOR
MELVIN J. FIRST
BY Pennie Edmonds,
Morton and Barrows
HIS ATTORNEYS

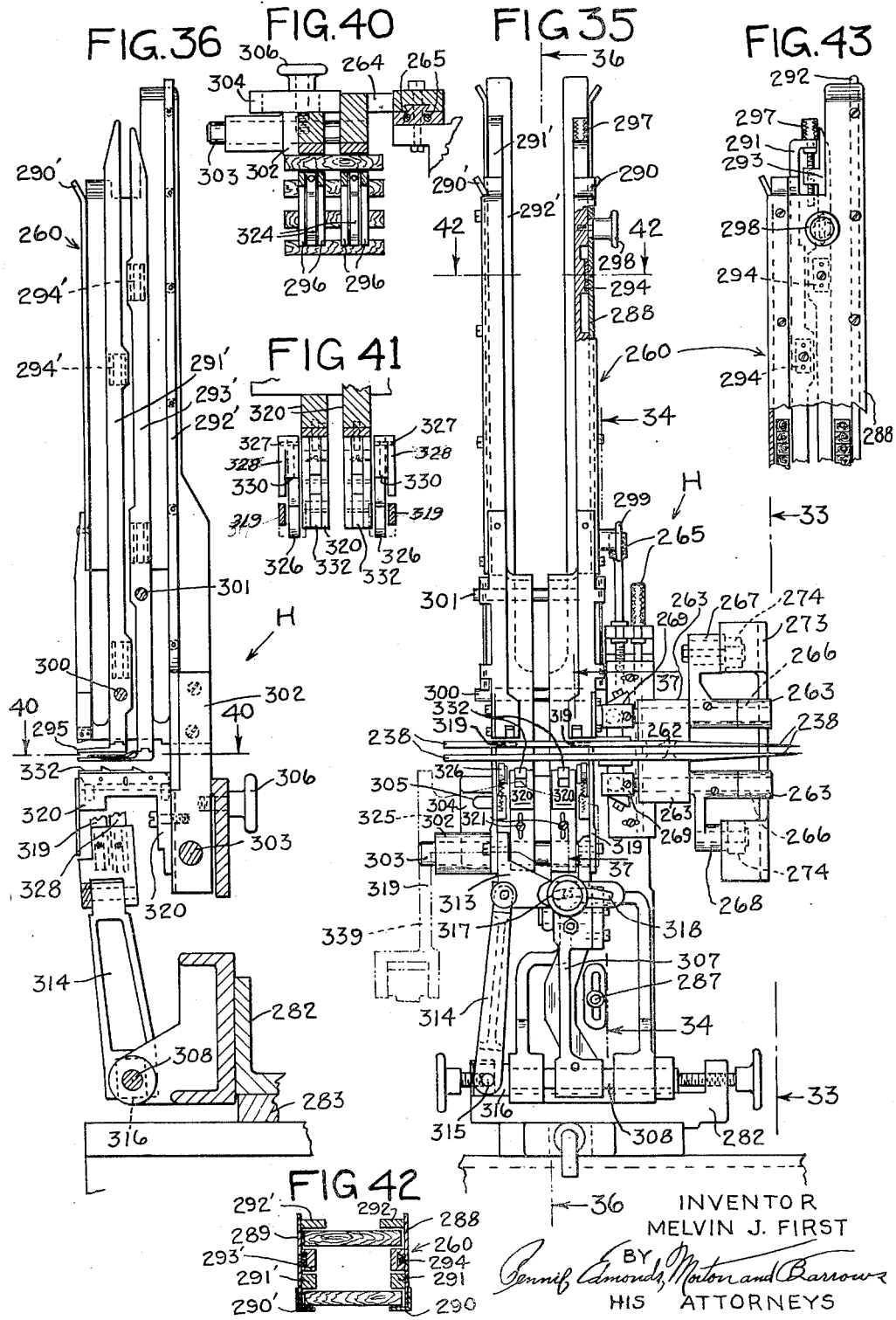

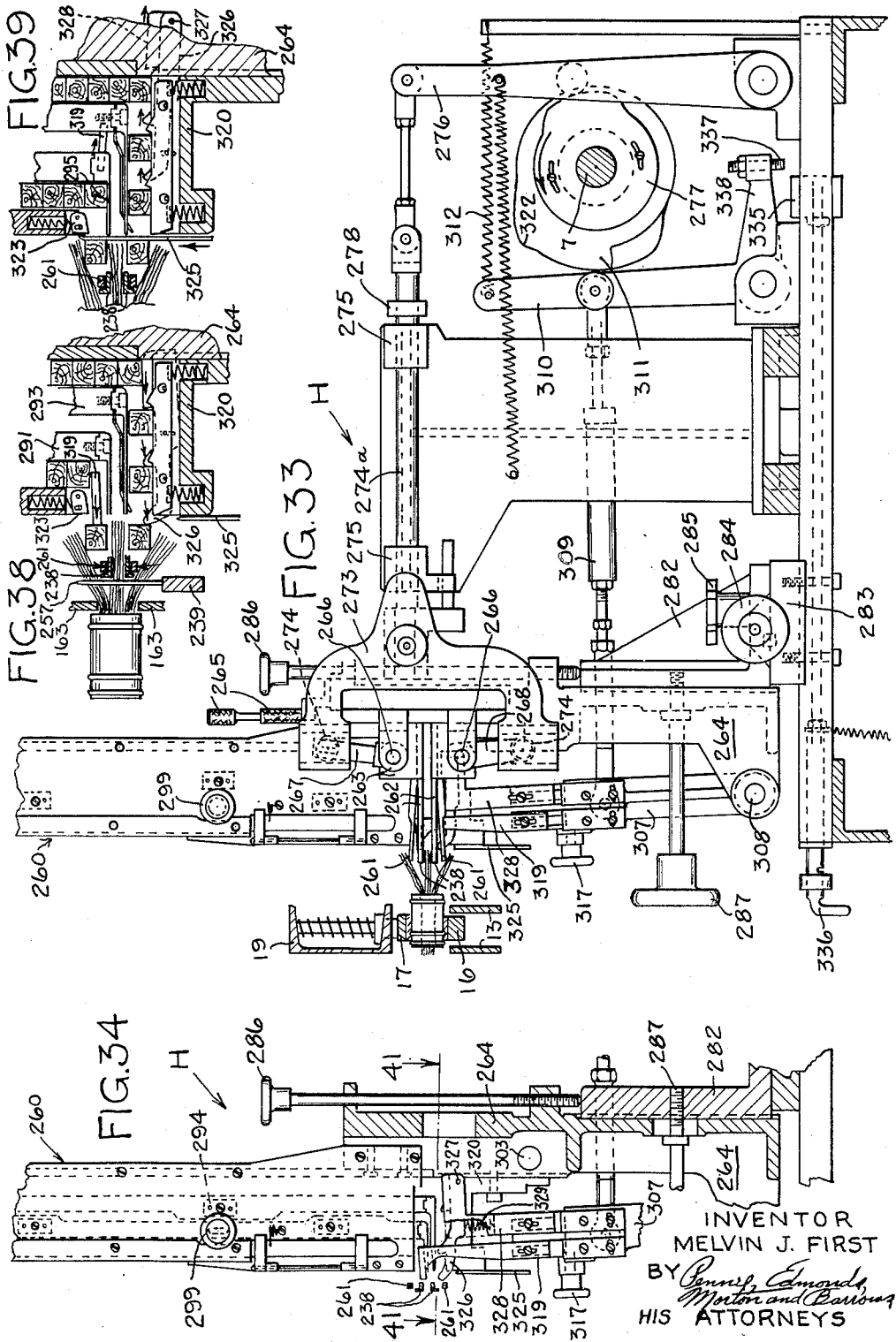

Sept. 2, 1952     M. J. FIRST     2,609,241
BRUSHMAKING MACHINE
Filed May 15, 1950     30 Sheets-Sheet 21
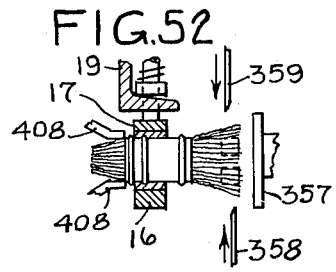
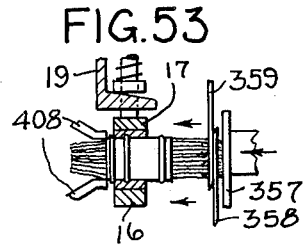
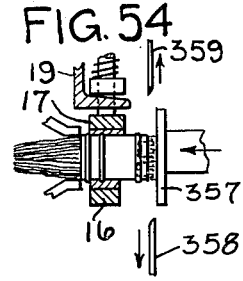
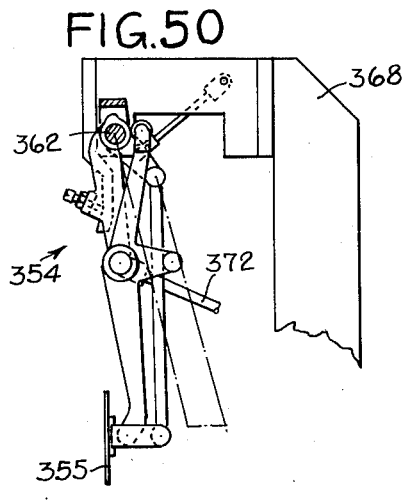
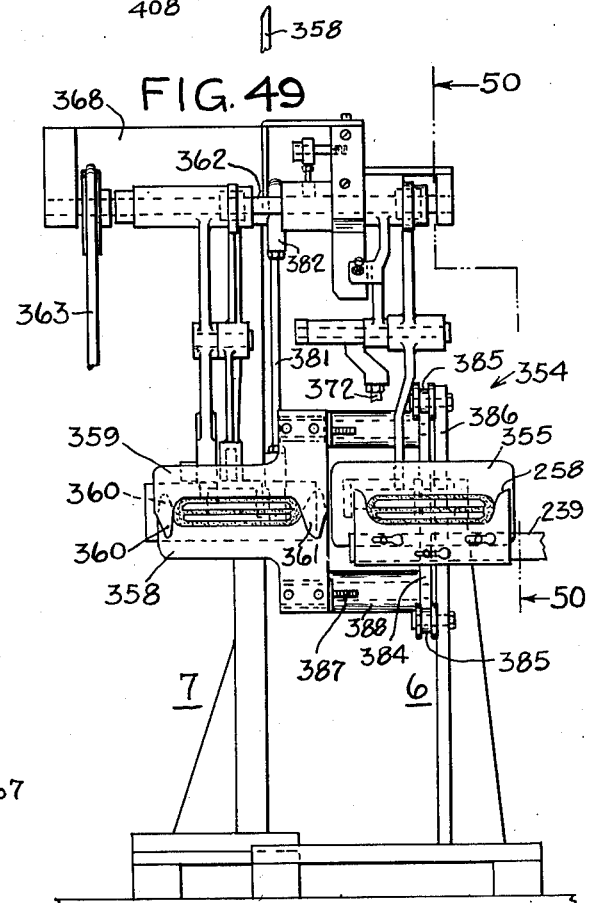
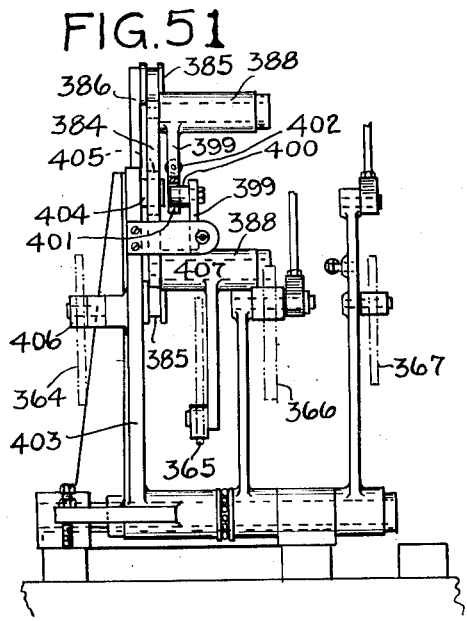
INVENTOR
MELVIN J. FIRST
HIS ATTORNEYS

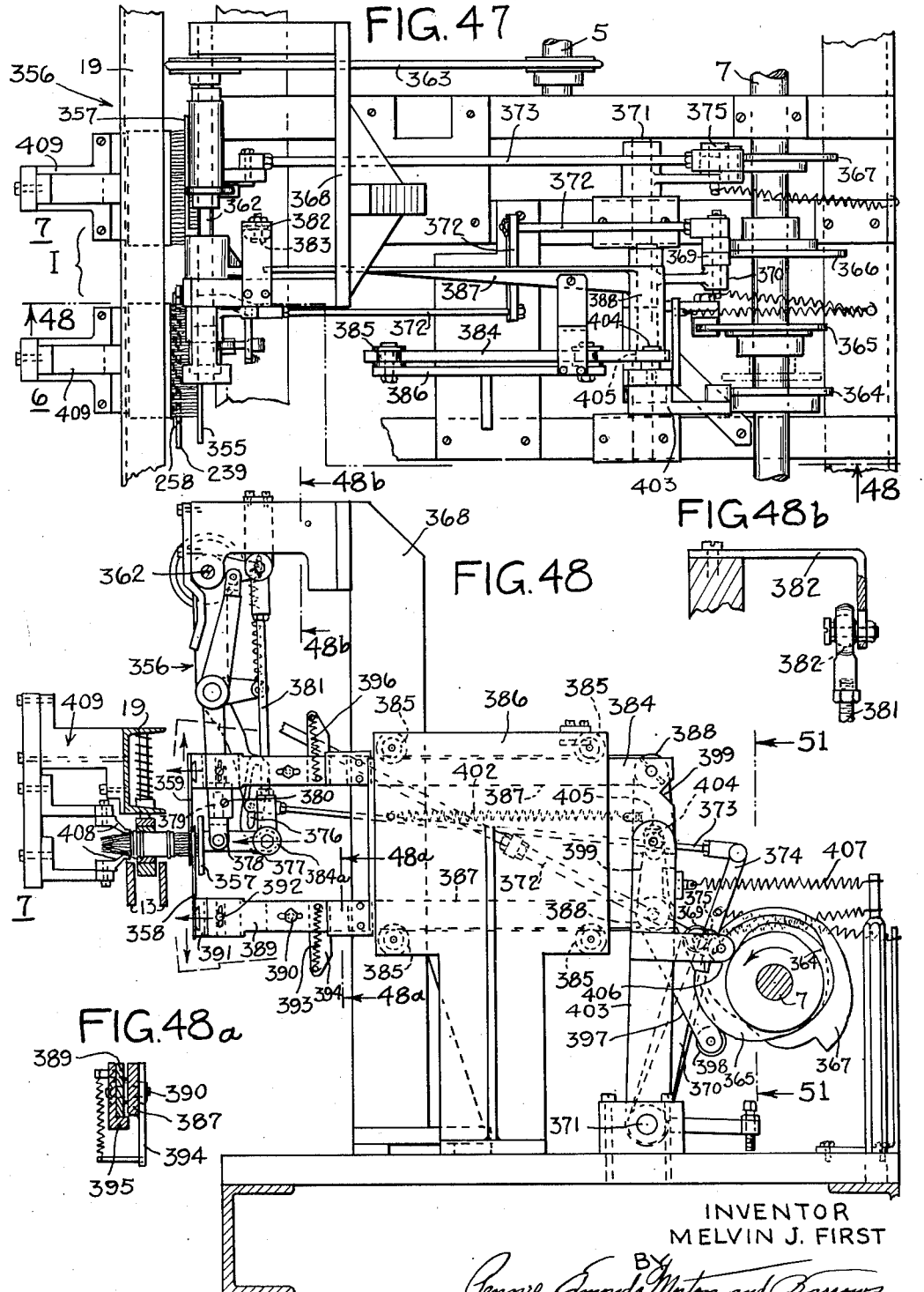

Sept. 2, 1952 M. J. FIRST 2,609,241
BRUSHMAKING MACHINE
Filed May 15, 1950 30 Sheets-Sheet 23
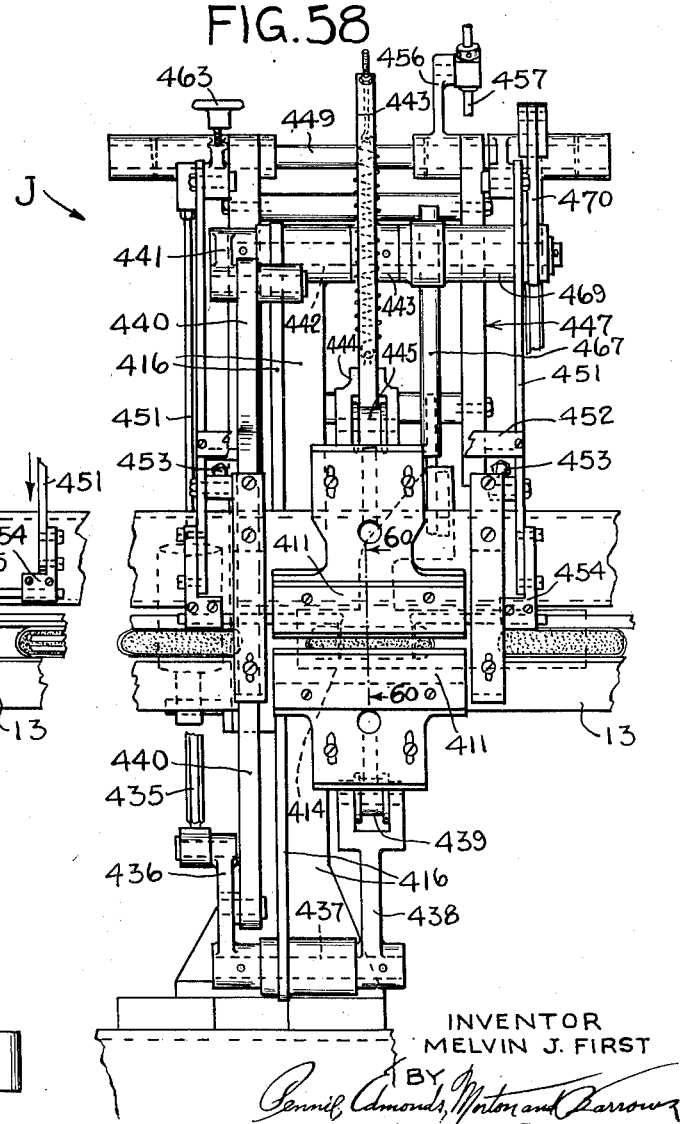
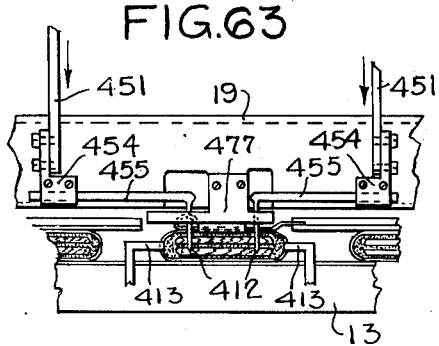
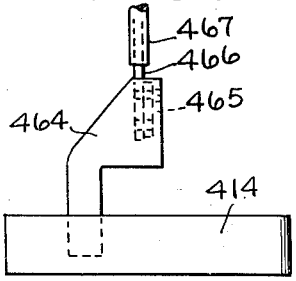
INVENTOR
MELVIN J. FIRST
HIS ATTORNEYS

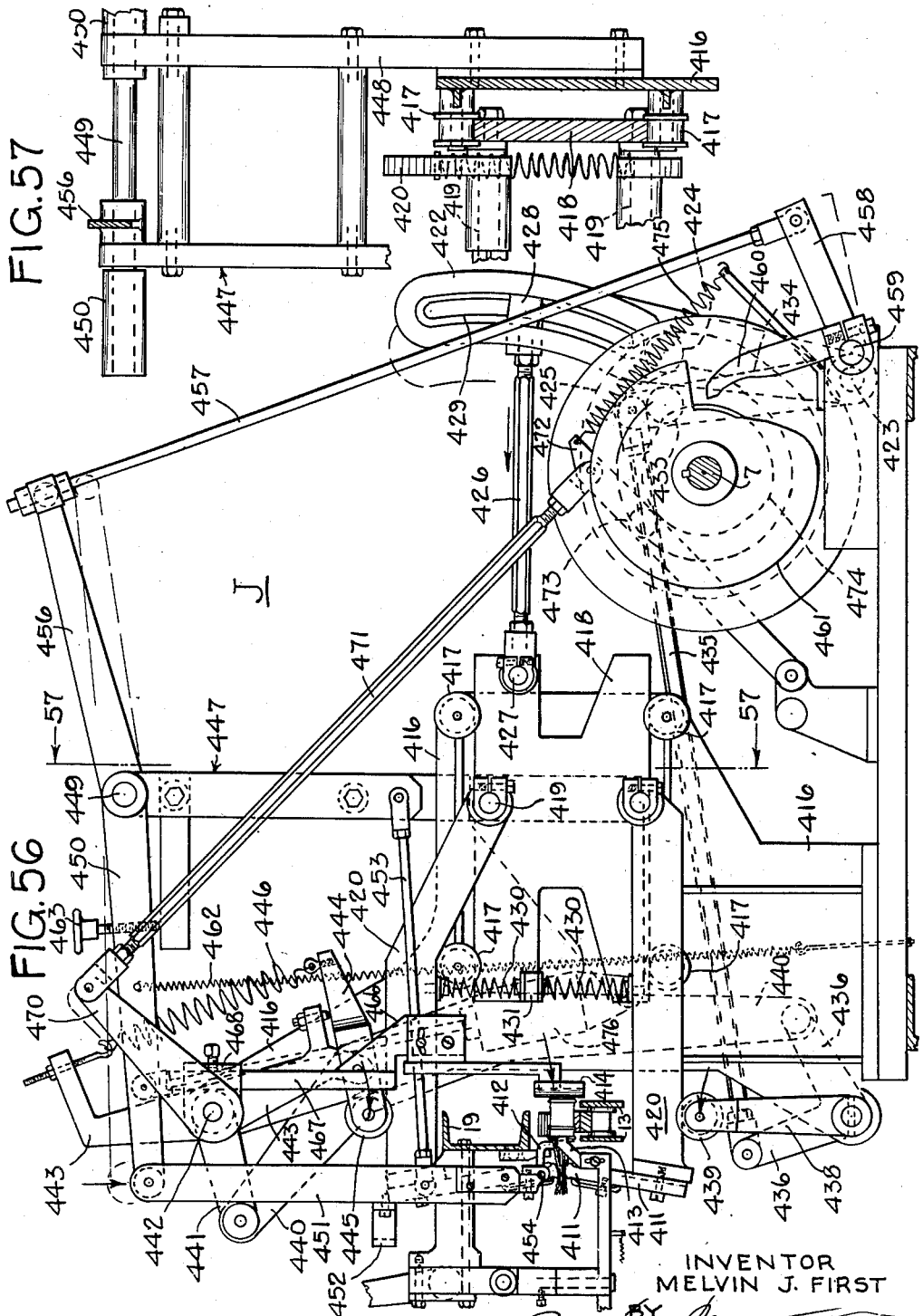

Sept. 2, 1952 M. J. FIRST 2,609,241
BRUSHMAKING MACHINE
Filed May 15, 1950 30 Sheets-Sheet 25
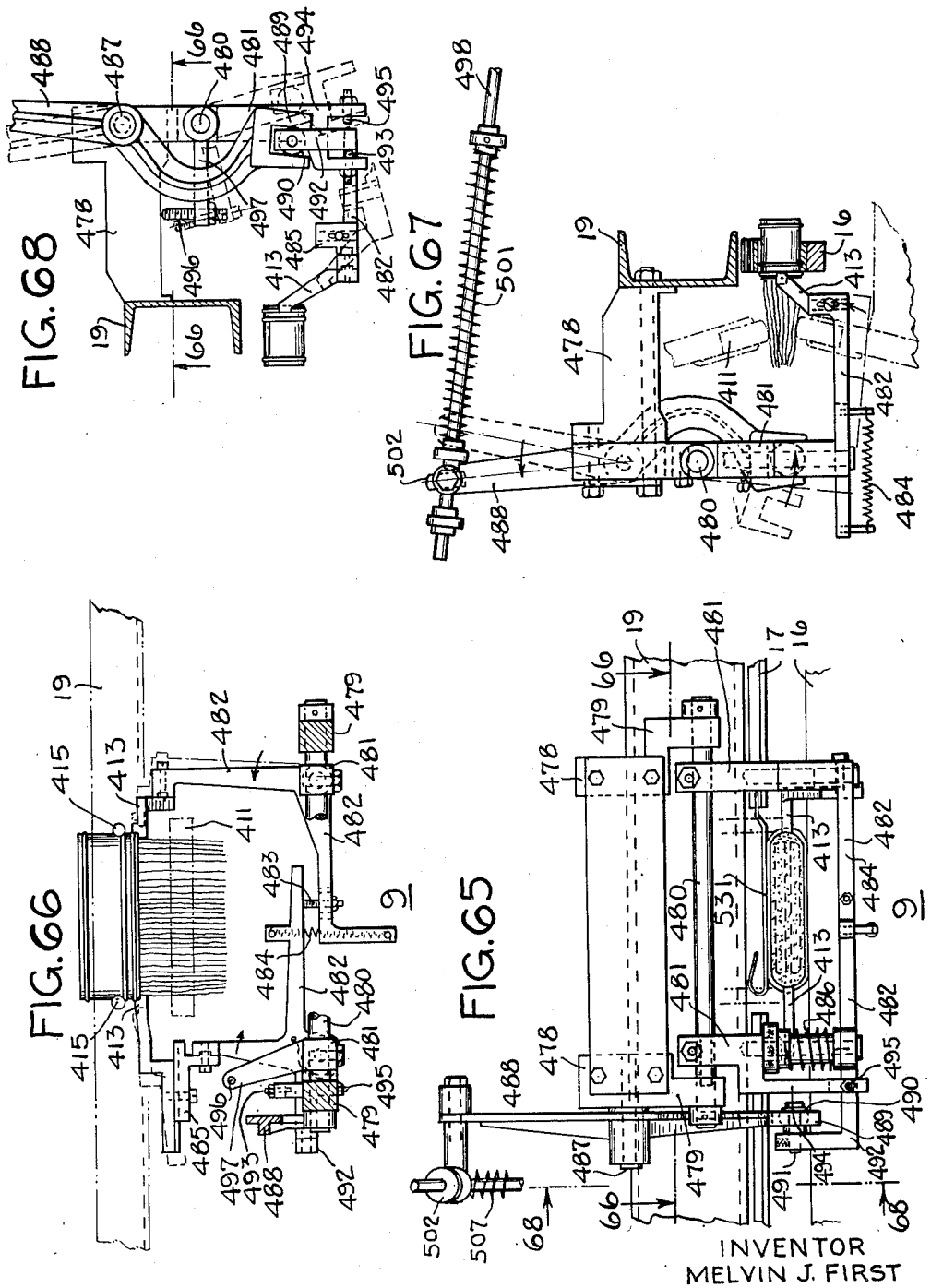
INVENTOR
MELVIN J. FIRST
BY
HIS ATTORNEYS Sept. 2, 1952 M. J. FIRST 2,609,241
BRUSHMAKING MACHINE
Filed May 15, 1950 30 Sheets-Sheet 26
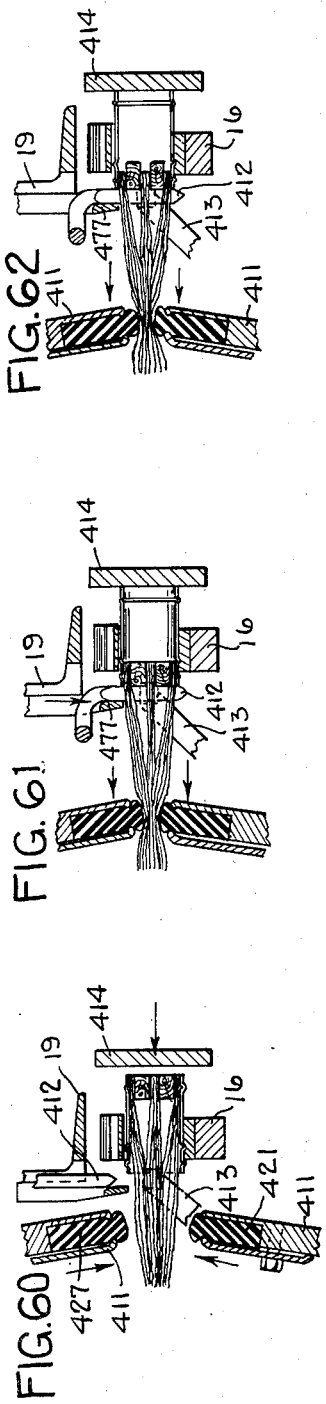
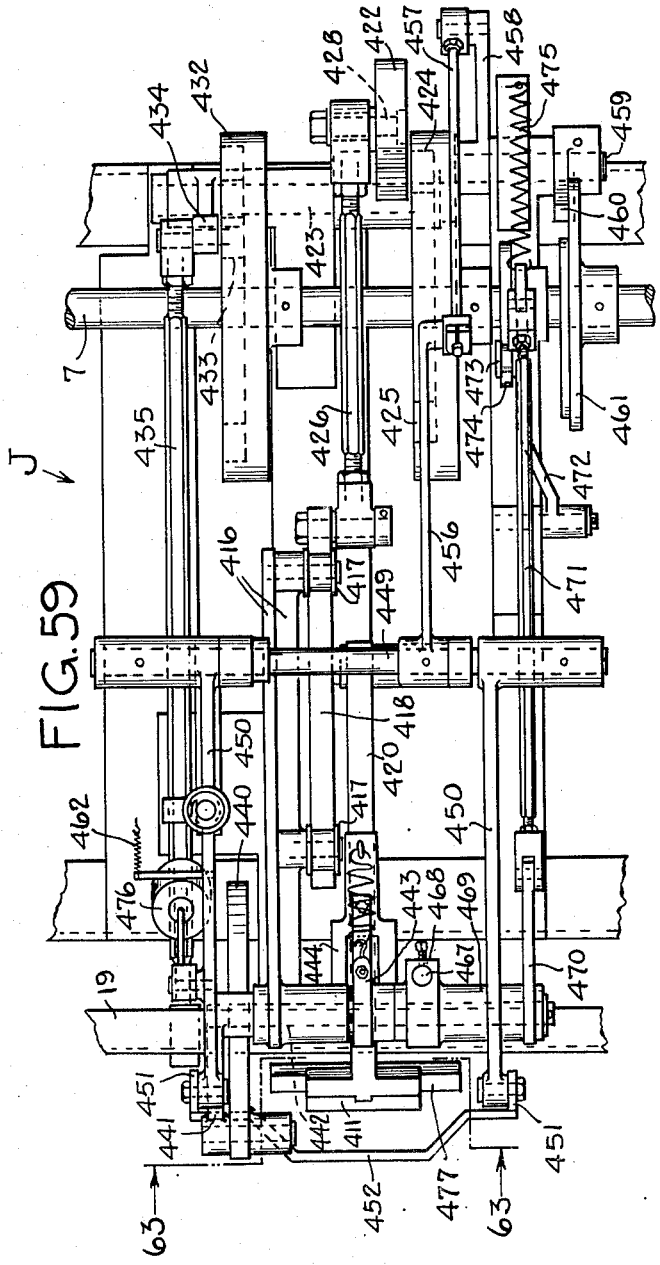
INVENTOR
MELVIN J. FIRST
HIS ATTORNEYS

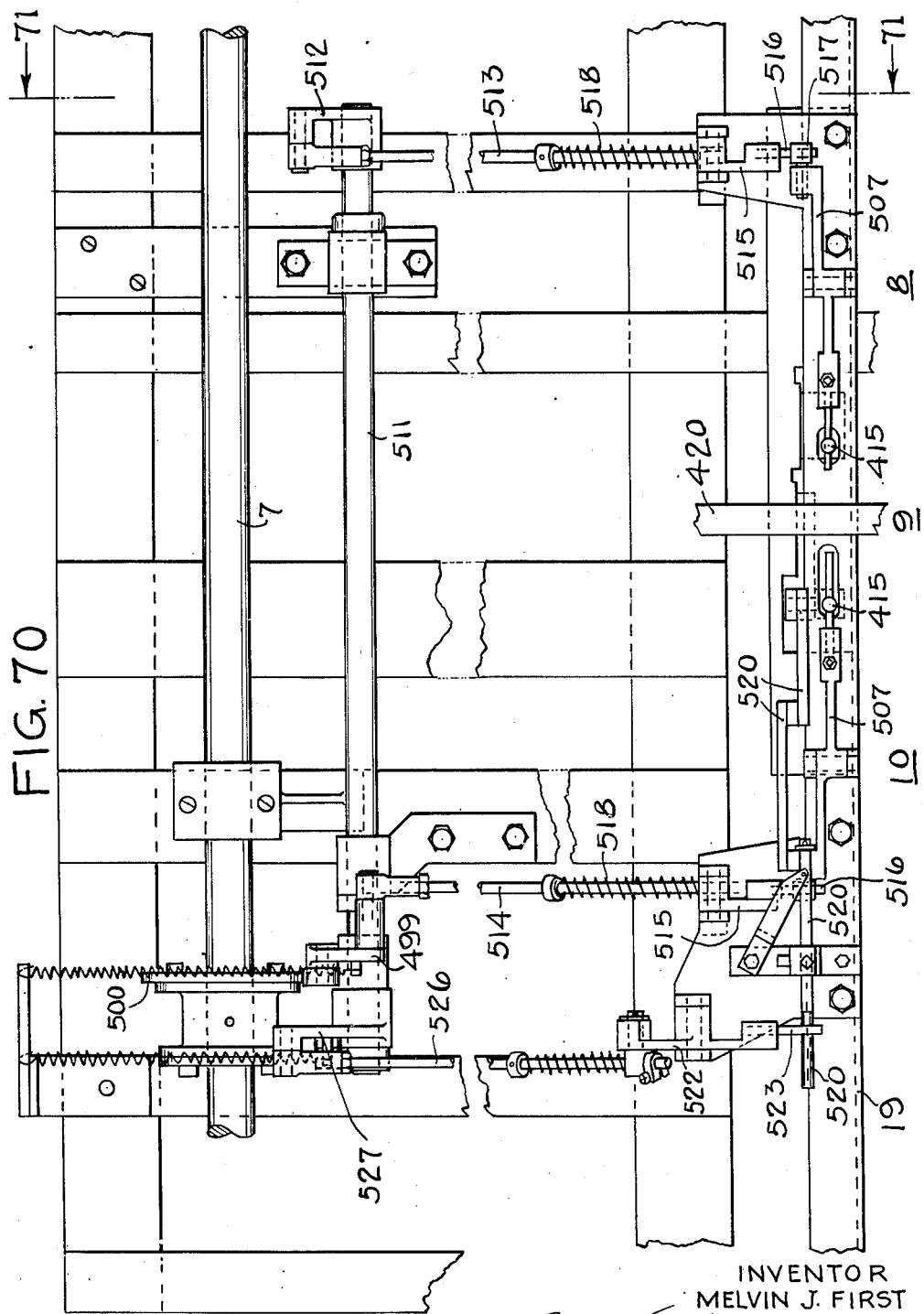

Sept. 2, 1952  M. J. FIRST  2,609,241
BRUSHMAKING MACHINE
Filed May 15, 1950  30 Sheets-Sheet 28
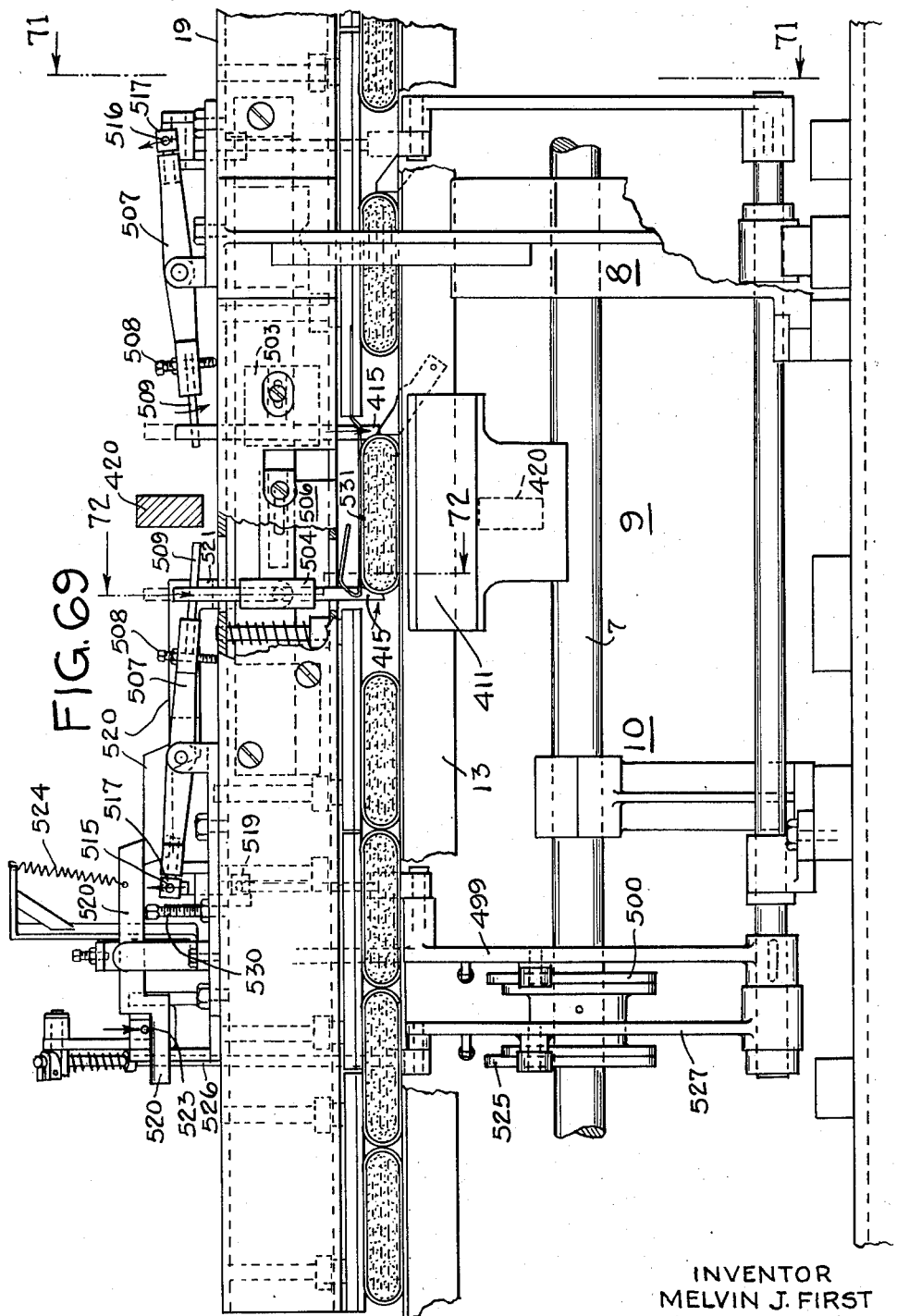
INVENTOR
MELVIN J. FIRST
BY
HIS ATTORNEYS

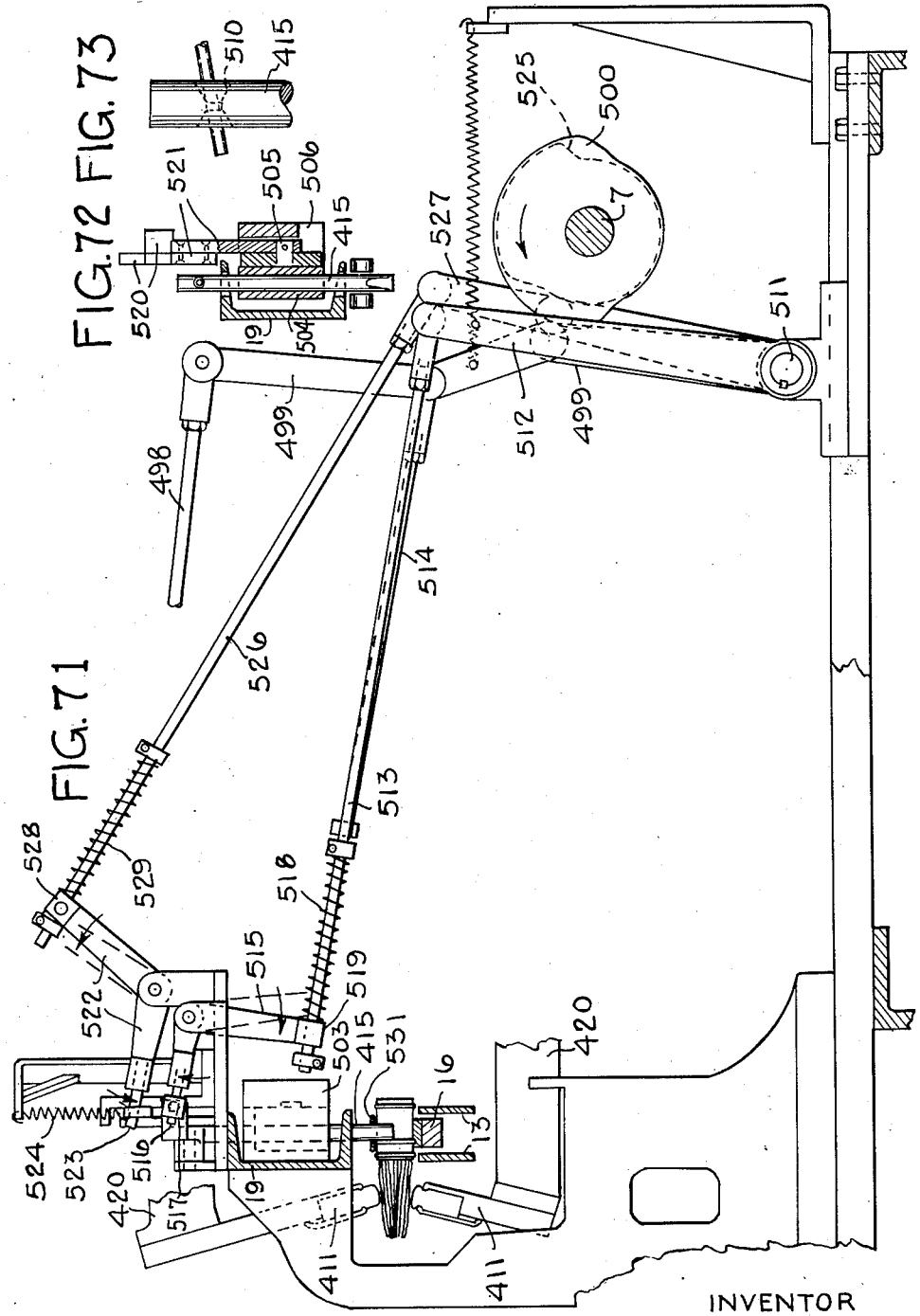

Sept. 2, 1952 M. J. FIRST 2,609,241
BRUSHMAKING MACHINE
Filed May 15, 1950 30 Sheets-Sheet 30
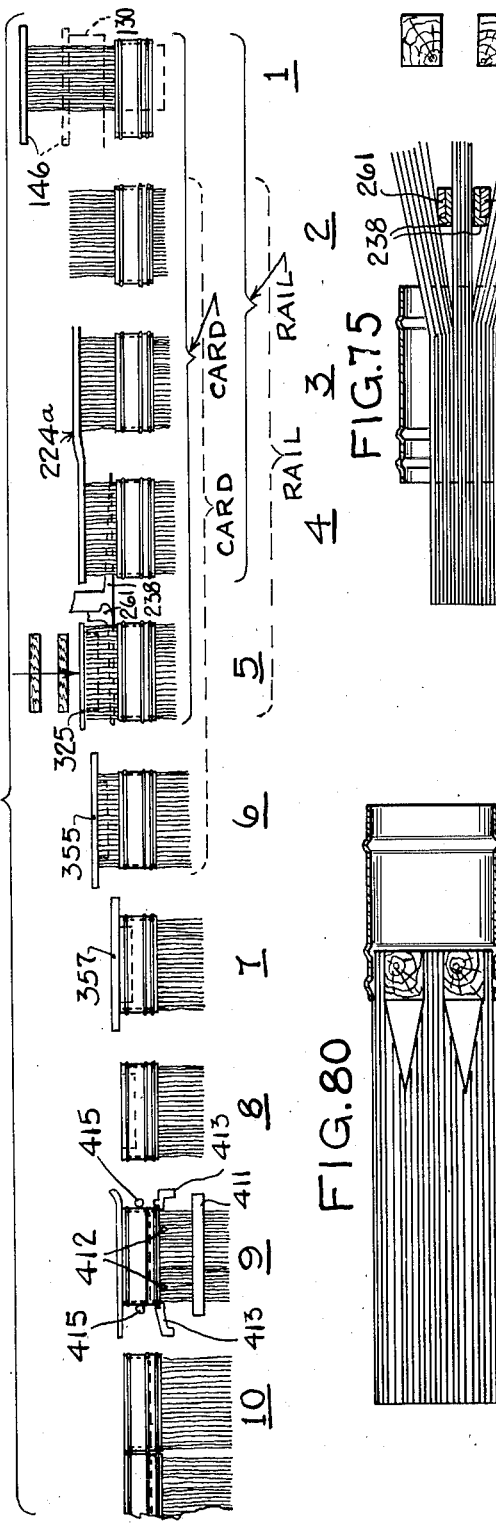
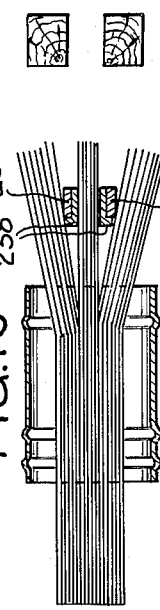
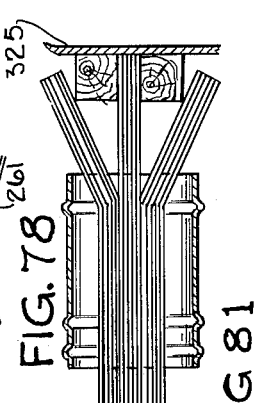
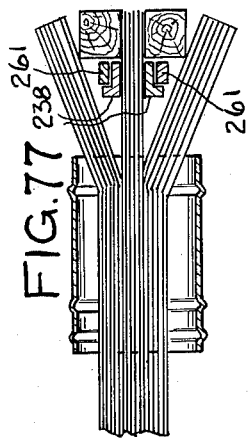
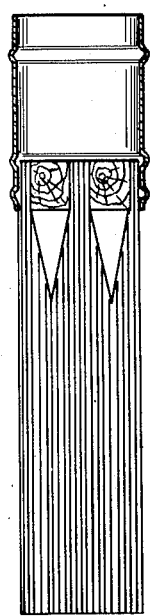
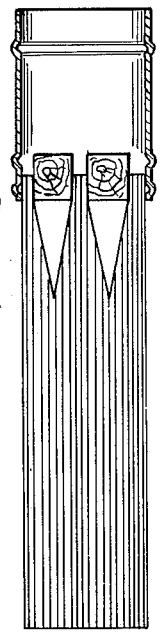
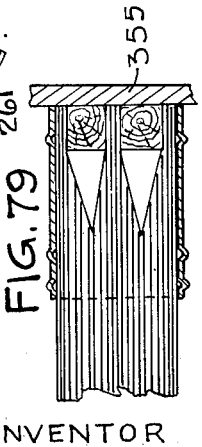
INVENTOR
MELVIN J. FIRST
BY
HIS ATTORNEYS Patented Sept. 2, 1952

2,609,241

UNITED STATES PATENT OFFICE 2,609,241

BRUSHMAKING MACHINE

Melvin J. First, Louisville, Ky., assignor to Devoe & Raynolds Company, Inc., Louisville, Ky., a corporation of New York Application May 15, 1950, Serial No. 161,955

71 Claims. (Cl. 300—2)

This invention relates to brush machines for manufacturing brushes of the paint brush type, and, more particularly, to automatic machines for manufacturing brush units each consisting of a ferrule with a group or "knot" of bristles frictionally held therein by wedges or "plugs," and ready for cementing and the application of the handle.

In my prior application Serial No. 775,362, filed September 20, 1947, now Patent No. 2,513,016, June 27, 1950, I have described an automatic brush machine which is well adapted to make brushes up to 2½" in width, but which is not adapted for the manufacture of wider brushes up to 4" in width. And so far as I am aware automatic brush making machines have not heretofore been available for the manufacture of brushes as large as 4" brushes.

In brushes of around 3", 3½" or 4" in width a much larger quantity or "knot" of bristles is required, both because of the greater width of the brush and its greater thickness, and the bristles employed are long bristles of, e. g., 2¾" or more in length. The bristles are, moreover, usually tapered, which increases the difficulty of handling large quantities or knots of bristles such as are required for brushes up to 4" or more in width. So also, with smaller brushes, a single plug is usually sufficient; but with wider and thicker brushes such as 4" brushes two plugs are commonly required to separate and hold the bristles in the ferrule between them and between the plugs and the sides of the ferrule. The formation of brushes of 4" width presents problems which are not presented in the formation of smaller brushes of e. g. 2½ inches in width.

The present invention provides an improved automatic machine which overcomes the difficulties presented in the making of wider and thicker brushes and enables brushes up to 4" in width or more to be manufactured automatically and rapidly with a larger amount of long bristles satisfactorily held in place during the successive operations and in the brush unit formed thereby, which brush unit is ready for the cementing operation for cementing the bristle ends in place in the ferrule and for adding the handle to form the completed brush.

In the machine of my patent above mentioned, a series of stations are provided spaced 6" apart at which stations the successive operations are carried out as successive operations in the formation of the brush. The manufacture of a wider brush might be expected to require stations spaced a greater distance apart. But the improved machine of the present invention enables brushes up to 4" in width to be produced by a series of operations and at a series of stations spaced only 6" apart so that the overall length of the machine is much the same as that of my prior application; but the operations at the different stations are materially different from those in my prior application.

The improved machine of the present invention provides for handling the much larger masses of bristles required for a 4" brush, with special feeding and automatic bristle feed control mechanism for forming a "knot" of the bristles, spreading them out and holding them while they are initially inserted in the ferrule, for further spreading them out and holding them in the ferrule as they are progressively moved into the ferrule into a condition ready for inserting the plugs, for inserting a plurality of plugs in proper relation between the bristles and for moving the bristles and plugs into the ferrule and for drawing the bristles and plugs into final position in the ferrule while maintaining the relatively thick mass of bristles in proper relation during these operations.

Because the long bristles are tapered it is impractical to pile or stack the bristles while fed in the machine higher than about 2 inches. The picking of a "knot" from a mass or pile of such bristles and the forming of the bristles into a layer suitable for inserting into the ferrule presents special difficulties which the improved machine of the present invention overcomes.

The holding of the large mass of bristles in proper shape during the successive operations up to the insertion of the plugs also presents special difficulties which the present automatic machine satisfactorily overcomes.

And the problem of inserting two plugs in a 4" brush and of maintaining the plugs and bristles in proper relation to each other while they are inserted in the ferrule and drawn to final position also presents special difficulties which the machine of the present invention overcomes.

The improved machine of the present invention has a series of successive stations, equally spaced apart and operated by common operating mechanism in timed relation so that each station acts simultaneously and intermittently in timed relation with the other stations. The bristles are automatically fed, the knots automatically picked therefrom, and each knot of bristles formed and held in proper relation in the successive stations, with automatic supply of the ferrules and combination of the bristles with the ferrules, with automatic supply of the plugs and insertion of the plugs in proper relation between the bristles, and with automatic introduction of the plugs and bristles into the ferrule and drawing of the plugs and bristles into final position automatically and while holding the different layers of bristles in proper relation to each other and to the plugs.

The improved machine of the present invention enables wider and thicker brushes up to 4" in width and corresponding thickness to be made rapidly and automatically at the rate, for example, of fifteen to twenty-five brushes a minute, so that each station requires only about four seconds or less for its operation, including the intermediate feeding time from station to station.

The improved machine of the present invention includes a combination of elements which enables the larger "knots" of bristles to be picked and inserted into the ferrules, and which provides for the insertion of the plugs and the formation of the completed brush unit, ready for cementing and the insertion of the brush handle. The invention also includes new combinations of elements and new improved elements and structures which are included in the complete machine.

It is one advantage of the new machine that it enables brush units to be produced with bristles which are held in the ferrule not only with the conventional or standard hold or overlap, but also with a shallow hold where the bristles project into the ferrule to the extent of only about $\frac{3}{16}$ of an inch, while the plugs are held within the ferrule to permit the anchoring nails to engage them, the front face of the plugs usually being about flush with the ferrule at its working end. The machine of the present invention provides special mechanisms for enabling this shallow hold to be obtained with a proper relation between the bristles and the plugs in the final brush unit.

With large knots of long bristles such as are used in making a 4" brush a special problem is presented in holding the bristles in proper position at the successive stations and as they are moved from station to station. The improved machine of the present invention has special arranging and holding devices for holding the bristles in proper position during the preliminary stages from the time the knot is picked to the time the plugs are inserted. The improved machine also provides special means for keeping the bristles and plugs in proper relation as they are inserted in the ferrule and drawn into final position therein, including means for keeping the plugs in proper relation to each other.

The improved machine also includes automatic mechanism for supplying two wedges or plugs, for automatically opening up the bristles to form two recesses in the butt portion of the knot of bristles and for inserting the two plugs therein, thus dividing the knot into three spaced parallel sections of bristles, and for thereupon closing the outer bristle sections in such a way as to frictionally clamp the respective plugs against the middle section, while at the same time preventing displacement of either plug from its parallel relation, and for then moving the plugs and knot of bristles into their intermediate and final positions in the ferrule while maintaining the bristles and plugs in proper relation. Since the bristles and plugs tend to form a tight fit in the ferrule which makes difficult the drawing of the bristles and plugs into proper final relation, the improved machine of the present invention provides for decreasing frictional resistance by slightly compressing the ferrule in width and expanding it and increasing its thickness, to facilitate the drawing operation.

The complete brush making machine of the present invention includes bristle feeding mechanism constructed and arranged to feed bristles at a rate and in amounts for supplying a knot of bristles sufficient for a brush of, e. g., up to 4" in width, ferrule feeding means for feeding ferrules at the proper station and from station to station throughout a plurality of successive stations, mechanism for forming the knot and shaping it for preliminary insertion in a ferrule including mechanism incorporated in the knot forming device for expanding the width of the knot to approximately the ferrule width, and mechanism for holding it in proper form within the ferrule at the successive stages, holding means traveling with the bristles from station to station during the early stations to hold the bristles in proper relative position, and a pair of longitudinally shiftable and vertically movable control rails mounted in vertically spaced relation adjacent the ends of the ferrules at a plurality of said stations, with operating mechanism to cause the rails to close on the bristles projecting from the ends of the ferrules at a plurality of said stations and as they are moved from station to station to keep the knots in alignment with the ferrules, this mechanism opening the rails after each stroke and returning the rails to starting position to act on the successive knots of bristles, together with means for limiting the flare of the bristle knots caused by the closing of the rails.

The machine also includes mechanism for forming two superposed recesses in the end of the bristle knot at one of the stations, mechanism for inserting two plugs, one in each recess, and means thereafter for closing the bristles upon the plugs. The machine also includes patters at two of the succeeding stations for pushing the bristle butts and plugs flush with the rear end of the ferrule in two stages, one of these patters having flare control mechanism associated therewith, together with bristle pulling mechanism, including a ferrule expander to reduce the bristle friction in the ferrule as the knot is being pulled therethrough to complete the brush unit; and automatic ferrule retainers constructed and arranged to engage the front end of the ferrule centrally of the curved opposite sides thereof to maintain the position of the ferrule during such pulling operation; and an automatic ferrule register device for squaring the ferrule against said retainers prior to the pulling operation to cause the bristles throughout their width to be pulled evenly; and plug hold-back means movable into the projecting knot at the front edge of the ferrule to maintain the plugs even with said edge during the pulling operation.

The various elements and combinations of elements which go to make up the complete machine are included in the invention, as well as the complete brush making machine.

As a result of the elements and combinations and subcombinations of elements the machine as a whole enables wide brushes of, e. g., around 3½" or 4" or even more, to be manufactured rapidly and automatically; which has not heretofore been possible, so far as I am aware. While the present machine has been devised for making brush units of the larger sizes, it is also well suited to make the smaller sizes, from ½" up.

By way of example the accompanying drawings illustrate apparatus constituting one embodiment of the invention, which will be understood by considering these drawings in connection with the description following. In these drawings:

Figs. 1, 1A, 1B and 1C jointly illustrate the complete apparatus in front elevation;

Figs. 2, 2A, 2B and 2C similarly illustrate the complete machine in plan view;

Fig. 3 shows the automatic bristle feeding and bristle conveyor operating mechanism together with a bristle feed box and knot picker or knot forming mechanism, and is a view partly in side elevation and partly in longitudinal section taken on line 3—3 of Figs. 4 and 2B;

Fig. 4 is a plan view of the apparatus shown in Fig. 3;

Fig. 4a is a detail section taken on line 4a—4a of Fig. 4;

Fig. 5 is another detail section taken on line 5—5 of Fig. 4;

Figure 1:
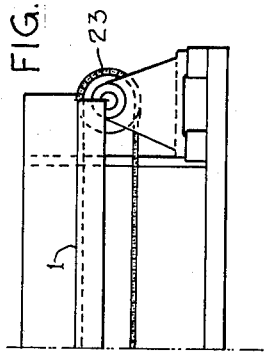
Figure 30C:
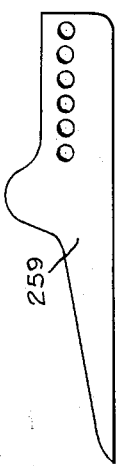
Figures 30A, 30B:
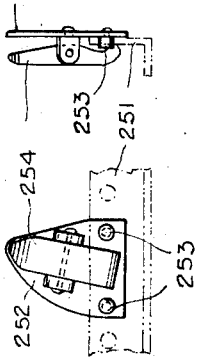
Figure 2:
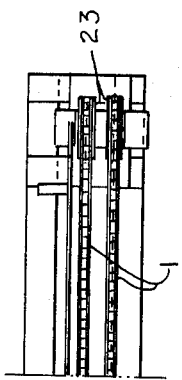

Fig. 6 also shows the same mechanism and is a view in vertical transverse section taken on broken line 6—6 of Figs. 4 and 2B;

Figs. 7 and 8 are respectively a side elevation and front elevation of a pivoted bristle feed bar or finger used in this mechanism, Fig. 7 being a side elevation and Fig. 8 a front elevation;

Figs. 9 and 10 show a detail of the connection between the bristle feed box of this mechanism and the knot-forming pocket of the knot picker into which the bristles are fed, Fig. 10 being a vertical section and Fig. 9 a section on line 9—9 of Fig. 10;

Fig. 10a is a face view of the needle which closes the pocket of Fig. 10;

Fig. 11 shows the knot picker or knot-forming mechanism with the knot carrier disc turned to its upper or transfer position, the disc being shown in front elevation by means of a transverse section taken on line 11—11 of Fig. 12;

Fig. 12 shows the knot transfer mechanism and knot picker disc in side elevation and is a vertical transverse section taken on line 12—12 of Fig. 2B;

Fig. 13 is a plan view of the mechanism shown in Fig. 12;

Fig. 14 is a view of the upper portion of Fig. 11 with certain parts in different positions;

Fig. 15 is a detail vertical section taken on line 15—15 of Fig. 11;

Fig. 15a is a view showing a detail;

Fig. 16 shows a modified form of knot picker pocket;

Fig. 16a is similar to Fig. 14 showing another modification;

Fig. 17 is a fragmentary vertical section taken on line 17—17 of Fig. 12 showing the transfer jaws in open position;

Fig. 18 is a fragmentary view showing the transfer jaws closed;

Fig. 18a is a detail section taken on line 18a—18a of Fig. 18;

Fig. 19 is a view showing the transfer patter operating mechanism in side elevation, being a vertical transverse section taken on line 19—19 of Fig. 1B;

Fig. 20 is a view showing the mechanism of Fig. 19 looking from the right and partly in vertical section;

Fig. 21 is a view similar to Fig. 19 showing the transfer patter timing mechanism and with the parts in a different position, a vertical section on line 21—21 being indicated on Fig. 2B;

Fig. 22 is a view in front elevation of the bristle distributing and station-to-station knot advancing mechanism for arranging the bristles in the ferrules and moving the knots simultaneously with the ferrules;

Fig. 22a is a detail vertical section taken on line 22a—22a of Fig. 22;

Fig. 23 is a view showing the mechanism of Fig. 22 in side elevation being a vertical section taken on line 23—23 of Figs. 22 and 2B;

Fig. 23a is a detail vertical section taken on line 23a—23a of Fig. 23;

Fig. 24 is a plan view of the mechanism of Figs. 22 and 23;

Fig. 25 (sheet 13) is a detail vertical section taken on line 25—25 of Fig. 23;

Fig. 25a is a detail section taken on line 25—25a of Fig. 25;

Fig. 25b is a detail elevation of one of the parts as shown in Fig. 25;

Fig. 26 is an enlarged fragmentary vertical section showing the parts of Fig. 23 which make up the actuating mechanism for imparting longitudinal movement to the mechanism of Fig. 22;

Fig. 27 is a section of this actuating mechanism taken on line 27—27 of Fig. 26;

Fig. 27a is a detail section taken on line 27a—27a of Fig. 27;

Fig. 27b (sheet 14) is a detail section taken on line 27b—27b of Fig. 26;

Fig. 28 shows a card mechanism associated with the bristle distributing and knot advancing mechanism and is a vertical section taken on line 28—28 of Fig. 2B;

Fig. 29 is an enlarged vertical section taken on the same plane as Fig. 28 with certain parts omitted and other parts added;

Fig. 30 is a vertical section taken on line 30—30 of Fig. 29 and shows the card mechanism in front elevation;

Figs. 30a, 30b and 30c (sheet 1) show details;

Fig. 31 is a plan view of the mechanism shown in Fig. 30;

Fig. 32 shows the duplex plug or wedge inserting mechanism in plan view;

Fig. 33 is a partial right side elevation of this mechanism, being a vertical transverse section taken on line 33—33 of Figs. 32, 35, 1B and 2B;

Fig. 34 is a view partly in right side elevation and partly in vertical section taken on line 34—34 of Fig. 35;

Fig. 35 is a front elevation of this plugging mechanism;

Fig. 36 is a vertical central section taken on line 36—36 of Fig. 35;

Figs. 37, 38 and 39 are similar vertical fragmentary sections taken on broken line 37—37 of Fig. 35 to shown the feed of the plugs, the parts being in successive positions in the three figures;

Fig. 40 is a detailed horizontal section taken on line 40—40 of Figs. 37 and 36 showing the plug feed in plan;

Fig. 41 shows the plug feeding fingers in plan and is a horizontal section taken on line 41—41 of Fig. 34;

Fig. 42 is a horizontal section of the plug magazine taken on line 42—42 of Fig. 35;

Fig. 43 is an elevation partly in section of the upper portion of the plug magazine viewed from the right of Fig. 35;

Fig. 44 shows the plug aligner or "shutter" and its operating mechanism in side elevation, being a vertical section on broken line 44—44 of Figs. 32 and 2B;

Fig. 45 is a detail front view of the plug aligner;

Fig. 46 is a detail section taken on line 46—46 of Fig. 32;

Fig. 47 shows the semi-final and final patters and flare control mechanism in plan view;

Fig. 48 shows the final patter mechanism and flare control mechanism in side elevation, being a vertcal section taken on broken line 48—48 of Fig. 47;

Fig. 48a is a detail section taken on line 48a—48a of Fig. 48;

Fig. 48b is another detail section taken on line 48b—48b of Fig. 48;

Fig. 49 is a front elevation of the patter and flare control mechanism shown in Fig. 47;

Fig. 50 is a view of the semi-final patter mechanism in side elevation, being a section taken on broken line 50—50 of Fig. 49;

Fig. 51 is a rear elevation of the final patter and flare control operating mechanism, being a vertical section taken on line 51—51 of Fig. 48;

Fig. 52 is a somewhat enlarged vertical section showing the ferrule and adjacent parts of Fig. 48 with certain parts in different positions;

Figs. 53, 54 and 55 are views similar to Fig. 52 with the parts in still other positions;

Fig. 56 shows the bristle knot pulling mechanism in side elevation, being a vertical section taken on line 56—56 of Figs. 1C and 2C;

Fig. 57 is a vertical section taken on line 57—57 of Fig. 56;

Fig. 58 is a front elevation of the pulling mechanism shown in Fig. 56;

Fig. 59 is a plan view of this mechanism;

Fig. 60 is a somewhat enlarged fragmentary vertical section of the ferrule and adjacent parts shown in Fig. 56 and is also a section taken on line 60—60 of Fig. 58 but with the parts in different positions;

Figs. 61 and 62 are views similar to Fig. 60 with the parts in still other positions;

Fig. 63 shows the plug hold-back mechanism and is a vertical section taken on broken line 63—63 of Fig. 59;

Fig. 64 is a rear elevation of the ferrule register;

Fig. 65 shows an automatic ferrule retainer mechanism in front elevation;

Fig. 66 is a plan view of this mechanism, being a horizontal section taken on line 66—66 of Figs. 65 and 63;

Fig. 67 is a side elevation of the same mechanism looking from the right of Fig. 65;

Fig. 68 is a side elevation looking from the left of Fig. 65, being a vertical section on line 68—68;

Fig. 69 shows the ferrule compressor mechanism in front elevation;

Fig. 70 is a plan view of this mechanism;

Fig. 71 is a side elevation of the same mechanism, being a vertical section taken on line 71—71 of Figs. 69 and 70;

Fig. 72 is a detail vertical section taken on line 72—72 of Fig. 69;

Fig. 73 shows a detail of an operating connection;

Fig. 74 is a schematic view showing brush units in the various positions or stations to which they are moved step-by-step by the ferrule feed mechanism and the knot advancing mechanism;

Fig. 75 is an enlarged longitudinal section of a brush unit with the butt end of the bristle knot projecting from the rear of the ferrule and with two recesses partially opened in this end of the knot to receive two plugs or wedges;

Figs. 76, 77, 78 and 79 are similar views showing the successive steps of inserting these two plugs, Figs. 76, 77 and 78 corresponding approximately with Figs. 37, 38 and 39;

Fig. 80 is an enlarged longitudinal section showing a finished brush unit of the standard hold type as produced by the machine of the present invention and ready for the application of adhesive or cement to be followed by the insertion of the brush handle; and Fig. 81 is a similar view of a finished brush unit having a shallow hold produced on this machine.

Referring now to the accompanying drawings, and particularly to Figs. 1, 1A, 1B, 1C, 2A, 2B, 2C, the general arrangement of the apparatus is somewhat similar to that of the machine of the patent mentioned above, but has important differences therefrom, which make it possible to make wider brushes.

The bristles are placed by hand on a chain bristle conveyor 1 which extends from the right hand end of the machine to approximately its center. The bristles are conveyed in a layer, first through a combing unit indicated generally by reference character A, thence to the bristle feed box 2 where they are fed by a bristle feed bar or finger 3 of the automatic bristle feeding and bristle conveyor operating mechanism B into the knot forming pocket 4 of the knot picker or knot forming mechanism C. The thickness or height of the bristle layer in feed box 2 is not over about 2", as previously mentioned. The bristles are laid on conveyor 1 with their butt ends facing towards the rear of the machine and their flag ends toward the front and they maintain this position throughout the apparatus.

Knot forming mechanism C segregates the bristles from feed box 2 into knots or groups of substantially uniform volume or quantity of bristles for each brush unit. The knots are formed with the brush width dimension vertical and, by a 90° indexing movement of the knot carrier, are turned to horizontal position and aligned with a ferrule which has previously been positioned at station 1 of a series of ferrule or brush unit stations numbered from 1–10 (Figs. 1B, 2B and 2C) and extending in uniform spaced relation to approximately the left or discharge end of the machine. The ferrules are fed from the bottom of a ferrule magazine D first to station 1 and successively to the later stations by means of a reciprocating ferrule feed mechanism E.

At station 1 the knot is transferred from knot forming mechanism C to the ferrule by means of a knot transfer mechanism F (Fig. 2B), and the bristles are patted partially into the ferrule, the extent of this patting movement being indicated in Fig. 74 (sheet 30).

In delivering the bristle knot to the transfer mechanism F, knot forming mechanism C commences the spreading of the bristle knot which is to be distributed uniformly throughout the width of the wide 4" ferrule. The transfer mechanism itself further spreads the knot by means of camming "teeth" mounted on the jaws, and as the knot advances from station 1 through stations 2 and 3 the uniform distribution of the bristles in the ferrule is completed. At stations 3 and 4 the butt ends of the bristles are evened up and the knot is patted somewhat further into the ferrule.

In advancing from station 1 to station 5 the bristles are acted upon by a bristle distributing and station-to-station knot advancing mechanism, which includes two bristle control rails both of which are vertically and horizontally movable, this mechanism being indicated generally by reference character G. This mechanism at stations 1, 2 and 3 distributes the bristles in the ferrules and, at stations 4 and 5, propels the knots onto a duplex knot separator or opener. Associated with this mechanism are means for preventing sagging and limiting the flare of the knot.

Upon reaching the station 5 the opener operates to form two vertically spaced recesses in the rear end of the projecting knot, and a duplex plug or wedge inserting mechanism indicated generally by reference character H operates to insert two plugs, one in each of these recesses. The knot is caused to close on these plugs and a plug aligner or "shutter" rises and shifts the rear surfaces of the plugs into alignment with the rear end of the knot.

Thereupon the brush unit advances successively to station 6 and to be acted upon by semifinal and final patting mechanisms J. The former pushes the butt end of the knot and the two plugs somewhat further toward the ferrule (see Fig. 74). At ferrule station 7 the final patter, with which a flare control mechanism is associated, pushes the knot and plugs flush with the rear end of the ferrule. At or just beyond station 8 any stray bristles which may remain projecting somewhat from the rear end of the brush unit are trimmed off by means of a clipping mechanism, and at station 9 the knot pulling mechanism, indicated generally by reference character J, operates to pull the flag end of the knot forward until its butt end is appropriately positioned near the forward end of the ferrule (see Fig. 80, sheet 30, for a standard hold brush unit, and Fig. 81 for a shallow hold unit).

Associated with knot pulling mechanism J are the ferrule expander, the automatic ferrule retainers and the automatic ferrule register device and a plug hold-back mechanism. All of these have to do with the accurate positioning of the plugs and butt end of the knot near the forward end of the ferrule, this accurate pulling being especially necessary in the production of the shallow hold brush units.

The ferrule expander squeezes or compresses the opposite sides of the ferrule thereby expanding or forcing apart somewhat the flat top and bottom surfaces and relieving the friction of these surfaces on the knot and reducing the pulling force required to move the knot within the ferrule. The automatic ferrule retainers engage the front edge of the ferrule substantially centrally of its curved opposite sides and maintain the accurate positioning of this edge during the pulling operation.

In making the shallow hold brushes, it is especially important that the knot be drawn or pulled forward evenly from side to side of the ferrule so that the butt end of the knot will be located throughout its length at a uniform distance within the ferrule. To this end the automatic ferrule register device presses against the rear end of the ferrule and squares it against the retainers. Also with shallow hold brushes the front face of the plugs must not project beyond the front edge of the ferrule, and the plug-holdback mechanism is provided to prevent this.

Upon leaving pulling station 9 the brush units advance to station 10 which includes a number of brush units with their ferrules in contact with one another so that they may be acted upon simultaneously by a final combing mechanism K, after which they are discharged from the machine.

*Drive and ferrule feed mechanism*

Figure 2A:
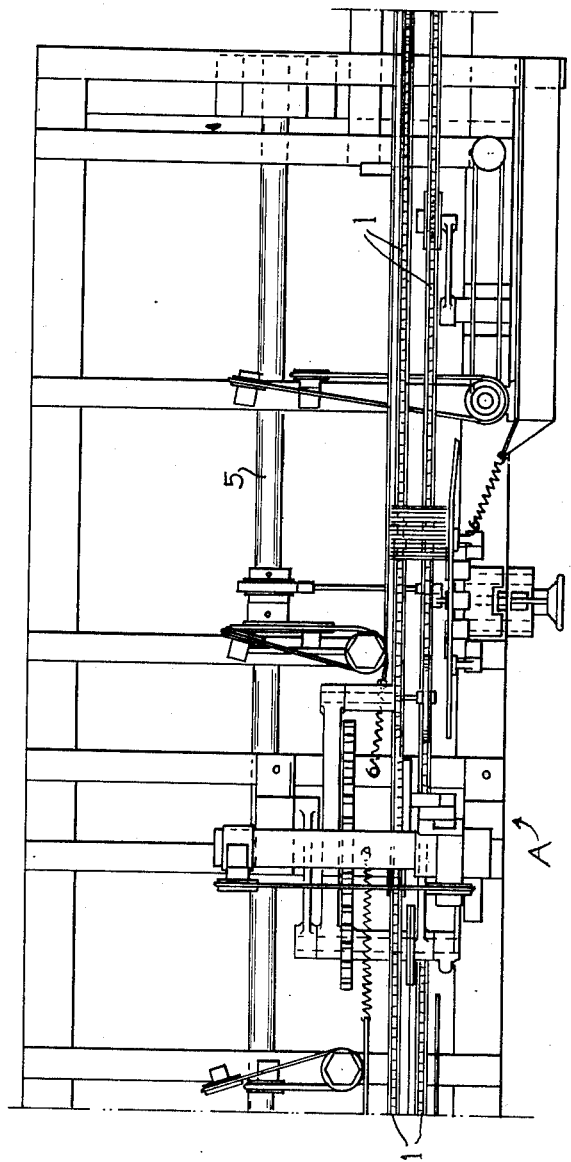

An electric motor M by means of a double pulley and belt connection drives a main shaft 5 which extends longitudinally throughout the length of the machine (Figs. 2A and 2C). This shaft is chain-connected to the high speed shaft of a speed reducing unit 6. The low speed shaft of this unit extends crosswise of the machine and through bevel gearing drives a main cam shaft 7 which extends from the discharge end to approximately the knot transfer mechanism F. The front end of the slow speed shaft of speed reducer 6 carries a small crank 8 which drives the ferrule feed mechanism E. The connection is through an adjustable link 9, a double armed lever 10 pivoted at 11 to the machine frame, and a link 12, to the reciprocating ferrule feed bars 13. These are two spaced parallel bars shown in section in Fig. 23 (sheet 15). They extend from the discharge end of the machine to a point beyond the ferrule magazine D and are supported on suitable friction reducing rollers (not shown). As the feed bars 13 are reciprocated, a pick-up device or shoulder 14 engages the lowermost ferrule in magazine D and advances it to ferrule station 1. The ferrules at the successive stations, 2–10 inclusive, are simultaneously advanced, each to the next station, by means of feed fingers 15 (Fig. 22, sheet 14) which are pivoted to bars 13 and are spring biased to the upper positions shown in this figure. The ferrules are frictionally supported between a lower fixed guide rail 16 (Fig. 23) which is faced with suitable friction material, and a series of spring mounted blocks 17 which, in effect, form a continuous upper rail, these blocks being similarly faced. The lower rail 16 is mounted between feed bars 13 and extends beyond the right end of these bars and is anchored as shown in Fig. 1B to the frame of the machine. This bar is supported in fixed vertical position on a series of friction reducing rollers (one of which is shown at 18 in Fig. 23), these rollers being pivoted on short shafts mounted between bars 13. Blocks 17 forming the upper rail are spring mounted as shown at Fig. 23 on a channel member 19 which is secured to and forms part of the machine frame.

Somewhat to the left of the input end of the apparatus there is a second speed reducer 20 (Fig. 2B), which is driven from main shaft 5 by means of an endless chain 21. The slow speed shaft of this reducer constitutes a second or crosswise cam shaft 22. On the front portion of this shaft there are cams which actuate the automatic bristle feeding and bristle conveyor operating mechanism, while on the rear portion are a series of cams which actuate the knot picker or knot forming mechanism C and the knot transfer mechanism F.

Figure 1A:
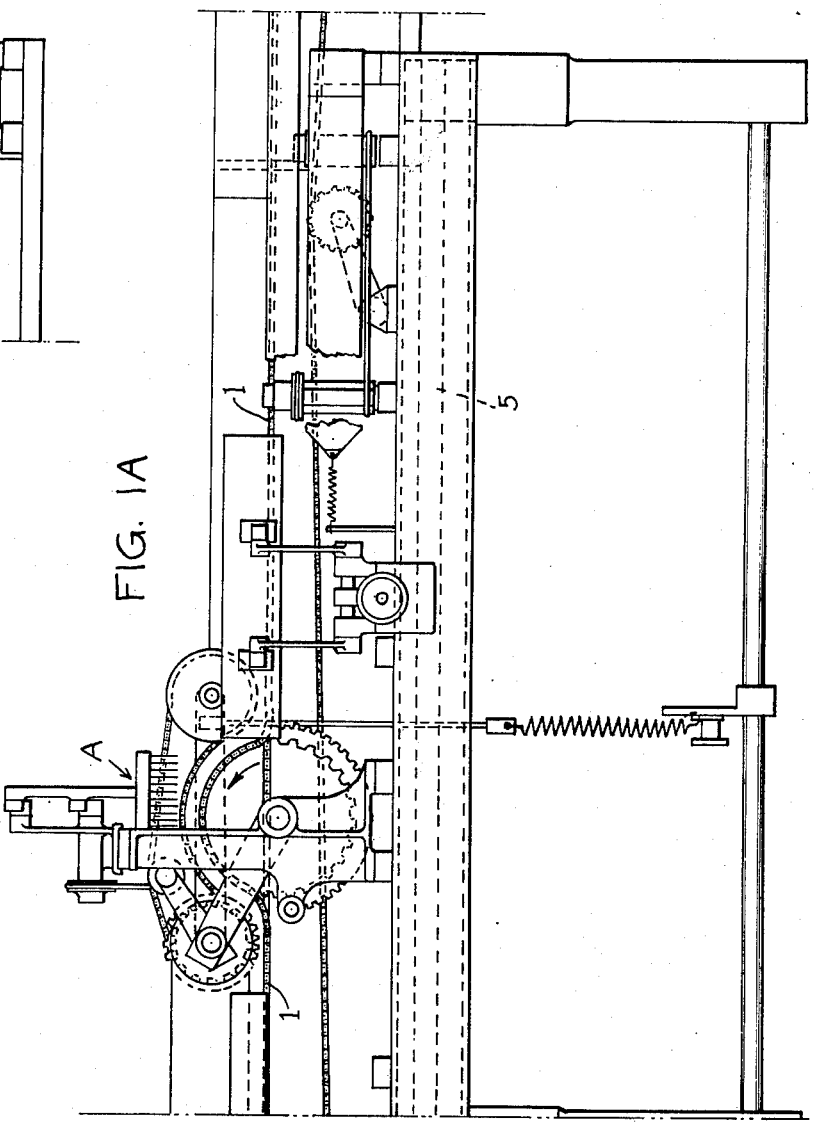

Referring to Figs. 1A and 2A the preliminary combing unit A, which is described in detail in my prior application, is driven from main shaft 5 by means of a suitable endless belt. These figures also show endless belts operating the usual vibrators and a preliminary patter for evening up the bristles of the layer on bristle conveyor 1.

*Bristle conveyor, automatic bristle feeding and conveyor operating mechanism*

The two chains of bristle conveyor 1 are trained around idler sprockets 23 at the right end of the machine and around a pair of driving sprockets 24 located at about the center of the machine on a cross shaft 25 (Figs. 3, 5, 6). Shaft 25 is vertically below a parallel shaft 26 which is intermittently driven by the automatic bristle feeding and conveyor operating mechanism about to be described, shafts 25 and 26 being interconnected by spur gearing 27 so that they rotate at the same speed but in opposite directions. On shaft 26 vertically above sprockets 24 are two similar sprockets 24a which drive a pair of short chains 28 that are trained at their right ends around sprockets 29 (Figs. 1B and 4). The lower reaches of chains 28 bear against the upper surface of the layer of bristles which is carried forward by conveyor chains 1. The bristles are carried on chains 1 in a layer averaging about 1" in thickness and this layer, shown at 30 in Fig. 3 is moved into feed box 2 between chains 28 and chains 1, the height of this box being not more than about 2" for the most satisfactory operation. The details of construction of this feed box are not substantially different than in the machine of my prior application and will not be repeated here.

The bristles are moved forward in a manner to be described into the knot forming or knot picker pocket 4 of the knot holder 32 which is fixed to the side of the knot picker disc or knot carrier 33 by means of suitable screws. A bottom member 31 is adjustably mounted in holder 32 so that the depth of pocket 4 can be varied. At the appropriate time, an arcuate blade-like member or needle 34 moves upward along the cylindrical edge of the knot carrier disc 33 to close the pocket 4 and segregate the needles therein from the mass of bristles in feed box 2 to form a bristle knot.

Edgewise mounted guide plates 35, front and rear, serve to keep the bristles centered on conveyor chains 1 and to guide the ends of the bristles as they move through feed box 2. The feed box has a slot 36 in its roof to allow the feeding motion of the feed bar or finger 3 to take place. This bar is operated with a forward and back and an up and down movement as indicated by the arrows in Fig. 3 by the mechanism about to be described. Feed finger 3 differs from that of the previous machine in that it is pivotally mounted in such a way as to be yieldable in one direction for a purpose which will appear later. This mounting is shown in Figs. 8 and 9, the pivot being indicated at 37 on a carrier member 38. A plate 39 fixed to finger 3 above pivot 37 forms a limiting stop against the edge of carrier 38 rendering the finger rigid when pushing the bristles forward in the box and a tension spring 40 holds the fingers normally in this position but allows the onward moving bristles to move finger 3 forward at one point in the cycle of operation of the feeding mechanism.

The mechanism shown in Figs. 3, 4 and 6 may be divided into two parts, namely, that which operates bristle feed finger 3 to pack the bristles in knot picker pocket 4 at the desired density, and that which operates intermittently the conveyor chains 1 and 28 to bring up bristles into feed box 2 as required by the feed finger. The first part of this mechanism follows substantially that of my prior patent and also that disclosed in Simms et al. United States patent, No. 2,033,258, issued March 10, 1936 assigned to the same assignee as the present application. The present description of this mechanism will therefore be as brief as possible.

First of all it comprises four cams, namely, a raising and lowering cam 41, a feeding cam 42 which imparts horizontal motion, a control cam 43, and a cam 44. Cam 41 actuates a follower roller 45 which is mounted on the rear side of a vertical bar 46 pivoted at its upper end to a supporting arm 47 for the carrier member 38 which supports bristle feed finger 3. Lever 47 is pivoted to the top of an upstanding bracket 48 mounted on the machine frame.

The lower end of bar 46 is forked and arranged to slide on a block 49 which pivots on cam shaft 22. Flat pads 50 are provided on supporting arm 47 which operate between guides 51 (Figs. 1B and 2B) to laterally stabilize arm 47.

Cam shaft 22, as well as cam shaft 7, makes one revolution during each complete cycle of the apparatus which represents the completion of a single brush unit. Bristle feed finger 3 is lowered into the bristle mass within the feed box just before the beginning of each forward feed stroke of the finger and is raised above the mass at the completion of each stroke by the operation of cam 41 and the mechanism just described. The forward and back motion of feed finger 3 is produced by feeding cam 42 against which a roller 52 bears. This roller is carried on a lateral projection 53 of a bell crank lever 54 which is pivoted to the machine frame at 55 and whose horizontal arm is adjustably connected to the upper end of a tension spring 56, the lower end of which is connected to the machine frame preferably by an adjustable bracket as indicated in Fig. 1B.

Near the upper end of bell crank lever 54, a horizontal link 57 is pivotally connected at 58, the left hand end of link 57 being pivoted to the lower end of the feed finger carrier 38. Accordingly as the cam shaft rotates, the tension of spring 56 causes roller 52 to follow the contour of cam 42 which causes carrier 38 and feed finger 3 to swing toward the left and advance the bristles in front of it in box 2 and fill knot picker pocket 4. The degree of compacting of the bristles in this pocket depends upon the tension of spring 56.

Inasmuch as the bristles are placed upon feed chains 1 by hand, there will be a variation in the thickness of the bristle layer on the chains with the result that the density of the bristles in feed box 2 to the right of feed finger 3 will undergo a corresponding variation. The length of feeding the movement of feed finger 3 depends on the point in its advance where the compactness of the bristles overcomes the tension of spring 56. Feed finger 3 is locked in this position by a pawl 59 mounted on the side of stationary bracket 48 and spring biased into engagement with a series of teeth in a rack 60 at the right end of link 57.

A control cam 43 cooperates with a roller 61 on the side of an upright lever 62 which is operatively connected at its upper end to lower and raise pawl 59 into and out of engagement with rack 60. This connection comprises a horizontal link 63 which connects lever 62 with an actuating arm 64 mounted on the rear end of a shaft 65, on the front end of which pawl 59 is fixed (see Fig. 4).

The arrangement is such that feed finger 3 swings forward as cam 42 rotates and when cam roll 52 reaches the low point of cam 42, roller 61 passes off the high portion of control cam 43 allowing a tension spring 66 to move lever 62 to the left thereby causing pawl 59 to engage the teeth of rack 60 and to lock link 57 and feed bar 3 to prevent further feeding movement of the feed bar. The extent of the feeding movement of feed finger 3 depends upon the density of the bristles in front of the finger, the movement of the finger ceasing when it meets a predetermined resistance from the bristle mass. When a large quantity of bristles has been brought up by the previous movement of feed chains 1 and 28, this predetermined resistance will be met when finger 3 has made only a short stroke, cam 42 leaving roller 52 at this point.

The operation of control cam 43 will cause pawl 59 to engage the rack teeth 60 and maintain finger 3 in this position until after it has been withdrawn from the bristles in the feed box. If the density of the bristles gathered in front of finger 3 on a down stroke is comparatively low or thin, a longer feed stroke of the finger will take place before the bristles are compacted to produce the same resistance to the movement of the finger, and control cam 43 will cause pawl 59 to engage rack teeth 60 and maintain the position of feed finger 3 at the end of such long stroke.

The second part of the mechanism shown in Figs. 3, 4 and 6, in accordance with the present invention, utilizes this change in the length of stroke of the feed finger 3 to control the quantity of movement of the bristle feed chains 1 and 28 so as to cause these chains to move into feed box 2 a greater or less quantity of bristles depending upon the length of the previous stroke of the feed finger. In this way the feed chains are automatically controlled to replace bristles in feed box 2 at substantially the same rate at which they are fed by feed finger 3 into the knot picker pocket 4.

In order to resolve this problem, the driving arm for turning the ratchet wheel which actuates the bristle feed chains is oscillated through a constant stroke, and a control device for controlling the engagement of the driving dog with this ratchet wheel is constructed and arranged to be positioned in accordance with the length of the feed finger stroke. The bristle feed chain driving ratchet is shown at 67 and drives shaft 26 through a sleeve shaft 68 (Fig. 6) and a slip or yielding clutch 69, the driven portions of which are keyed to shaft 26.

The oscillating driving arm is shown at 70 and carries the driving dog 71 pivoted at its outer end, this dog being spring biased towards the teeth of ratchet wheel 67. Driving arm 70 is oscillated through a constant stroke as indicated by the full line position and the dot and dash line position of Fig. 3. Arm 70 has a hub 72 (Fig. 6) that is keyed to a sleeve 73, which is arranged to turn freely on shaft 26, and which is provided with pinion teeth at one end. These teeth are engaged by the teeth of a rack 74 which is held in engagement with the pinion teeth by means of a hood 75. Rack 74 extends to the right in Figs. 3 and 4 and is connected to the forked upper end of an operating lever 76.

This is a bell crank lever pivoted at 77 to the machine frame and having a tension spring 78 connected to its second and horizontal arm. Spring 78 maintains a roller 79, midway of lever 76, in engagement with operating cam 44 and serves to move rack 74 to the left whereas the cam moves it to the right. The spring connection shown in Fig. 4a between the forked end of lever 76 and the rack 74 effects a yielding drive for driving arm 70 on its driving stroke when it is moved by the cam. This connection also includes a knurled screw 80 which is tapped into the end of rack 74 to provide for the adjustment of the position of driving dog 71.

The control of driving dog 71 is by means of a shield member 81 which has an extended arcuate surface arranged to engage a roller 82, mounted on the side of driving dogs 71, and hold the dog out of engagement with the teeth of ratchet wheel 67. It is light in mass, so as to be automatically positioned quickly. This shield is approximately semi-circular in side view as shown in Fig. 3 and is mounted on a hub 83 which turns freely on sleeve shaft 68 and which is provided with pinion teeth which are engaged by the teeth of a second rack 84, these parts being held in engagement by a hood similar to hood 75.

It will be understood that movement of rack 84 will oscillate shield 81, and this oscillating movement is produced by means of a link 85 connected to the end of rack 84 and having a connection 86 with an actuating lever 87 which is fixed at its upper end on the rear end of a rock shaft 88, this shaft being mounted in a part of the machine frame. Connection 86 not only includes a pivot for link 85, but provides for the adjustability in a slot in lever 87 to vary the effective length of this lever for a purpose which will presently appear.

Rocking motion is imparted to lever 87 by the upper end of bell crank lever 54. The upper end of lever 54 has a roller 89 which engages a channel 90 cut in the face of a short arm 91 which is clamped on the front end of shaft 88.

Since rack 60 and link 57 are directly connected with lever 54, it will be understood that the angular movement of lever 87 will be stopped at a position which corresponds to that of feed finger 3 at the end of each feed stroke of this finger when it is stopped by the resistance of the bristles. Accordingly the rocking movement imparted to lever 87 will cause, through the linkage described, an oscillation of shield member 81 during each rotation of cam shaft 22. With feed finger 3 at the commencement of a forward stroke, shield 81 is in the full line position shown in Fig. 3 where its front or control edge 92 is to the right of the greatest movement of driving arm 70.

As finger 3 moves forward to the left, control edge 92 also oscillates to the left and, if there were no bristles in feed box 2, would assume a maximum position which may be about 180° from the full line position. Under operating conditions however, with bristles in the feed box, control edge 92 will stop at some position such, for example, as indicated by the dot and dash outline of shield 81. When driving arm 70 oscillates to the right, roller 82 will pass along the edge of shield 81 and drop off the control edge 92 thereby allowing dog 71 to engage the teeth of ratchet wheel 67 and rotate this wheel for the remainder of the stroke of arm 70. The example just given assumes that ratchet wheel 67 will be rotated during about one-half of the working stroke of driving arm 70.

It will be understood that under certain bristle conditions in feed box 2, the rotation of ratchet wheel 67 may be much less, or may be greater.

This mechanism is fully automatic and never requires adjustment when running a particular width ferrule regardless of the ferrule thickness. This means that when running 4", 3½", 3" or 2½" brushes, no adjustment is needed since with all of these the knot holder pocket 4 has the maximum or 2" width (height in Fig. 3). The stroke of feed bar 3 is dependent upon the depth of knot holder pocket 4 rather than on the width of the brush. For example, a 1" brush having a thickness of ⅝ of an inch will require the same feed stroke of finger 3 as a 4" brush having the same thickness, although the latter will require a much larger quantity of bristles. Since the length of the feed stroke of feed finger 3 determines the amount of bristles that must be fed for the next brush, the 1" brush will not require as great an advance of feed chains 1 and 28 even though the feed finger stroke for both brushes is the same. This is accomplished by re-positioning connection 86 in the slot in lever 87. This changes the position of skid 81 with reference to driving arm 70 and allows driving dog 71 to pick up less teeth of ratchet wheel 67 and hence rotate the feed chain sprockets to feed less bristles.

When running brushes below 2" in width the position of connection 86 in the slot should be changed for each size. Accordingly, graduation marks (not shown) for the various widths from ½" up to 2" may conveniently be placed along the side of slot 87.

Referring now to the yielding pivot mounting of feed finger 3 shown in Figs. 7 and 8, when running 4" brushes with thin plugs, a great deal larger amount of bristle is required than when running small brushes, for example, 2½" brushes. This requires that the feed finger be advanced a greater distance in the same time. By introducing the yielding pivoted feed finger, this feeding period has been increased by causing the advance of bristle feed chains 1 and 28 to commence before feed bar 3 has been raised out of the bristles in feed box 2. The oncoming bristles merely move the feed bar forward before and during its withdrawal.

This feed chain advancing mechanism is particularly effective in operation inasmuch as it supplies to the feed box the large amount of bristles required at each cycle when running 4" brushes, and it moves the chains ahead without jerking which would cause dislocation of bristles on chains 1.

*Knot picker and knot transfer mechanisms*

The construction and operation of the knot forming mechanism C is in general like that disclosed in my above mentioned application and reference thereto may be had for the details, only the principal features of the mechanism being touched upon in this specification.

As previously stated, when knot forming pocket 4 has been filled with bristles by the operation of feed finger 3, needle 34 closes the pocket thereby segregating the bristles therein from the bristles in the feed box to form a brush knot or group of bristles, and thereupon knot carrier disc 33 is "indexed," that is, rotated through an angle of 90°, from the position shown in Fig. 3 to that shown in Figs. 11, 12, 13 and 14, to align the knot with the ferrule at station 1 (Figs. 12 and 13), ready to be transferred to the ferrule.

Knot carrier disc 33 is supported on and turns freely on a sleeve shaft 93 which is mounted for rocking movement in appropriate bearings on the machine frame. Keyed to sleeve shaft 93 is the needle carrier 94 which has an outward arcuate surface on which needle 34 is fixed, and a downwardly extending tail portion 95. The indexing movement of disc 33 is imparted to it by needle carrier 94, its tail portion 95 engaging the two spaced and adjustable stops 96 and 97 for this purpose, these stops being mounted on the face of disc 33. Accordingly with the tip of needle 34 uncovering knot carrier pocket 4 as shown in Fig. 3, the first movement of needle carrier 94 is to slide needle 34 along the circular edge of disc 33 until the bristle segregation takes place and the tip of needle 34 closes the bristle pocket.

During this same movement a bristle compressing member 98 which is mounted on the front face of needle carrier 94 (Fig. 11) passes through a slot in the lower or fixed side wall 99 of knot holder 32, the opposite wall 100 of bristle pocket 4 being movable or expansible for a purpose which will presently appear. The forward edge of compressing member 98 engages the bristles and compresses them against the opposite wall 100 (Fig. 11) in order to more securely hold the knot frictionally in the knot holder.

Although Fig. 11 has been cited to show this compression of the knot, it will be understood that the compression takes place while knot holder 32 is still in the first position (Fig. 3). When the needle has closed pocket 4 and the knot has been compressed, tail portion 95 engages stop 96 and the knot carrier 33 commences to move, and is moved, to the ferrule aligning position of Figs. 11, 12 and 13.

Needle carrier 94 and disc 33 are locked relative to one another by means of a latch 101 which is automatically released substantially as the ferrule reaches aligning position. This maintains the compression of the bristles.

Sleeve shaft 93 is operated, to bring about the operation just referred to, by means of the mechanism shown centrally at the upper part of Fig. 2B and by one of the cams mounted on the rear portion of shaft 22. Two other of these cams operate a central shaft 102 within sleeve shaft 93 with a combined rocking and axial motion, this shaft actuating a slender bristle separating finger 103 (Fig. 2B) which serves to separate the flag end portion of the bristle knot, while bristle pocket 4 is still at the position of Fig. 3, from the flag ends of the bristles remaining in feed box 2. Knot carrier locking mechanism for automatically locking carrier disc 33 against rotation during its period of dwell at both the position of Fig. 3 and that of Fig. 11 is provided, this mechanism being indicated generally by numeral 104 (Figs. 2B and 12), and being described in detail in my previously mentioned application and patent.

Referring briefly to Figs. 9, 10 and 10a (sheet 9), there is here shown an improvement in bristle feed box 2 that prevents the loss of bristles during the closing of knot forming pocket 4 by needle 34 while the pocket is still at the position of Fig. 3. As the point of needle 34 pushes its way up through the mass of bristles there is a tendency for the tip of the needle, even though sharp, to push one or more bristles out between the top bridge pawl 105 and wall 100 of the knot holder.

In order to prevent this, a tongue 106 is formed on the lower edge of pawl 105 and constructed and arranged to be received within a groove 107 in the edge of wall 100. The arrangement is such that tongue 106 remains interlocked with pocket 107 until the tip of needle 34 has passed the edge of wall 100 and closed pocket 4. A slot 108 is provided in needle 34 (Fig. 10a) to provide clearance space for tongue 106 on the bridge pawl until it is cammed back by the tapering rib on the needle.

Continuing now with Figs. 11, 14 and 15, the expansible or movable wall 100 is provided on knot holder 32 for the purpose of causing a partial spreading out or expansion of the bristle knot within pocket 4 while the knot is still within the knot forming device. This avoids the necessity of feeding bristles with a layer thickness comparable to the width of ferrules of the larger sizes.

Wall 100 is hinged at 109 to knot holder 32 and is provided with a control arm 110 extending on the opposite side of the hinge and located at the rear of disc 33. Wall 100 is biased to open position as shown in Fig. 14 by means of a tension spring 111, the upper end of which is secured in an eye 112 fastened to the wall, the lower end being secured to a pin mounted in the face of disc 33. The edge of disc 33 adjacent wall 100 is cut away as shown in Figs. 11 and 14 to permit the free operation of the hinged wall.

It is necessary to maintain expansible wall 100 in its normal or closed position while the knot picker pocket 4 is being filled with bristles and until the indexing movement of disc 33 has taken place, and after indexing and the release of the wall, to reset it in closed position before return to the loading position of Fig. 3. As part of this mechanism a T-shaped latch member 113 is pivoted at 114 on the rear of disc 33, the lower arm of this member having a catch 115 arranged to engage the end of control arm 110 and hold door 100 in closed position against the tension of spring 111. A tension spring 116 biases latch member 113 in this position. This latch is tripped at the proper time to release wall 100, by a compound lever 117 which is actuated by the transfer mechanism.

After latch 113 is tripped, the parts will be in the positions shown in Fig. 14. To return door 100 to closed position, its control arm 110 is engaged by a pin 118 which projects laterally from an arm 119 which is supported on a stud shaft 120 mounted on a bracket fixed to the frame of the machine. On the hub of arm 119 is a short arm 121 to which a tension spring 122 is attached. Spring 122 is stiffer than the expansible wall actuating spring 111 so that as arm 110 strikes pin 118, during the return movement of disc 33, the wall 100 is swung back to closed position and the arm 110 re-engaged with catch 115 of latch member 113.

Referring to Figs. 12 and 13 compound latch actuating lever 117 is arranged with two sections each mounted on a projecting stud shaft 123. These two sections are interconnected by a tension spring 124 which tends to maintain two projections 125, one on each of the arm sections, in engagement with one another. To actuate latch 113, the rear end of lever 117 is raised by the upward motion of a rock arm 126 attached to the transfer mechanism. The purpose of the compound construction of arm 117 is to cause positive actuation of latch 113 without applying excessive pressure to it.

During movement of this lever, the two sections operate as one until the forward end of the lever engages and trips latch 113 whereupon a stop screw 127 which is adjustably positioned in one of the projections 125 engages a fixed surface on the machine frame and arrests further downward movement of the forward section. Any further upward motion of the rear section of lever 117 merely causes stretching of spring 124.

The transfer mechanism which is shown in Figs. 12 and 13 is like that of my above mentioned application and patent. A carriage 128 is mounted for lateral sliding movement on a fixed rectangular bar 129, mounted at the top of an upright bracket on the machine frame. The transfer jaws 130, upper and lower, are adjustably mounted on actuating arms 131 which are interconnected by an actuating member 132 pivoted at its opposite ends to the respective arms and keyed at its center to the front end of an operating shaft 133. This is a rock shaft which is mounted in bearing brackets at the opposite ends of carriage 128. The rocking movement of this shaft in opposite directions causes transfer jaws 130 to be opened and closed, the rear ends of arms 131 being slotted to slide on blocks which are pivotally supported on two screws 134 which are fixed to the forward end of carriage 128. Jaws 130 are adjusted so that the right side of the knot (Fig. 17) will be about $\frac{1}{8}$ of an inch to the left of the right side of the ferrule at station 1 (Fig. 13).

The upwardly projection fork 135, which straddles upper jaw 130 as the jaws close and engages the left side of the bristle knot, is adjustable along lower jaw 130 to accommodate knots of different widths. When running a 4″ brush, fork member 135 is adjusted to make the width of the closed jaws considerably larger than the width of the knot picker pocket 4 to accommodate the expansion of the knot brought about by the operation of hinged wall 100 of the knot picker pocket. This is shown in Figs. 13, 17 and 18.

Transfer carriage 128 is moved back and forth to carry jaws 130 from a position adjacent knot packer disc 33 (Fig. 12) to a position adjacent the ferrule at station 1 for the purpose of inserting the flag end of the bristle knot within this ferrule as is indicated in dot and dash lines in Fig. 19. This movement is accomplished by a link 136 which is pivoted at its forward end to carriage 128 and at its rear end to an upstanding lever 137 (Fig. 2B) actuated by one of the cams on cam shaft 7.

Rock shaft 133 has an actuating arm 138 fixed to its rear end to which a link 139 is connected by means of a universal pivot, the opposite or right hand end of this link being similarly connected to the upper end of a lever 140 (Fig. 2B) which is arranged to cooperate with the innermost cam on cross cam shaft 22. A tension spring 141 maintains lever 140 in engagement with the cam. Arm 126 which actuates lever 117 to trip the latch for hinged wall 100 is fixed to jaw closing shaft 133.

In operation, substantially at the instant that knot forming or knot picker pocket 4 is indexed to its upper position (Fig. 11), link 139 rocks shaft 133 to close transfer jaws 130. Before these jaws are fully closed, the forward end of compound lever 117 engages latch 113 and snaps the hinged expansible wall 100 open. The bristles expand to the left as shown in Fig. 4 under their own resiliency and the compression produced by compressing member 98 so that the jaws close on a bristle knot which has been expanded in width somewhat as shown in Fig. 18. A very substantial expansion or spreading of the knot width is accomplished in this way since the release of door 100 removes restriction of the width of the knot by knot forming pocket 4.

In order to assist in re-distributing the bristles evenly throughout the width of the knot as transfer jaws 130 close upon it, these jaws may be provided with camming teeth 143 (Figs. 18 and 18a). These comprise comparatively thin metal plates secured by screws or otherwise to the rear sides of both upper and lower jaws 130. Teeth 143 are pointed as shown in Fig. 18 and slope in opposite directions from the points in nearly symmetrical curved outlines so as to crowd the bristles in both directions. The points of the teeth are preferably offset slightly as shown in Fig. 18a and they are also preferably offset laterally of the knot as shown in Fig. 18.

The positions of these two teeth on the two jaws laterally of the knot can be varied to change the distribution of the bristles as desired. It has been found that in redistributing the bristles for a 4" ferrule, a setting about as shown in this figure is effective to provide a uniform bristle distribution, the points of the teeth being located somewhat to the right of the center of the closed knot forming pocket 4. The right side of the ferrule at station 1 is the basing point for their adjustment.

Natural bristles are difficult to spread or redistribute in the knot. However, the physical characteristics of nylon bristles are such that they will flow or spread more easily. Accordingly, for nylon bristles, a knot holder may be used wherein the width of its mouth corresponds with the height of the bristle feed box 2, the side walls, one or both, being undercut just inside the mouth so as to substantially increase the width of the pocket. Two such modified forms of knot holder are shown in Figs. 16 and 16a. In Fig. 16, knot holder 32a has a straight fixed wall 99a which is slotted so that the compressing member 98 may operate through it.

The opposite side wall 144 is not expansible but fixed like wall 99a and is undercut as indicated at 145 immediately within the mouth of the bristle pocket 4a so that the average width of this pocket is substantially greater than the width of the mouth. The adjustable bottom 31a of the pocket has a downward sweep opposite this undercut portion 145 so as to compensate for the thickness of the undercut portion of wall 144. In Fig. 16a, knot holder 32b is like holder 32a except the arrangement is reversed, bottom or right hand side wall 99b being undercut and the top or left wall 144a being straight. Also adjustable bottom 31b is curved downward on the right side instead of on the left.

In operating on 4" ferrules with nylon bristles either of these modified forms of knot holders may be used, the knot being spread or widened in the kot holder itself while it is at the unloading position, the bristles being packed and distributed therein by the bristle feed finger 3 of the bristle feeding mechanism. Consequently, the additional spreading required after transfer of the knot to the ferrule, when operating with natural bristles, is reduced and under certain circumstances may be substantially eliminated.

It will be understood that knot holders 32a and 32b, may, if desired, have both side walls 99a or 99b and 144 or 144a undercut, instead of only one of these walls, thereby widening the knot at both sides from the mouth of the knot holder.

Referring now to Figs. 19–21, substantially as the flag end of the knot is inserted in the ferrule at station 1 by the transfer jaws 130, a patting plate 146 of a transfer patter mechanism 147 contacts the butt end of the bristle knot and commences to push it forward in the ferrule. The butt end of the knot is advanced until it is flush with the rear of the transfer jaws as indicated in Figs. 74 and 19 (dotted position). Patter mechanism 147 is of the vibrating and parallel-motion type such as is described in detail in my previously mentioned patent and application.

The vibratory motion is imparted by an endless belt 148 from the main shaft 5, this belt being trained around a pulley on a short longitudinal shaft 149 which also operates the patters at stations 3 and 4 to be referred to later. Shaft 149 rotates in bearings mounted on brackets 150 which extend forwardly at each end of the cross bar of a T-shaped support 151 (Fig. 1B).

Transfer patter mechanism 147 is moved from the full line position of Fig. 19 to the dot and dash line position (see also Fig. 21) and then advanced to pat the bristle knot flush with transfer jaws 30 by means of a cam 152 on main cam shaft 7, which also retracts the patter. This cam, through the mechanism shown in Fig. 21, actuates an upright lever 153 at the upper end of which a link 154 is connected, the forward end of this link being attached to patter mechanism 147.

When running 4" brushes which are 1" thick, it is necessary that the patter plate be very much wider than in the machine of my previously mentioned application and patent. A wide plate mounted directly on the previous mechanism however, would strike the top of knot picker disc 33 as mechanism 147 moves back. To remedy this condition plate 146 is arranged to automatically ride and clear disc 33. Arms 155 and 156 of the patter operating mechanism have been curved at their lower ends to allow patter plate 146 to pivot upwardly about pivot 157 at the lower end of arm 156. Also plate 146 is mounted on a U-shaped support 158 (Figs. 20 and 21), and the lower end of arm 155 is operatively connected with one of the legs of this bracket by means of a pin 159 and a cooperating arcuate slot which has its center at pivot 157.

An arm 160 is mounted on the other leg of the U-shaped support, and connected to this arm is a tension spring 161 which tends to maintain the top of the arcuate slot against pin 159. Arm 160 has a roller at its end which engages a cam surface 162 of a stationary cam, mounted on a suitable fixed bracket, as mechanism 147 returns to the rear after completing a patting movement. This imparts an upward lift to plate 146 to clear disc 33, as may be understood from Fig. 19, a reverse operation taking place on the forward movement of the patter mechanism.

Bristle distributing and knot advancing mechanism

The spreading of a bristle knot so that it is evenly distributed in a 4" ferrule to produce a uniform brush is difficult to accomplish, as is also the maintenance of the bristles in distributed position in each ferrule as the ferrules and knots are advanced step-by-step from stations 1–5 where the plugs are inserted. The bristle knots being very loose in the ferrules complicates maters.

A solution of these problems has been found in the provision of simultaneously movable bristle control rails, the lower rail being provided with bristle camming or crowding teeth and both upper and lower rails being movable toward and away from each other to close on or clamp the bristle knots, and both also being shiftable at the same time as the ferrule feed bars to advance the compressed knots and their respective ferrules from station to station. Upper rail 163 is equipped with yielding thin plates (Fig. 25) to engage the knots at some stations, and lower rail 163 with camming teeth, both of which will be explained later. At each cycle of operation these rails grip the knots at the several stations until the next knot from the knot picker is transferred to and inserted in the next ferrule at station 1. Approximately at this point, or a trifle sooner, the rails automatically open and quickly return to the right to their original position, close again and grip the new knot. For a given brush unit this cycle repeats itself at each station until the unit reaches plug inserting station 5.

The two bristle control rails are shown at 163. These are two plates of heavy gauge metal of equal length and long enough to extend throughout ferrule stations 1—4. Rails 163 are supported on and actuated by a carriage 164 movable longitudinally a distance slightly greater than the ferrule station spacing which is 6". These rails are supported in vertical edgewise spaced relation slightly behind the ferrules at stations 1—4. Rails 163 are opened and closed by movement substantially in a vertical plane by means of two pairs of rock arms.

The rock arms which support upper rail 163 are indicated at 165 and are of approximately inverted U-shape in side view as may be seen in Fig. 23. The lower ends of the front legs of these inverted U-shaped arms are clamped adjacent the opposite ends of a rock shaft 166 (Fig. 22). U-shaped arms 165 extend across the top of carriage 164 and channel bar 19, upper rail 163 being provided with tangs (Fig. 25) which are secured by screws, or otherwise, to the lower ends of the rear legs of these arms. The various sections of the inverted U-shaped arms 165 are adjustably mounted upon one another so as to provide the required adjustment of the position of the lower edge of upper rail 163 with respect to the ferrules of the several stations and the bristle knots in these ferrules.

The lower control rail 163 is somewhat similarly mounted, although its two supporting arms are of somewhat different shape and extend beneath ferrule feed bars 13. The rock shaft which carries these two arms is shown at 167 and the arm at the right end of this shaft at 168. This arm is L-shaped in side view, lower bristle control rail 163 being provided with a tang which terminates in a support 169 which bolts to the end of arm 168.

The left supporting arm 170 has a downward offset in its horizontal portion shown in dotted lines in Fig. 23, and the left end of lower rail 163 has a longer tang which terminates in a support 171 somewhat similar to support 169. It will be understood that the sections of arms 168 and 170 are constructed with adjustable connections in order to allow proper adjustment for the upper edge of lower rail 163.

Bristle control rails 163 close under spring pressure, being moved to closed position by a compression spring 172 which is mounted between two spaced parallel arms 173 fixed respectively on rock shafts 166 and 167. These shafts are made to turn in unison by means of two short arms 174 and 175 (Fig. 22a) which are clamped respectively to shafts 166 and 167 and which are interconnected by means of a pin 176 mounted in arm 175 and projecting laterally to engage a groove 177 in arm 174.

Control rails 163 remain in closed position during most of the operating cycle of the machine as may be seen from the contour of their operating cam 178 (Fig. 23). This cam is fixed to cam shaft 7 and is preferably of the adjustable type as indicated so as to permit variation of the period during which the rails are held open. Cam 178 contacts a roller on the upper end of an arm 179 which is biased against the cam by a tension spring 180.

The lower end of this lever is clamped on the left end of a longitudinal shaft 181. On the right end of this shaft is a shorter lever 182 and the upper end of this lever is connected by a link 183 to the lower arm of a two-armed lever 184 (Fig. 22), the hub of which rocks freely on a short horizontal shaft 185 which itself is mounted for rocking movement in a bracket mounted on the machine frame below carriage 164.

The upper arm of this lever carries an adjustable screw 186, which moves forward and contacts the rear surface of a short bar 187 which is mounted in edgewise position at the tops of two arms 188 which are pinned to shaft 185 so as to rock in unison. The front surface of bar 187 is arranged to engage a spherical roller 189 which is mounted at the lower end of an actuating arm 190 for the control rails. This arm is keyed at its upper end to shaft 167 which carries the supporting arms for the lower control rail 163.

Thus contact of screw 186 with the rear of bar 187 moves this bar forward to contact spherical roller 189 which in turn moves the lower end of actuating arm 190 outwardly thereby simultaneously rocking the two interconnected shafts 167 and 166 to open the two bristle control rails 163 in which position they are completely disengaged from the several bristle knots as shown in Fig. 25.

When the roller on the end of arm 179 moves off the high portion of cam 178, the upper arm of double armed lever 184 and screw 186 return to the full line position of Fig. 23 and bar 187 moves back accordingly, thereby allowing rails 163 to return to closed position in engagement with the bristle knots as shown in Fig. 23. Spherical roller 189 does not follow bar 187 inasmuch as the movement of actuating arm 190 is limited by means of a stop screw 191 which contacts a part of the carriage 164 to limit the closing movement of rails 163.

Screw 186 may be adjusted to regulate the distance the control rails may be opened. Edgewise mounted bar 187 coextensive with the travel of carriage 164 is somewhat longer so that opening and closing of the rails is independent of the position of their supporting carriage. A handle 192 is fixed to the right end of rock shaft 185 so that the bristle rails may be manually opened for adjusting and "setting up" the machine.

As previously mentioned, carriage 164 moves longitudinally of the machine from a right hand position where rails 163 span ferrule stations 1—4 (Figs. 22 and 24) to a left hand position where they span stations 2—5 (Fig. 25 and dotted lines of Figs. 22 and 24). To provide for this travel and render carriage 164 movable with as little friction as possible, it is supported on two double flanged rollers 193 which roll on a round bar rail 194 secured by screws or otherwise adjacent the front edge of a rigid horizontal plate 195. This is securely mounted on an upright supporting pillar which is adjustable from front to rear on the machine frame.

In order to maintain carriage 164 in upright position, that is, to prevent tilting movement about rail 194, a pair of spherical rollers 196 (Fig. 23) are arranged to roll on opposite sides of the vertical web of a horizontal angle bar 197, this bar being securely mounted in parallel relation to plate 195 and vertically below its outer edge. Rollers 196 rotate on vertical pivot pins secured to carriage 164 and are adjustable by means (not shown) to engage channel 197 substantially without play so as to accurately maintain the position of the carriage.

For the purpose of preventing carriage rollers 193 from being displaced from rail 194, two spherical rollers 198 (Fig. 23a), turning on horizontal axes, are arranged to contact the lower surface of plate 195 immediately below this rail.

Roller 198 is mounted on the inner end of a bracket 199 which is pivoted to the carriage frame and has an adjusting screw 200 which engages the lever outwardly of its pivot so as to adjust roller 198 into close contact with the surface of the plate.

A long tension spring 201 connected between carriage 164 and the machine frame tends to move the carriage towards its right hand position. Carriage 164 and bristle rails 163 are moved to the left hand position simultaneously with each feeding movement of ferrule feed bars 13. The carriage is then latched in the left hand position to be released a moment later and returned to the right hand position by spring 201. The mechanism for bringing about such operation is about to be described but before doing so a general statement of the cycle of operation of the control rails will be given.

As the transfer patter completes its patting of a knot into a ferrule at station 1 and commences its return movement control rails 163 close by cam 178, Fig. 23 showing the position of the cam at this instant, carriage 164 being at its right hand position. This closing action is rapid because a feeding movement of ferrule feed bars 13 is imminent, operating crank 8 (Fig. 1C) being approximately at the bottom of its stroke. The arrangement of the driving mechanism for carriage 164 is such that feed bars 13 commence to move the carriage at the same instant they commence to move the ferrules at the respective stations, and feed bars 13 continue to advance carriage 164 until the end of their stroke at which instant the latching of the carriage for a brief interval takes place.

Control rails 163 remain closed on the bristle knots during this movement and, in fact, remain closed for a short period thereafter, or until the bristle knot opener or separator at station 5 has been actuated to open the two recesses in the butt ends of the knot and the two plugs have been inserted in these recesses and the bristles closed on the plugs and, further, until the transfer jaws 130 have inserted the succeeding knot in the succeeding ferrule at station 1.

Thereupon, while the transfer patter is operating to urge this new knot into the ferrule, cam 178 suddenly opens the control rails and immediately thereafter trips the latch referred to, allowing a rapid return of carriage 164 to its right hand position, being stopped by an air check cylinder 202 (Figs. 22 and 23). This motion is so fast that although the carriage does not leave its left hand position until after feed bars 13 have commenced their right hand stroke, carriage 164 overtakes and passes feed bars 13 and reaches its right hand position before they do.

Since carriage 164 must start its return motion later than ferrule feed bars 13, and consequently must return at a greater speed, it cannot be connected directly to feed bars 13. It is operated by the mechanism shown in Figs. 26 and 27. A driving block 203 is slidably supported upon a horizontal bar 204 which is appropriately mounted on a fixed part of the machine such as the upright supporting bracket for carriage 164 shown in Figs. 22 and 23. This block is moved back and forth by a driving lug 205 projecting downward from a bracket 206 which is adjustably positioned on the front ferrule feed bar 13.

Control rail carriage 164 is provided at its rear with a driving arm 207 which extends upward at an angle of about 30° and at its end carries a bracket 208 which pivotally supports a carriage driving pawl 209, biased by means of a spring 210 to the dot and dash position shown at the left of Fig. 27. However, when carriage 164 is in its right hand position, carriage driving pawl 209 is moved downward tensioning spring 210, by means of a pin 211 mounted at the lower end of a lever 212 which is pivoted on a fixed part of the machine and biased by a spring 213 (Fig. 27b) against a stop plate shown in this figure.

As ferrule feed bars 13 commence their feeding movement, the end of driving block 203 engages driving pawl 209 which is held in its down position by pin 211, as just explained and carriage 164 commences to advance with the feed bars. As driving block 203 reaches the end of its stroke toward the left, carriage 164 is temporarily latched to prevent its return movement, as previously mentioned, and as driving bar 203 starts its return movement toward the right, driving pawl 209, being released, moves to the dot and dash position of Fig. 27 under the influence of spring 210.

The mechanism which latches carriage 164 in its extreme left hand position is shown in Figs. 24, 23 and 2B. A latch member 214 is engaged by a lug 215 mounted on carriage 164, latch 214 being pivoted on the machine frame at 216 and being biased by spring 217a towards latching position. Immediately above latch 214 on pivot 216 is a tripping member 217 having a finger which engages a pin 218 projecting upwardly from the latch member to rotate the latch about its pivot and withdraw it from lug 215 and release the carriage.

Tripping member 217 is actuated by a link 219 which is connected to the upper end of a long upright lever 220 (Fig. 23) and this lever is moved toward the right by contact of a pad 221 on lever 182 with an adjustable screw 222 on the lower portion of lever 220. Consequently at the end of the opening movement of control rails 163, cam 178 continues the rearward movement of lever 179 slightly further and actuates lever 220 to cause the tripping of latch member 214 whereupon control rail carriage 164 returns quickly to its right hand position under the action of spring 201.

As previously mentioned, carriage 164 reaches the end of its return movement ahead of ferrule feed bars 13. Driving pawl 209 overtakes and passes driving block 203 when the block is approximately halfway on its return stroke but the pawl, being in its up position, passes over the block. When driving pawl 209 reaches the end of its stroke, it is swung down to the full line position of Fig. 27 by pin 211, spring 213 (Fig. 27b) of lever 212 being stronger than spring 210 of the pawl. Pawl 209 being in its down position when sliding block 203 catches up with it the rounded forward end of this block cams pawl 209 tensioning spring 213 and rocking lever 212 which is arranged to permit this movement. Driving pawl again snaps down in front of the left hand end of driving block 203 and is ready for the next cycle.

It was mentioned before that the upper control rail 163 is provided with yielding thin metal plates to engage the bristles and that lower rail 163 is provided with bristle camming teeth. These are shown in Fig. 25. The camming teeth are indicated at 223 and they are preferably formed in the upper edge of sheet metal plates such as shown at 224 in Fig. 25b. Each of these plates may be provided with one or more such teeth, and a plate is mounted on the rear of lower control rail 163 at the first two bristle knot locations at the right hand end of these rails.

Consequently, when control rails 163 close at their right hand position, the teeth of one of these plates 224 engages the bristles of the knot on the ferrule at station 1 and the teeth of the other plate engage the bristles at station 2, their function being to cam or crowd over the bristles towards the left in the ferrules so as to complete the distribution of the bristles by the time the knot arrives at station 3 where a patter mechanism 224a (Figs. 1B and 74) on shaft 149 operates to pat the bristles into alignment.

The number, arrangement, shape and position of these teeth depend upon the bristle distribution desired. The position of the teeth can be varied by shifting plates 224 lengthwise of lower rail 163, and the number and shape of the teeth can be varied by removing one plate or set of plates and replacing it by another.

The plates are movably mounted and adjustably positioned on the lower rail by means of three bayonet slots 225 which engage shouldered rivets projecting from the rear face of lower rail 163. Plates 224 are locked in position by means of a pin 227 fixed at the end of a resilient tongue 228 on the lower edge of each plate. Pin 227 will be received in any one of a series of holes 229 on the rail.

Lower rail 163 is also provided with a series of short needles 230 at each of the two bristle knot positions towards the left, of which more later.

The bristle knot is thickest at station 1 before the closing action of the control rails and camming teeth have crowded over the bristles towards the left hand portions of the ferrules. Consequently, instead of providing upper control rail 163 with a straight lower edge parallel with the edge of the lower rail, the upper rail is cut away somehat as shown in Fig. 25 and the bristle knots are contacted by a series of yieldably mounted thin metal plates 231 which are arranged at the first three bristle knot locations. The lower edges of these plates are substantially in line with the lower edge of rail 163 at the extreme left knot location, when the bristle rails are opened as shown in Fig. 25.

Each of plates 231 is vertically slidable on the rear surface of upper rail 163, upward movement of each plate being resisted by a curved wire spring 232, the ends of which are hooked beneath pins 233 projecting from the rear, and the central portion being engaged by a pin 234 fixed to plate 231. The plate side edges slide beneath the heads of shouldered rivets 235 and the central portion is engaged by a smilar rivet 236 within a bayonet slot through the plate, the lower end of this slot engaging pin 236 to limit the upper position of the plate. An elongated button member 237 extends through a slot in the top of an upward extension from the edge of plates 231 and by rotating this button into alignment with the slot the plate may be removed and replaced.

Plate 231 at the third bristle knot location may be provided with scalloped teeth at its lower edge to co-act with the short teeth 230 on the lower rail in engaging the bristles at ferrule station 3 when the rails are in their extreme right position (being shown at the left position in Fig. 25), in order to better grip the knot as it is pushed at the next feeding movement, onto two stationary separators or tines 238. These form a part of the recess-forming mechanism at ferrule station 5 which prepares the recesses in the butt end portions of the knot ready for the insertion of the duplex plugs at station 5. While the separator tines are being inserted in the knot at station 4, an extension of patter 224a continues the patting to assure alignment prior to inserting the plugs.

Short needles are also provided on upper rail 163 at the extreme left bristle location, all of these short needles and the scalloped teeth of the left hand spring plate 231 serving to maintain the needles in their distributed position and in an orderly arrangement in the ferrules as they are advanced to station 5.

*Bristle knot supporting and flare control— Ferrule stations 1–6*

Since the bristles of 4″ brushes have considerable length, the butt end portions overhang the rear of the bristle control rails 163 for some distance creating a very considerable tendency to sag. This has been overcome by certain parts which have been added to the mechanism referred to in my prior application as the card mechanism. This comprises an elongated bar 239 rectangular in cross-section (Fig. 29) slidable or shiftable lengthwise in a supporting head member 240 which is mounted at the end of a horizontal pivoted arm 241 (Fig. 28), this arm being pivoted at 242 at about the cross-wise center of the machine (Fig. 2B) and controlled by a cam 243 on cam shaft 7 to raise and lower head member 240.

The motion imparted to bar 239 by this mechanism is similar to the motion of control rail carriage 164. That is, the bar is biased to a right hand position, which in the present machine covers ferrule stations 1—5 by means of a long tension spring 244, the front end of which is connected through a cord 245 passing over a pulley 246 to bar 239 and biasing it toward the right.

As in the case of the control rail carriage, bar 239 is moved toward the left by the feeding movement of ferrule feed bars 13, a lug 247 (Fig. 29) on one of these bars being arranged to engage a horizontal extension 247a on bar 239 and moving it toward the left until a catch 248 (Fig. 30) engages a latch 249 pivoted on head 240 which holds bar 239 in the extreme left position spanning ferrule stations 2—6. Then when head 240 drops to the dotted position of Fig. 28, the left end of latch 239 is engaged by an adjustable stationary trip 250 which releases latch 239 and allows bar 239 to return rapidly to its right hand position under the action of spring 244.

In the machine of my prior application, the purpose of the carding mechanism was to overcome the tendency to distort the bristle knots projecting from the ferrules which was caused by the drag of the upper bristle control rail which, in that machine, was stationary instead of movable as in the present machine. This tendency to drag and distort the knots was also produced in that machine by the fact that the bristle control rails did not open as in the present apparatus, but at all times exerted a frictional drag on the bristle knots.

In the present machine, the purpose of this mechanism is not to prevent distortion of the knots by the rails, because rails 163 being movable and openable do not produce such a tendency, but its purpose is to support the overhanging butt end portions projecting from the rear of the bristle control rails to prevent sagging, and to limit the flare of the sides of the knots at the several ferrule stations so as to keep the width of the knot within bounds while the bristle control rails maintain the alignment of the knots during the station-to-station movement.

For the purpose of supporting the projecting bristle knots, the card bar 239 is provided with what is called a "riser" 251, this being an angular metal strip fixed to the top of the bar and extending from its right end throughout two knot locations and then tapering off and terminating at about the center of the third knot location. As shown in Fig. 29, "riser" 251 is at some distance behind the bristle control rails 163 and supports the projecting knot not far from its end, elevating it into alignment with the ferrule.

The pressing action on the knots of the bristle control rails tends to make them flare at the sides and cause friction in entering the ferrules under the action of the patters. Accordingly, on this "riser" 251 at the first two bristle knot locations, is a pair of "gatherers." These are metal members shown in detail in Figs. 30a and 30b (sheet 1). The curved edges of these "gatherers" are constructed and arranged to contact the sides of the bristle knots as shown in Fig. 30 and restrict their tendency to flare out and keep them substantially in alignment with the sides of the ferrules.

As shown in Figs. 30a and 30b, these flare control members 252 each have a pair of projecting pins 253 which are received in holes arranged near the upper edge of "riser" 251. They are held in place by spring biased pivoted grip members 254. There is a series of the holes along the edge of "riser" 251 to permit adjustment or positioning of these "gatherers" to produce the amount of flare control desired.

At the beginning of the third knot location the "riser" 251 tapers downwardly to enable the thickness of the knot to spread upwardly and downwardly as the knot passes onto stationary tines 238 of the plug recess forming mechanism. As the knot moves from station 3 to station 4, the bristles are supported to a less and less extent and the support is placed closer to the bristle control rails in order to permit the vertical spread just mentioned. This support is provided by an upright member 255 at the front edge of the angular member forming "riser" 251. At station 4 there is a still narrower bristle supporting member 256.

At the third knot location, card bar 239 carries its first bank of needles 257. These serve to keep the bristles in alignment as the knot passes onto the tines 238 in the movement from station 3 to station 4. The needles are continued at stations 4 and 5 for the same purpose, and at the extreme left knot location on bar 239 there is a "gatherer" plate 258 which in effect produces the same result as "gatherers" 252 in limiting the flare of the knot width to facilitate patting when the knot arrives at semi-final patter station 6 after receiving the plugs at station 5. When needles 257 at station 5 pass through the knot after it has received the plugs, "gatherer" plates 258 limit the width of the knot when it is patted at station 6.

As will be seen later the tines 238 are adjustable relative to one another so as to vary the thickness of the middle layer of bristles which is between these tines. Consequently, the sloping end of "riser" 251 is made adjustable by the addition of a tail piece 259 (Fig. 30c, sheet 1). In order to hold this in place, the pins 253 for the extreme left "gatherer" 252 are of sufficient length to pass through the holes in tail piece 259 and hold it in position against the side of "riser" 251. By lateral adjustment of its position, the sloping surface of tail piece 259 is made to correspond with the sloping lower surface of the lower tine 238 when the card bar 239 is shifted to its left hand position, thereby to support the horizontal center line of the bristle knot at the horizontal center line of the tines 238, where these tines are adjusted wide apart for a thick middle layer of bristles, or close together for a thin middle layer.

*Duplex plug inserting mechanism*

In contrast with the machine of my prior application which inserted a plug made of laminated paper or the like in a single opening in the knot, the present machine opens two vertically spaced recesses in the butt end of the knot and inserts two preformed plugs, one in each recess, these plugs being made of wood or any suitable material. The present machine also will insert only a single plug if desired. It is an important feature of the new machine that the plugs are not fed into the path of the bristle knot at the plugging station and the knot then moved to enclose the plug, but on the contrary, the knot is first advanced to the plugging station and while the knot remains stationary at this station, the recess forming devices which have been inserted in the knot at the preceding station are actuated to open the two recesses in the knot to receive the plugs, and that the plugs are then moved into these recesses and the bristles closed on the plugs.

Referring to Figs. 32-43 inclusive (sheets 18-20) two columns of preformed plugs are manually stacked in an upright duplex magazine indicated generally by numeral 260. The two stacks are placed one behind the other and arranged so that the plugs can be automatically fed from the bottom of each stack into the two recesses formed in the opened bristle knot at station 5 (Fig. 37), a plug from the front stack becoming the upper plug in the brush unit and a plug from the rear stack the lower plug. The two plugs divide the knot into three bristle layers, upper, middle and lower, and this formation is retained in the finished brush unit (Figs. 80-81, sheet 30).

Magazine 260 is constructed and arranged, as will be presently described, so that it can be quickly adjusted to handle plugs of any thickness and length within the range of the machine. The plug thickness varies according to the proportion of bristle and plug specified for the particular brush being run on the machine. The thickness of the plug becomes the height in stack 260. The magazine adjustments just referred to also include the positioning of its various parts so that the plugs will be deposited in the knot recesses in properly spaced relation to each other, and in proper relation to the bristle knot and ferrule both vertically and laterally, as well as at the proper distance behind the ferrule.

The mechanism for forming the plug receiving recesses in the projecting knot, operates in conjunction with the plug inserting mechanism, and is mounted upon it, and will be described before taking up the details of the inserting mechanism.

The recess forming mechanism comprises two bristle separators, each consisting of a stationary section (one of the two tines 238), and a movable section 261. The two stationary sections or tines 238 extend from a point just to the right of the ferrule at station 4 to a point just to the left of the ferrule at station 5 (Fig. 32). Each movable section 261 is approximately ½ the length of its stationary section 238, as may be seen in this figure, and extends from a point somewhat in advance of the ferrule at station 5 substantially to the end of its stationary section.

Movable section 261 for the upper stationary section 238 is recessed into the upper surface thereof, the lower movable section 261 being similarly recessed in the lower surface of the lower tine. These parts are so fitted together and adjusted that when the movable separator sections 261 are closed, their surfaces are smooth and continuous with the surfaces of the stationary sections 238, and being highly polished present little or no frictional resistance to the bristles sliding along them. The front portions of stationary sections 238 are sharpened or tapered as shown in Fig. 35 in such a way as to offer the least possible resistance to the bristles as they slide onto these tapered portions.

Also the parallel portions of the two separators are made as thin as consistent with the necessary strength for the same reason since the intention is to work the separators into the bristles with as little frictional resistance as possible and then open the knots to form the recesses by upward motion of the upper movable section 261 and downward motion of the lower movable section, after the knot has reached station 5.

The upper and lower bristle separators 238, 261 are mounted not only to provide for the opening movement of the upper and lower members 261 but so as to adjust these two members with respect to their stationary sections 238 for proper nesting, and also to permit adjustment of the vertical spacing between the two separator units so that the thickness of the middle layer of bristles can be changed as desired. Each of the upper and lower stationary separator sections 238 is supported by means of an integral centrally located shank portion 262 which is offset to the right as shown in Fig. 32 and mounted for adjustment with respect to the ferrules in a bracket member 263 (Fig. 35).

The mounting arrangement of shank portions 262 on brackets 263 is such as to provide for angular adjustment to bring member separator sections 261 into accurate parallelism with their stationary sections 238. Upper and lower brackets 263 are mounted for vertical sliding movement on an upright frame member for the duplex plugging mechanism and these brackets are individually vertically adjustable by means of two knurled screws 265, being clamped in adjusted position by means of clamping screws, one of which is shown at 265a (Fig. 32). This adjustment provides for variation in the vertical spacing between the two bristle separator units 238, 261 and consequently the thickness of the middle layer of bristles.

Brackets 263 accordingly also provide for the support of the movable separator sections 261. For this purpose each bracket 263 also supports a short shaft 266. The upper shaft has an upwardly extending actuating arm 267 clamped at its center and the lower shaft a downwardly extending actuating arm 268. Shafts 266 project to the left of bracket 263 (Fig. 35) and each terminates in a head 269.

Each head 269 has a horizontal aperture which clamps the stem of a swivel 270 (Fig. 32). This swivel has a vertical aperture and in turn clamps the stem of an adapter 271 which has a horizontal dove tail clamp within which is adjustably mounted the shank 272 of a movable separator section 261. It will be understood that these movable separator sections are supported in precisely the same manner, one on upper bracket 263 and the other on lower bracket 263. Moreover, the swivel mountings described provide for both angular and lateral adjustment of these sections.

The rocking of shafts 266 by means of actuating arms 267 and 268 causes the opening and closing movement of the separator sections 261. They are shown in closed position in Fig. 35 and in sectional views 38 and 39, 75 and 77, while being shown in open position in Fig. 33 and sectional views 37 and 76. Simultaneous movement of actuating arms 267 and 268 is brought about by a yoke member 273 which has an upper vertical channel to cooperate with a roller 274 mounted on the upper end of actuating arm 267 and a similar roller mounted on the lower end of actuating arm 268.

Yoke member 273 is supported for linear front and rear movement on the forward end of a rod 274a which slides in guides 275 which form part of a fixed bracket mounted on the machine frame. The rear end of rod 274a is connected by a link to an operating lever 276 which has a cam roll to cooperate with a cam 277 on cam shaft 7. This cam is preferably of the adjustable type so as to be able to vary the length of time during which the movable sections 261 are held open.

A stop collar 278 is fixed to rod 274a to limit the closing movement of this rod by engagement with guide 275. Yoke 273 is attached to the front end of rod 274a by means of a mounting block 279 on which the yoke is horizontally slidable. A knurled screw 280 produces an adjustment of this yoke to accurately position the separating sections 261, and the parts may be clamped in adjusted position by means of a clamp screw 281.

It is desirable to rock the upper movable separator section 261 to a greater extent than the lower separator section because, when the knot is spread into three bristle sections by the separators, the lowermost section should be opened no more than is required for insertion of the plug, while the upper section can be opened to a greater extent. The larger the movement the lower section receives, the greater the downward angle of the lowermost bristle layer and the greater the tendency for gravity to cause the plug to slide out of the recess.

The uppermost bristle layer, however, can be opened to form a larger recess than is required for the plug since the upper plug is supported by the middle bristle layer which is horizontal and there is no tendency for the upper plug to slide out. Accordingly, the upper actuating arm 267 is slotted as shown in Fig. 33 so as to provide for adjusting the position of upper roll 274 to give a greater opening movement to the upper bristle separator section 261.

Returning now to the construction of the plug inserting mechanism, plug magazine 260 is supported on frame member 264 previously referred to, and this member is in turn supported for vertical adjustment on an angled bracket 282, bracket 282 in turn being adjustably mounted on a base member 283 which is secured by means of bolts shown in Fig. 33 to a part of the machine frame. These bolts pass through a slot in the frame so as to provide front and rear adjustment of the entire plugging mechanism with respect to the ferrules, bristle control rails 163, and card bar 239 (Fig. 37).

Angled bracket 282 slides on base member 283 in a direction to adjust the plugging mechanism lengthwise of the ferrule guide rails 16, 17. The adjustment is made by screws 284, one on each side of the base member and the parts are then clamped together by means of two clamping screws 285. The vertical adjustment of frame member 264 is by means of a long vertical screw 286 (Fig. 34) and these parts are then secured by a single clamping screw 287 having a long stem so as to be accessible from the front of the apparatus.

Plug magazine 260 comprises a right side plate 288 (Figs. 35 and 42) and a left side plate 289. The front stack of plugs is guided at its right side between an upright angle member 290 which is fixed to side plate 288 and a rail 291 which is vertically adjustable on side plate 288. The left side of the front stack is similarly guided by an angle member 290' and a second rail 291', these two parts being correspondingly mounted on left side plate 289.

The rear stack of plugs is guided at its right side by a narrow upright bar 292 fixed to right plate 288 and an adjustable upright rail 293 which like rail 291 is also vertically adjustable. The left side of the rear stack is similarly guided by a rear fixed bar 292' and a front adjustable rail 293'. The angle members 290 and 290' terminate somewhat short of the top of the magazine and are flared both forward and sideways to facilitate inserting the front stack of plugs. The other guide members are also shaped at their upper ends to facilitate the loading of the rear stack of plugs as shown in Figs. 35 and 36.

The vertical adjustable rails 291 and 293 are mounted for such adjustment by means of short sections of dove tailed slideways as shown at 294 in Figs. 35 and 43 and in section in Fig. 42. The left hand adjustable rails 291' and 293' are similarly mounted as indicated at 294' in Fig. 36.

The reason for making these rails adjustable is that rails 291 and 291' support at their lower ends a pair of thin short horizontal guide fingers 295 which are constructed and arranged to support the lowermost plug of the front stack for horizontal feeding movement toward the upper recess which has been opened in the projecting bristle knot as shown, for example in Fig. 37. Such fingers are mounted, one at the bottom of each of the two rails 291 and 291' and they extend parallel with one another and have substantially horizontal upper surfaces which support the bottom plug near its opposite ends.

Mounted on the lower ends of each of the adjustable rails 293 and 293' are two somewhat similar guiding members 296 (Fig. 40). Each of these members, however, comprises a pair of guide fingers between which is a spring finger, the purpose of which will be described later.

Returning to the adjustment of rails 291 and 293, these rails are interconnected at their upper ends by means of a knurled adjusting screw 297 (Fig. 43) in such a way that by turning this screw relative vertical movement between the rails is produced. Rail 293 may be clamped in adjusted position by means of a clamping screw 298, and rail 291 by similar screw 299. By means of this arrangement, either rail may be adjusted in its position by using the other rail as a base, that is, by leaving it clamped to right side plate 288. In order to cause the left hand rails 291' and 293' to be adjusted simultaneously, a pair of horizontal pilot pins 300 and 301 are used to transmit the adjusting motion of the right hand rail to the left.

Plug magazine 260 is adjustable to accommodate plugs of different length as required by a change in the width of the brush unit, that is, with a 4" wide ferrule, the plugs will be longer than with a 3". For this reason, the left hand side of the magazine is made so as to be adjustable with respect to the right. Accordingly, the right hand or fixed side plate 288 of the magazine is mounted in fixed position on the upper part of frame member 264 by means of screws shown, for example, in Fig. 34. Also, rear bar 292 may be similarly secured to this frame member. The left hand side plate 289 and rear upright bar 292', however, are secured at their lower ends to a bracket member 302.

Bracket 302 is supported in two ways. First in order to produce the desired adjustment, it is arranged to slide on a horizontal stud 303 which is fixed in frame member 264 and projects to the left as shown in Fig. 35. A second support for bracket 302 is an extension 304 projecting to the left from frame member 264 in the rear of stud 303. This extension is slotted at 305 (Fig. 35) and through this slot passes an adjusting screw 306 (Fig. 32) which is tapped into bracket 302. Pilot pins 300 and 301 are fixed to the right adjustable rail members 291 and 293 and the left rail members 291' and 293' are apertured to slide on these pins.

The feeding of the plugs horizontally from the bottom of the magazine is effected by means of a rocking lever 307 which pivots at 308 at the bottom of frame member 264 (Fig. 35). This lever is actuated by means of an adjustable and yieldable link 309 which is pivoted to a lever 310 having a cam roll which co-acts with an actuating cam 311 mounted on cam shaft 7. The cam roll is held against the cam by means of a tension spring 312 connected to the upper end of lever 310.

At the upper end of the rocking feed lever 307 are the feeding devices for the right ends of both plugs as shown in Fig. 35. The feeding devices for the left ends of both plugs are mounted on a bracket 313 which is not only arranged to rock simultaneously with lever 307 but also to be adjustable simultaneously with the adjustment of the left side of the plug magazine whenever it is desired to change the length of the plugs being run.

For this purpose, bracket 313 is pivoted at the upper end of an arm 314. The lower end of arm 314 is forked as shown in Fig. 36 and mounted by means of a cross pivot pin 315 on a flat sided head 316 which is integral with the end of pivot shaft 308. By this construction, arm 314 is caused to rock by the rocking movement of this shaft which is imparted from lever 307. Also arm 314 can be adjusted laterally according to the length of the plugs to give the proper spacing to the feed fingers which will be described.

This adjustment is by means of a clamping screw 317 which operates through an elongated slot 318 in a right hand extension on this bracket to clamp it against the front face of rocking lever 307. Slot 318 is an arcuate slot formed on a radius equal to the length of arm 314 with its center to the right of pivot 315 so as to form the equivalent of a parallelogram linkage whereby the angular position of bracket 313 with respect to the base of the parallelogram is maintained constant at all positions of adjustment.

The feeding devices for feeding the plugs from the front and rear columns or stacks in magazine 260 include means for engaging the rear surface of each individual plug near its opposite ends so as to push the plugs squarely into the opened knot. Thus a pair of feed fingers 319 are mounted, one on the side face of rocking arm 307 and one on the corresponding face of bracket 313. In mounting these fingers provision is made both for vertical and rocking adjustment by means of screws operating in slots as shown in Figs. 33 and 34. The upper ends of front feed fingers 319 are bent inwardly to horizontal position (Fig. 35) in order to engage the plug which is to be fed. They are also sufficiently wide to hold up the stack of plugs (Fig. 38).

In the feeding of the plugs from the front stack, the bottom plug, and in fact the entire stack, rests upon the two horizontal guide fingers 295 (Fig. 39) secured to the lower ends of rails 291 and 291'. The bottom plug from the rear stack rests upon the upper horizontal surface of two angle brackets 320, the vertical portions of these brackets being mounted for vertical adjustment as shown in Fig. 35 by means of two screws 321 passing through slots in the brackets and being threaded into the front faces of frame member 264 and bracket 302 respectively. The bottom plugs are fed forward sliding on the surfaces of these two brackets as shown in Fig. 39 and in a manner to be described.

In feeding the bottom plug from the front stack, as feed fingers 319 move toward the left from the position shown in Fig. 39, the cam roll on lever 310 rides onto the front or lower portion of cam 311. The same cam action causes a lower plug to be fed from the rear stack by the mechanism to be described. However, the plug from the front stack is fed directly into the opened knot whereas, because of the greater distance of the rear stack from the knot, it is necessary to advance the plugs from this stack through a series of stations on bracket 320.

The action of the feeding mechanism, however, is to move two plugs simultaneously, an upper and a lower one, into the two recesses which have been opened in the knot by the bristle separators 238, 261.

These plugs are deposited in the knot with a double feeding motion, a primary impulse and a secondary impulse being given to the two plugs simultaneously. This is effected by the shape of cam 311 which is provided with a formation 322 at its upper or rear end to impart the secondary impulse.

When the cam roll on lever 310 rides onto the forward or lower portion of cam 311, fingers 319 feed the bottom plug from the front stack forward from the position shown in Fig. 75 to the position shown in Figs. 37 and 76 and the lower feeding mechanism advances a plug to the position immediately below this. The upper plug is pinched between the upper surface of guides 295 (Fig. 37) and a pair of spring pressed pivoted fingers 323 which engage the top of the plug and hold it in horizontal position during the dwell between the impulses. Similarly, the lower plug is held between the surfaces of brackets 320 at their outer ends and a pair of flat spring fingers 324 (Fig. 40) which are mounted between the double guiding members 296 for the upper surfaces of the lower plugs.

During this dwell of the plugs in the position shown in Fig. 37, the closing of movable sections 261 of the bristle separators against the stationary sections 238, as shown in Figs. 38 and 77, takes place. This permits the upper and lower bristle layers to close against the outer surfaces of the plugs, and immediately following this, the secondary impulse is imparted to the plugs by formation 322 of cam 311 causing the plugs to be fed forward, releasing them from the grip of the yielding fingers 323 and 324, and leaving the plugs supported in the bristle knot.

To insure that the plugs have been fully inserted in the knot, a knot aligner or "shutter" 325 (Fig. 45) having a rearwardly curved point and sharpened sloping upper edge portions, rises between the plug feeding devices and the plugs as shown in Figs. 39 and 78. Shutter 325 remains in this upper position until the knot has been advanced to the next ferrule station, station 6, where the semi-final patting takes place. The mechanism for operating this shutter will be described below.

If the plugs were fed into the opened knot without the dwell and partial closure of the bristles on the plugs as described, the plugs might roll over or turn cross-wise of the knot, but by stopping the plugs and holding them squarely in horizontal position by means of the yielding fingers 323 and 324, the tendency for the plugs to tumble or roll as they leave the ends of their respective supports 295 and 320 is offset.

To complete the description of the feeding of the plugs from the rear stack, these plugs are fed to the depositing position shown in Fig. 37 (primary impulse position) in three stages by means of right and left feed fingers 326 (Fig. 41). Each of these feed fingers slides back and forth in a substantially horizontal position. The rear end of right feed finger 326 is loosely pivoted at 327 adjacent the rear end of an L-shaped support 328 by which it is actuated by rocking lever 307, this support being vertical and angularly adjustable on this lever in a manner similar to feed fingers 319.

The forward end of feed finger 326 is biased upwardly by means of a coil spring 329 carried on the inside of L-shaped support 328. This spring biases the forward end of feed finger 326 upwardly against a stop (not shown) formed on support 328 (Fig. 41). The left feed finger 326 is similarly mounted on a similar L-shaped support 328 which is in turn similarly mounted on bracket 313 along side of the left feed finger 319 for the front stack plugs.

Each of feed fingers 326 is provided with a feeding shoulder 330 (Figs. 37 and 41) and these shoulders feed the plugs successively from the bottom of the rear stack, the upper horizontal surfaces of these fingers holding back the stack and the shoulders feeding the plugs to the first step or position. Fingers 326 also have two feeding teeth 331 which feed the plugs successively to the second stage or position. The tips of fingers 326 at their left ends serve to feed the plugs from the second to the third stage during the primary impulse movement and then into the opened knot during the secondary impulse movement as previously described.

It is necessary to retain the plugs in their positions at the first and second stages during the rearward movement of feed fingers 326. This is accomplished by two control members 332 which are yieldably mounted in recesses in the upper horizontal surfaces of each of the angled brackets 320 (Figs. 37, 38 and 39). Each of these control members is yieldably mounted on a pair of coil springs 333 which support it above the surface of its recess, the upward movement of the member being stopped by means of a small pin 334 which operates in an elongated slot at the center. Each control member 332 has a pair of teeth as shown in Fig. 37 which are arranged to engage the lower rear edges of the plugs at the first and second feeding stages and, during the backward movement of feed fingers 326, hold the plugs in the positions to which they have been fed.

On occasion the machine must be operated through several cycles for setting up and adjusting purposes. Provision is made to prevent the feed of the plugs from the magazine during such times by means of a shut off mechanism. This consists of a block 335 (Fig. 33) at the rear end of a horizontal rod having a handle 336 at its front end and provided with suitable locking means for locking it in either the outer position shown, or in an inner position. When handle 336 is in the position shown, the plugging mechanism will operate to feed plugs in the usual manner. By moving handle 336 back, plug 335 is placed beneath a suitable screw 337 adjustably mounted at the end of an arm 338 which is integral with lever 310, so as to prevent the cam roll on this lever from following cam 311, thereby stopping the feeding of the plugs.

Shutter 325 (Figs. 44 and 45) is mounted at the upper end of an upright arm 339 which is arranged to move vertically by a parallelogram linkage consisting of an actuating arm 340 and a link 341. Arm 340 is part of a bell crank pivoted at 342 on a bracket fixed to the machine frame and having a rear arm which carries a cam roller 343 arranged to be operated by a cam 344 on cam shaft 7. A tension spring 345 maintains the roll in engagement with the cam and actuates the bell crank lever to raise and lower arm 340 and shutter 325 in timed relation to the feeding of the plugs as previously described.

The upper edge and forward surface of shutter or plug aligning plate 325 is highly polished so as to operate against the butts of the bristles with as little friction as possible to prevent displacing the bristle knot. If desired, the shutter can be given a rapid vibratory movement to further facilitate the entrance of the plate between the bristle butts and plugs on one side and the plug feed fingers 319 and 326 on the other.

For this purpose the right end of link 341 may be pivoted to a short upright arm 346 pivoted at its lower end to the bracket which supports bell crank lever 342 and having a tension spring 347 arranged at its upper end. Mounted on the side of arm 346 is a roll 348 (Fig. 46), and arranged to strike this roll is a hammer finger 349, this finger being pivoted on a rotary carrier 350 having a stop shoulder 351 to limit the outward movement of hammer finger 349. Carrier 350 is mounted for rapid rotation on a shaft 352 which is driven by belt 353 from main shaft 5.

*Working knot with plugs into ferrule*

Up to the point of inserting the plugs in the bristle knot each ferrule consisted of a loose mass of bristles loosely fitting the ferrule, that is, occupying, for some brush specifications, only about half of the area of the ferrule, and the problem was, first to distribute this mass evenly throughout the width of the ferrule and then maintain such even distribution until after the insertion of the plugs.

From here on however the bristle knot with its plugs makes a snug fit in its ferrule and experience has shown that it is difficult, in one continuous patting movement, to push or pat such a knot until its butt end is flush with the rear end of the ferrule. Accordingly the present apparatus does this in two patting stages, the first at station 6, the semi-final patting station, and at station 7, the final patting station.

As the ferrule and knot are being fed out of plugging station 5 by the ferrule feed mechanism E (feed bars 13), plug aligner or shutter plate 325 aids in keeping the two plugs in position in the knot, and also a bank of needles 257, on the end of the card mechanism bar 239, which has been passed through the knot between the ferrule and the two plugs, moves with the ferrule feed bars to maintain the alignment of the knot with the ferrule during the travel to the semi-final patter station, station 6.

As soon as the ferrule with its knot comes to rest at station 6, the semi-final patter mechanism 354 (Figs. 47, 49 and 50) advances its patting plate 355 against the knot, pushes the plugs and knot a short distance into the ferrule and then dwells just short of touching card bar 239, this mechanism advancing the patter plate in primary and secondary movements.

During such primary movement, the tendency of the knot to flare at the sides is controlled to some extent by means of bristle gathering plate 258 which is also mounted on the end of card bar 239 (Fig. 30, sheet 17). Having confined the bristles through this primary patting, plate 258 then drops away from the bristles, together with needles 257, and card bar 239 returns to its right hand position, to rise and engage the next succeeding knot. Patter plate 355 immediately resumes its forward patting motion, the card mechanism being out of the way, and performs the secondary patting, advancing the rear of the knots and plugs to within approximately ⅝" from the end of the ferrule.

This completes the semi-final patting and the ferrule feed mechanism now advances the ferrule and knot with its plugs to station 7 which is the final patting station. The final patting mechanism is indicated generally by numeral 356 and has a patting plate 357.

The knot cannot be patted flush with the rear end of the ferrule at one patting operation both because of the difficulty in forcing bristles to move rapidly into a ferrule and because of the close timing of the various mechanisms throughout the entire apparatus. Pushing the bristle knot into the ferrule is a difficult operation because the bristle butts have a tendency to flare outwardly and when the patter plate contacts them they mushroom further outward with the result that many have a tendency to bend over rather than be driven into the ferrule.

To obviate this difficulty the final patting mechanism is provided with flare control mechanism which includes two movable flare control plates 358 and 359 (Figs. 48 and 49). These are made of sheet metal and have oppositely directed recesses each flanked with tooth-like members 360 and 361. These plates are constructed and arranged to embrace the protruding knot from below and above, with the tooth-like portions 360 overlapping one another at one side of the knot portions and 361 overlapping at the other side.

In the patting operation these flare control plates 358 and 359 which, at first are at some distance behind the ferrule and directly below and above the plugs as shown in Fig. 52, close about the knot as shown in Fig. 53. As soon as these plates have closed patter plate 357 contacts the rear end of the knot, and patting of the knot into the ferrule commences.

As the patter plate moves forward however the two flare control plates also move forward at the same rate so as to impose neither a pushing nor a retarding frictional action on the knot, and keeping always about 1/8" ahead of the patter plate. When the flare control plates are about to touch the rear end of the ferrule, they fly outwardly to the position shown in Fig. 54 so as to permit the patter plate to push the rear surface of knot and plugs flush with the ferrule and then start its backward movement.

It will be understood that the flare control plates 358 and 359 are changed for each ferrule width which is to be run on the machine. It will be also understood that these plates do not grip the bristle knot tightly between them but control the bristles with a delicate pressure which is obtained by accurate adjustment of the plates and also by means of sensitive spring mountings as will be described.

In addition to controlling the flare of the bristle knot, plates 358 and 359 exert an aligning action on the two plugs. As inserted by the plugging mechanism one plug lies directly over the other, but occasionally, one plug may be shifted a little to the left or right, which would produce a poor brush. The cooperation of the flare control plates mounted directly over and beneath the respective plugs and the patter plate coming against the end of the knot just after the flare control plates have embraced it, has been found to bring both plugs into alignment, one over the other.

Referring now to Figs. 48-51 for the details of the patting mechanisms and the flare control mechanism, the two patting mechanisms 354 and 356 are of the vibrating and parallel-motion type as described in my prior application, and in this respect are like the transfer patter mechanism 147 (sheet 12). Patter mechanisms 354 and 356 function in substantially the same manner, but they differ in structure somewhat because the patter mechanism parts available at the time these patters were added to the machine were somewhat different.

It is important to employ parallel motion patters for working the knots and plugs into the ferrules because otherwise the top horizontal edge of the knot would be contacted first by the patter plate, the remaining portions being contacted later. This would be detrimental, cause misalignment of the bristles in the knot which would be carried through to the finished brush unit and would be especially disadvantageous when making shallow hold brushes.

The supporting and vibration producing shaft for both patter mechanisms is indicated at 362 and is driven at the desired rotative speed by means of an endless belt 363 from main shaft 5. This shaft is supported in bearings mounted on a T-shaped support 368, the upright member of which is secured to the base of the machine. Cams on this shaft impart the rapidly vibrating motion to the respective patter plates 355 and 357 through the supporting arms and linkages shown in the present drawings and described in detail in my prior application.

The cams for operating the two patters into and out of contact with the brush knots, and for actuating the bristle flare control are all arranged on cam shaft 7 and are as follows: Cam 364 operates the flare control mechanism back and forth as will be described presently. Cam 365 opens and closes the flare control plates 358 and 359. Cam 366 operates the semi-final patter at station 6, and cam 367 the final patter at station 7.

Cam 366 operates the semi-final patter mechanism 354 through a cam roll 369 mounted on the upper end of a rock arm 370 which is pivoted at its lower end on a stationary shaft 371 fixed to the machine frame. A link 372 connects the upper end of arm 370 with patter mechanism 354 to swing patter plate 355 from a withdrawn position (not shown) but somewhat similar to the position of transfer patter mechanism 147 shown in Fig. 21, to bring the patter plate into engagement with the rear end of the knot and plugs at station 6 and move them to within about 5/8 of an inch of the rear of the ferrule as previously explained.

The final patting mechanism 356 is moved forward from a similar withdrawn position into patting engagement with the knot and plugs at station 7 by cam 367 through a link 373 which is connected to the upper end of an actuating lever also pivoted on shaft 371 and having a cam roll 375 which engages cam 367. This cam roll as well as cam roll 369 is held against their respective cams by the tension springs shown in Fig. 47. The forward end of link 373 is pivoted to patter mechanism 356 by a connection which is adjustable in an arcuate slot 376, and the center of this slot is at the pivot center of the opposite end of link 373 with arm 374.

Consequently, the length of stroke of patter plate 357 can be adjusted without changing the timing of the patter operation. Adjustment in this stroke is necessary with the patter at station 7 since this patter plate 357 moves the rear of the knot flush with the rear of the ferrule and must be adjusted to the precise position of the ferrule.

It is important to have final patter plate 357 engage the entire surface of the knot when it first comes in contact with it, as shown for example in Fig. 53, and for this reason, a universal mounting of this patter plate on the patting mechanism 356 is provided. This is shown in Figs. 48 and 48b. Plate 357 is carried at the front end of a link 377 which forms the horizontal member of the parallelogram linkage producing the parallel motion of the patter plate.

Link 377 is pivoted in a clevis 378 having a vertical rod-like stem 379 fitting into a vertical aperture in the lower end of the front vertical arm of the parallelogram linkage. Accordingly, link 377 can be pivoted about this stem to adjust the face of plate 357 so as to make continuous contact from side to side of the knot, that is, along the horizontal dimension of the plate, which may then be clamped in this position by tightening screw 380.

To make the adjustment just described means that the rear end of link 377 must be permitted to be adjusted sideways in a horizontal plane and accordingly rod 381 which constitutes the rear upright member of the parallelogram linkage is connected to a stationary bracket 382 (Fig. 48b) by means of a spherical or universal connection 383, the lower end of rod 381 being connected to link 377 by a similar connection 348a.

Coming now to the flare control mechanism associated with final patting mechanism 356, the flare control plates 358 and 359 are supported by mechanism to be described on a crosswise plate-like carriage 384 which is mounted in edgewise position for sliding movement from front to rear of the apparatus in four grooved rollers 385. Two of these engage the lower edge of the plate and two the upper (Fig. 48), and these rollers are mounted on and project from the vertical face of an upright plate-like bracket 386 mounted on the base of the machine.

A pair of rigid parallel horizontal arms 387 having hubs 388 are mounted for rocking movement in a vertical plane on two stud shafts projecting from the face of carriage 384 and near the rear edge thereof, these studs being mounted in the same vertical plane. The flare control plates 358 and 359 are carried at the front ends of the respective horizontal arms 387, each plate having a resilient or yielding mounting thereon.

This resilient mounting comprises a lever 389 which is supported for extremely limited pivoting movement on a horizontal pivot bolt 390 (Fig. 48a). Bolt 390 is a shouldered bolt mounted for adjustment in a longitudinal slot adjacent the outer end of lower arm 387 to provide proper positioning of plate 358 with respect to the ferrule and patter plate 357. Flare control plate 358 has a dove-tail connection with a support 391 by which the plate can be adjusted longitudinally of the machine or widthwise of the ferrule. Support 391 in turn has a dove-tail connection with the end of lever 389 for a vertical adjustment of the plate, the parts being clamped together by a screw 392. Thus plate 358 can be adjusted in all three directions in order to obtain the proper operative location.

The flare control plate is held against the knot by the yielding force of a tension spring 393, the lower end of which is connected to a pin projecting from a bracket 394 on lower arm 387, its upper end being connected to a pin projecting from the rear portion of lever 389. This spring draws the rear end of the lever downwardly against a horizontal ledge formed at the bottom of a stop plate 395 fixed to one face of arm 387.

The mounting of upper flare control plate 359 is the same as just described except for the fact that its biasing spring 396 is arranged to move the supporting lever in the opposite direction.

The two pivoted arms 387 are rocked about their pivotal supports to open and close the flare control plates by means of an arm 397 which projects downwardly and to the right of the lower hub 388 (Fig. 48). A cam roll 398 operates on the surface of cam 365. The rocking movement thus imparted to the lower arm 387 is transmitted to the upper arm 387 by means of two equal length short arms 399, one projecting upwardly from lower hub 388 and the other projecting downwardly from upper hub 388.

These are interconnected by a horizontal pin carrying a roller 400 which operates in a short vertical slot 401 formed in the end of upper arm 399. In order to maintain cam roll 398 in contact with its cam a tension spring 402 is connected at one end to a pin projecting from the side of carriage 384 and at the other end to the upper short arm 399, thus taking up all lost motion.

It was mentioned that as soon as flare control plates 358 and 359 are closed so as to surround the bristle knot, patting plate 357 commences to pat the knot forward into the ferrule, and that the flare control plates then commence to move forward towards the ferrule, keeping always the same distance from the patter plate.

Since this motion necessitates the forward movement of plate-like carriage 384, it is necessary to arrange the contour of the flare plate opening and closing cam 365 to take into account the fact that the forward movement of this carriage tends to move cam roll 398 away from this cam. The carriage is moved back and forth by means of an upright lever 403 having its hub pivoted on stud shaft 371 and carrying at its upper end a roller 404 which projects from the side of the lever to engage a short vertical slot 405 in plate-like carriage 384. Lever 403 has a lateral projection on the side of which is a cam roll 406 to operate on the surface of cam 364 (Figs. 48 and 51) which moves the carriage 384 on its forward stroke, the carriage being returned by means of a tension spring 407.

At both the semi-final and final patting stations, the ferrules are maintained in position to resist the thrust of the patter plates 355 and 357 by means of fixed ferrule retainer fingers 408. These are mounted in pairs at each station, one to engage the upper and one the lower edge of the ferrule. Each pair is adjustably supported upon a bracket structure 409, these bracket structures being mounted on channel rail 19.

Knot pulling mechanism

On advancing from the final patter station to station 8, the butt end of the knot is freely exposed, and, if desired, an automatic clipping mechanism 410 (Fig. 74, Sheet 30) may be employed to trim off occasional projecting bristles.

Upon arriving at pulling station 9, the flat end of the knot projecting from the front of the ferrule is grasped by two movable pulling jaws 411 of pulling mechanism J and pulled forward in the ferrule to its final position. As previously mentioned, if a standard hold brush is being run on the machine, the bristle knot will be pulled until the front faces of the plugs are more or less in line with the front edge of the ferrule and the rear end of the bristle knot substantially even with the rear of the plugs (Fig. 80, Sheet 30).

In the event that the machine is running shallow hold brushes, after the knot has been pulled forward to the standard hold position, a pair of plug hold-back needles 412 are inserted suddenly in the knot in front of the ferrule to hold back the plugs (Figs. 61 and 63). The pulling jaws are then advanced a further short distance thereby advancing the rear or butt end of the knot to the position as shown, for example, in Fig. 81 (Sheet 30), where the bristle knot will be telescoped only about $\frac{1}{16}$ of an inch within the ferrule, and the plugs will project inward beyond the end of the knot. The holdback needles 412 can be set to locate the front faces of the plugs as desired with respect to the front edge of the ferrule.

With brushes as large as 4", the force required to pull the knot and plugs through the ferrule is very much greater than with brushes of the order of 2½" size, and in producing the shallow hold brushes, the knot must be pulled with great accuracy, that is, so that none of the bristles will be advanced substantially beyond the position shown in Fig. 81, for otherwise the hold on the bristles by the ferrule would be reduced to such a point that such bristles would fall out during the handling necessary for inspection etc. before the application of the cementing compound.

To overcome these difficulties, the jaws of the pulling mechanism of the present apparatus are constructed and arranged so that both have opening and closing movement and also so that they close simultaneously on the horizontal center line of the brush unit. This reduces and equalizes any tendency of the squeezing action on the bristles to shift or pull the bristles on one side (lower or upper) of the ferrule to a greater extent than the other.

On account of the greater resistance to the movement of a 4" knot and plugs through the ferrule there have been associated with the pulling mechanism two ferrule retainers in the form of narrow fingers 413 which are automatically moved into engagement with the ferrule at its two narrow sides, one to engage the "lock seam" of the ferrule and the other to engage the ferrule opposite the lock seam (Figs. 63, and 65-68).

Because of the necessity of locating the butt end of the knot with great accuracy and evenness in the ferrule on account of the shallow hold, there is also associated with pulling mechanism J a ferrule register or plate 414 which is arranged to move against the rear edge of the ferrule just before pulling commences to move the front edge of the ferrule into register with the ferrule retaining fingers 413, thus squaring the ferrule and placing its axis in alignment with the direction of pull. This straightens up any ferrule which, on occasion, might become displaced as it is advanced to the pulling station 9.

Further in the interst of obtaining accurate positioning of the butt end of the knot in the ferrule, the present apparatus makes provision for acting upon the ferrule at the pulling station in such a manner as to reduce to some extent the frictional contact of the inside flat surfaces of the ferrule with the bristle knot. This is accomplished by means of two ferrule compressors 415 in the form of vertical rods which are caused to engage the rounded sides of the ferrule substantially as the pulling of the knot commences. These compressors squeeze the ferrule from side to side thereby producing an outward bowing or expanding of the flat sides of the ferrule, and temporarily reducing the friction on the knot.

This pulling mechanism will now be described, referring to Figs. 56-62. The frame for this mechanism is secured at its base to the main machine frame and is fitted with four flanged rolls 417 mounted on studs projecting from the side of the frame. These rolls guide the upper and lower edges of a cross-head 418 which is a thick rigid metal plate, edgewise or vertically mounted. Cross-head 418 carries two projecting parallel stud shafts 419, one vertically above the other which serve as fulcrums for arms 420 which carry the pulling jaws 411 at their front ends.

These jaws are clamped in adjustable position on the ends of these arms and include replaceable inserts 421 (Fig. 60) of resilient friction material such as rubber to directly engage the respective surfaces of the bristle knot. The jaws are interdependently adjustable to suit any brush thickness.

Cross-head 418 together with its jaws, arms and jaw parts is reciprocated horizontally by means of an upstanding cam lever 422 having an elongated arcuate slot, and fulcrumed at its lower end on a pivot shaft 423 mounted on the machine frame. Lever 422 carries a cam roll 424 which operates in a closed or slotted cam 425 keyed to main cam shaft 7. A connecting rod 426 is pivoted at 427 to crosshead 418, and at its opposite end to a pivot pin which is adjustable in an arcuate slot 429, previously referred to formed in the upper portion of lever 422.

The arrangement is such that when the parts are in their extreme rear position as shown in Fig. 56, pivot pin 428 can be adjusted in slot 429 without affecting the position of cross-head 418, when the length of the brush stroke is to be altered for different length bristle knots. By this arrangement it is impossible for jaws 411 to be actuated accidentally into engagement with channel 19 or ferrule feed bars 13, which would seriously damage the machine.

Pulling jaws 420 are biased to open position by means of two compression springs 430 which are based on a lug 431 projecting from puller frame 416. The jaws are closed by the operation of a slot type cam 432 on cam shaft 7, a cam roll 433 which cooperates with this cam being mounted on the side of a cam lever 434 which is also pivoted on shaft 423. The upper end of this lever is connected by means of a push rod 435 to one arm of a bell crank lever 436, this lever being fixed to the left end of a short shaft 437 (Fig. 58) which is fulcrumed in the lowermost portion of puller frame 416. The opposite end of shaft 437 has fixed to it an arm 438 carrying at its upper end a flanged roll 439 which engages and operates the lower jaw arm 420.

To operate the upper jaw 420 a stiff rigid push bar 440 shaped somewhat like an enormous banana is pivoted at its lower end to the other arm of bell crank lever 436. At its upper end banana shaped bar 440 is pivoted to an arm 441 fixed to one end of a shaft 442 which is fulcrumed at the upper end of an upward and forward extension of puller frame 416. Fixed on shaft 442 on the other side of the fulcrum bearing is a tandem lever 443 having downward and upward extending arms.

Fulcrumed at the bottom of the lower arm is a secondary lever 444 carrying at its forward end a second flanged roll 445 which engages and operates the upper puller jaw arm 420. A strong tension spring 446 is connected between the rear end of lever 444 and a lateral extension on the upper arm of tandem lever 443. By means of this construction upward puller jaw arm 420 is closed under yielding pressure, and if the closing pressure becomes excessive spring 446 will yield before any damage occurs.

In the operation of the pulling mechanism J, after the ferrule and its knot have come to rest at station 9, the puller jaws 411, which are at their rearmost position which is the position of Fig. 56 close simultaneously by the operation of cam 432 and clamp the projecting flag end portion of the knot. Thereupon cross-head 418 is moved forward the required distance by the operation of cam 425 which completes the pulling of the knot and positions it in the ferrule as shown in either Fig. 80 or 81, depending upon whether it is desired to make standard-hold or shallow-hold brushes. Jaws 411 then open and cross-head 418 returns to the rear to commence the next cycle. The length of pulling stroke is adjusted to produce the desired hold by setting adjustable pivot pin 428 at the proper position in arcuate slot 429.

The timing of the plug hold-back, ferrule retainers and ferrule expanding mechanism with respect to the pulling mechanism will be set forth later on.

*Plug hold-back, automatic ferrule retainers and ferrule expanding mechanism at knot pulling station*

Coming to the mechanism for operating the plug-holdback needles 412, this mechanism is also illustrated in Figs. 56–58 with details shown in Fig. 63. Mounted above puller frame 416 is a super-structure 447 which (Fig. 57) is supported by a downward extension 448 of one of its vertical members, such extension being secured by bolts or otherwise to one side of puller frame 416.

Superstructure 447 at its uppermost part serves to support fulcrum bearings for a horizontal rock shaft 449. On the outer ends of this shaft are fixed two equal length parallel horizontal arms 450. At the front ends of these arms are pivoted two vertical downward extending parallel links 451 which are joined together at their lower portions by an outwardly bent tie-bar 452.

Just below this tie-bar each of links 451 has pivoted to it a rearwardly extending horizontal rod 453. These two rods are arranged parallel with the respective levers 450, at the top, and also are of equal length therewith. They are pivoted at their rear ends to the lower part of superstructure 447. This linkage forms two identical parallelograms so that when rocking motion is imparted to shaft 449 the vertical links 451 will move together up or down.

Attached to the lower extremity of each of links 451 is a needle clamp 454 (Fig. 63). Hold-back needles 412 are, in cross-section, relatively thin in the direction of the width of the ferrule (Figs. 63 and 74) but are relatively wide in their other dimension, as indicated in Figs. 60–62, so as to have the required strength to resist the movement of the plugs. The needles at their upper ends are bent upwardly and toward the front to join horizontal supporting shank portions 455, these shanks being adjustably secured in the respective needle clamps 454.

Horizontal shaft 449 is rocked in order to raise and lower the parallelogram linkages and needles 412, by means of an operating arm 456 fixed to this shaft and connected at its rear end by means of a link 457 with a short arm 458 fixed on a shaft 459 fulcrumed at the base of the machine. A cam lever 460 also fixed to shaft 459 is operated by engagement with the plug hold-back cam 461 on cam shaft 7.

A long tension spring 462, the upper end of which is connected to one of the horizontal arms 450 and the other end of which is connected to the base of the machine, serves to urge cam lever 460 into contact with its cam 461 and to move the hold-back needles 412 downwardly into the bristle knot with a quick or sudden motion at the proper time. The lower position of the needles is determined by means of an adjustable stop-screw 463, also on one of the horizontal arms 450 with its lower end engaging a stop member fixed to superstructure 447.

The ferrule register plate 414, previously referred to (Fig. 64) is mounted at the lower end of a supporting shank 464 which, near its upper end has a rearwardly projecting vertical plate 465 which is pivotally and adjustably mounted on a flat extension 466 by means of the two screws and slot shown in Fig. 56. Extension 466 is secured by welding or otherwise to the lower end of a vertical rod 467, this rod being adjustably supported near its upper end by means of a clamp 468, this clamp being a part of a sleeve 469 which rocks loosely on shaft 442 and which at its outer end has an actuating arm 470. Arm 470 is connected through a link 471 with a cam lever 472 having a cam roll 473 cooperating with the face of cam 474 on cam shaft 7. A tension spring 475 connected to the end of lever 472 maintains the roll 473 in contact with the cam.

Assuming that the machine is running shallow-hold brushes, the hold-back needle mechanism maintains needles 412 in raised position out of the brush knot at all times except during the last $\frac{3}{16}$ of an inch pull of the jaws 411. At the instant that the plugs reach substantially the front edge of the ferrule as shown in Fig. 61, the quick drop-off on cam 461 releases cam lever 460 and spring 462 snaps the needles downward into the bristles. Thus needles 412 are caused to pierce the knot suddenly while the pulling is still in progress. After the pulling has been completed, needles 412 are lifted out of the knot by the operation of the cam.

The entrance of the needles into the knot is so fast that an air check cylinder 476 is preferably provided to cushion the end of their movement. Inasmuch as the tendency for the plugs to be pulled forward beyond the end of the ferrule is considerable a stationary slotted brace member 477 is fixed to the front surface of channel 19. Needles 412 descend through the slots in this member and the edges of these slots maintain the needles in close proximity to the ferrule during the pulling.

By withholding the hold-back needles from penetrating the knot until just prior to the final $\frac{3}{16}$ of an inch pull the needles are prevented from forming objectionable splits or parts in the knot which would tend to injure the brushes.

As previously mentioned, accurate positioning of the ferrule prior to pulling is desirable, and in running shallow-hold brushes, it is necessary. Consequently just prior to the commencement of the pulling motion of cross-head 418 carrying the pulling jaws, the ferrule register mechanism swings the ferrule register plate 414 forward, and regardless of the angular position in which the ferrule may arrive at station 9, the contact of register 414 with the rear edge of the ferrule squares it against the ferrule retainer fingers 413 so that during the pulling operation the ferrule is properly positioned.

The timing of this mechanism will be mentioned below:

The ferrule holding or retaining devices heretofore employed at the knot pulling station have been unsatisfactory because they depend upon a "finger rail" hold on the flat top and bottom edges of the ferrule. It is extremely difficult to set such devices so as to take full advantage of the metal thickness without disturbing the bristles as the brush unit enters and leaves the pulling station, and if they are adjusted to avoid such disturbance, the ferrule is apt to slip past them.

Ferrule retaining fingers 413 of the present invention, however, are so located as to engage the sides of the ferrule and substantially on the horizontal center line of the ferrule and knot so that there is little tendency to disturb the knot. Moreover the fingers swing automatically into and out of retaining position and consequently cannot interfere with the bristles as the brush enters or leaves the station.

The ferrule retainer mechanism is supported on two brackets 478 projecting horizontally outward from channel 19 at ferrule station 9. At the outer ends of these brackets are a right and left bearing member 479 which support a horizontal actuating rock shaft 480. Clamped to this shaft are right and left pivot blocks 481, and in the lower ends of these blocks are two vertical apertures in which are engaged the fulcrum pins of right and left bell crank members 482 which pivot with a generally horizontal movement. One arm of each bell crank 482 is parallel with channel 19 and both are interconnected by means of an adjustable screw 483 and a tension spring 484, so that actuation of the left bell crank will operate the right crank.

The other arm of each bell crank 482 extends inwardly toward channel 19 and such arm of right bell crank 482 directly supports the right ferrule retaining finger 413, this finger being mounted for vertical adjustment on the inner end of this arm by a screw and slot connection shown in Fig. 67. The left ferrule retainer finger 413 is supported on an adapter bracket 485 which in turn is fixed to the arm of left bell crank 482, the purpose of the adapter bracket mounting being to afford both vertical and horizontal adjustment of this finger so as to accommodate different width ferrules.

Bell cranks 482 are biased away from the ferrule, i. e. toward the dotted line position shown in Fig. 66, by means of a torsion spring 486 having a winding collar at its upper end. Such movement is limited by an L-shaped extension 492 on left bell crank 482 (Figs. 65 to 68), striking a stop screw 495 positioned on one leg of a forked downward projection 494 at the side of left pivot block 481. A similar screw 493 limits movement in the opposite direction.

Fulcrumed on a pin 487 projecting from left bearing block 479 is an actuating lever 488. The lower portion of this lever is curved as shown in Fig. 68, to clear the left end of shaft 480, and terminates in a fork 489. This fork engages a barrel shaped or spherical roller 490 which turns on a horizontal pin 491 projecting to the right at the top of L-shaped extension 492 (Fig. 65). It should be said that the weight of the parts tends to rock shaft 480 counterclockwise, referring to Fig. 68, which lowers fingers 413 to the dotted position in this figure.

When actuating lever 488 is moved from the dotted position at Fig. 68 to the full line position by a cam as will be described, fork 489 on its lower end first moves fingers 413 up from the dotted position to the full-line position of Fig. 68 and then moves the fingers in from the dotted position of Fig. 66 to the full line position to engage the ferrule. During the first part of this motion, the force of torsion spring 486 keeps L-shaped extension 492 against stop screw 495 and left pivot block 481 is swung towards the left Fig. 68. Right pivot block 481 is carried with it, the two being interconnected by rock shaft 480.

This movement continues until an adjustable stop screw 496 mounted at the end of a horizontal projection 497 on left pivot block 481 engages the bottom of left bracket 478. After this contact the continued motion of actuating lever 488 causes left bell crank 482 to turn about its vertical pivot, against the force of torsion spring 486, the right bell crank 482 swinging with it because of the interconnection described comprising screw 483 and spring 484. This simultaneous swinging movement of the two bell cranks carries the ferrule fingers 413 inward from the dotted position of Fig. 66 to the full line position.

Actuating lever 488 is operated by means of a link 498 which is connected at its rear end to the upper end of a cam lever 499 (Fig. 71, Sheet 29). This lever carries a cam roll which cooperates with a cam 500 on cam shaft 7. When the cam roll rides onto the high part of this cam, link 498 is moved to the left in both Figs. 67 and 71 thereby compressing a spring 501 which in turn moves lever 488.

The retainer finger mechanism is thus operated by a yielding connection with cam 500 and after these fingers engage the ferrule, rod 498 slides in an aperture of the universal connection 502 at the upper end of lever 488. This spring compression is transferred through the link to the sides of the ferrule and has a tendency to compress the ferrule in somewhat the same manner as the ferrule compressor mechanism which is about to be described.

It is to be noted that actuating screw 483 in right hand bell crank 482 may be placed in either of several tapped holes so as to locate this screw approximately mid-way between the fulcrums in the two bell cranks, when changing from one width of brush to another.

The timing of this retainer mechanism will be referred to later in connection with that of the ferrule expanding mechanism.

In spite of the fact that the present pulling mechanism is of sturdy construction and grips the bristle knot with a very considerable pressure, it has been found that some bristles are apt to slip through the rubber inserts of the pulling jaws, resulting in a faulty pull. Such faulty pulls, however, have been eliminated by the introduction of the ferrule expanding mechanism to squeeze or compress the sides of the ferrule thereby causing the flat ferrule surfaces to bow or expand outwardly, one up and the other down, and releasing the tight frictional pack of the knot and plugs in the ferrule.

This mechanism is shown in Figs. 69–73. The two ferrule compressors 415 are in the form of rod-like plungers having curved lower ends to fit the curved sides of the ferrule. These are mounted in parts secured to channel member 19 in such a manner as to first drop down alongside of the ferrule, and then the lower end of the left hand plunger is swung slightly to the right thereby squeezing the ferrule against the right hand compressor 415 and causing the required bowing action.

This squeezing takes place prior to the pulling of the knot and continues until this operation is finished, whereupon the squeezing is released and the plungers are raised to allow the brush unit to move to the next station and a new brush unit to move into the pulling station 9.

Right hand compressing plunger 415 slides vertically in an aperture in a guiding block 503 which is adjustably mounted on the web of channel 19 by means of the screw and slot arrangement shown in Fig. 69. The left hand compressing plunger 415 is guided in a pivoted head 504 which has a trunnion bearing 505 (Fig. 72) in a block 506, which like block 503 is adjustably mounted on channel 19. By means of these adjustable mountings the two compressors can be located to suit different width ferrules. The motion of right hand compressor 415 is merely up and down. Left hand compressor however, after being lowered, is rotated by imparting a slight rocking movement to head 504 on its trunnion bearing 505, as will be presently described.

The two compressing plungers 415 are given their vertical sliding movement by means of two actuating levers 507 pivoted in suitable brackets secured to the top of channel 19. These levers are each provided with adjustable stop screws 508 to limit and position the lower ends of the compressors appropriately with respect to the sides of the ferrule. The connections between compressors 415 and levers 507 are in the form of pins 509 mounted on the inner ends of the levers and engaging bell-mouth apertures 510 in the upper ends of the plungers (Fig. 73).

Actuating levers 507 are operated by cam 500 on cam shaft 7, the same cam which operates the ferrule relative mechanism. This cam coacts with a cam roll on lever 499, this lever being keyed to rock shaft 511 journaled in brackets on the machine base (Fig. 70). A lever 512 is keyed to the right end of shaft 511. Links 513 and 514 connected respectively to the upper end of this lever and to cam lever 499, are connected at their front ends to bell cranks 515 which are in turn connected with the outer ends of the right and left actuating levers 507.

These latter connections are by means of pins 516 projecting from the respective ends of the horizontal levers of bell cranks 515, and swivel blocks 517 which are pivoted at the ends of the respective levers 507. The connections between links 513 and 514 and the respective vertical arms of bell cranks 515 are by means of compression springs 518 operating between collars fixed to the respective links, and swivel blocks 519 which are pivoted to the sides of bell cranks 515. With this arrangement when the ferrule compressors 415 have reached the limit of their downward movement as determined by stop screws 508, any further movement of links 513 compresses springs 518, the ends of these links sliding in the swivel blocks 519.

The turning of pivoted head 504 on its trunnion 505 in order to move the lower end of left hand compressor 415 and cause the squeezing or compressing of the ferrule, is accomplished by means of an L-shaped lever which is made up of an elongated and extremely crooked horizontal leg 520, and a short vertical leg 521, the lower end of this leg being pinned to trunnion 505 (Fig. 72). The extreme left end of the crooked horizontal leg 520 of this L-shaped lever is given vertical movement for the compressing operation by means of a bell crank lever 522, this lever having a pin 523 at the end of its forward arm which bears against the upper surface of lever 520. This leg is raised to release the compression by means of a tension spring 524.

The other arm of bell crank 522 is operatively connected with cam 525 on cam shaft 7 through a link 526 and a cam lever 527 which has a cam roll engaging the cam. The connection between link 526 and bell crank 522 is by means of a swivel block 528 through which the upper end of the link slides, and a compression spring 529 operating against this block. An adjustable stop screw 530 (Fig. 69) is arranged to limit the downward movement of leg 520 of the L-shaped lever 520—521 so as to adjust the amount of compression exerted by the left hand compressor 415 against the ferrule.

Inasmuch as the compressing of the sides of the ferrule causes an expansion in the thickness of the ferrule, the section of the upper ferrule guide rail 17, at pulling station 9, is removed and in its place a formed plate spring 531 is employed. This is suitably mounted at the right of station 9 and extends across the upper surface of the ferrule at this station as shown in Fig. 69. While holding the ferrule in position and counter-acting the overbalanced weight of the flag end of the knot, the spring permits the vertical expansion caused by the compression.

The operation and timing of the plug holdback operation, ferrule retainer operating and ferrule expanding mechanisms in relation to the pulling mechanism is as follows when making shallow hold brush units.

As soon as the ferrule and its knot have come to rest at pulling station 9, the ferrule being beneath flat spring 531, the ferrule compressing plungers 415 drop alongside of the ferrule. Simultaneously ferrule retaining fingers 413 move into position straddling the ferrule and the secondary motion of these fingers closes them against the ferrule and causes the finger lips to extend in front of the ferrule at its opposite sides. Immediately ferrule register 414 contacts the rear of the ferrule and squares it against the retaining fingers.

Just after such registration takes place, pivoted head 504, which carries the left compressor plunger 415, pivots on its trunnion 505 swinging the plunger to compress the ferrule against the right plunger 415 thereby expanding the sides of the ferrule, spring 531 yielding to permit such expansion. Puller jaws 411 close and clamp the bristles during this compressing operation and, as soon as the ferrule is squeezed, the jaws commence their outward pulling movement.

Just as the front of the plugs is about even with the front edge of the ferrule, hold-back needles 412 drop, the pulling jaws not hesitating in their pull. Ferrule compressors 415 release the ferrule before the puller jaws start to open at the end of the pull because the release of the compression causes the ferrule to return to its normal shape to clamp and hold the bristle knot.

At about the end of the release of the ferrule compression, the ferrule register plate moves back, retaining fingers 413 move outwardly and then drop to their lower and open position, and holdback needles 412 rise out of the knot. The puller jaws 411 then open and return to their inward position adjacent the pulling station ready to commence the next cycle on the succeeding knot.

As mentioned previously, on the next movement of ferrule feed bars 13, the brush unit at station 9 is advanced to station 10 which is the discharge station where the row of brush units is acted upon by the final combing mechanism K (Figs. 1C and 2C).

If the machine is making standard hold brushes, the plug hold-back needles 412 are rendered inoperative and the stroke of the pulling mechanism is shortened so as to leave the knot extending further into the ferrule.

The general operation of the complete apparatus has already been given following the description of the figures of the drawings, and the detailed timing and operation of the various mechanisms such as the automatic bristle feeding and bristle conveyor operating mechanism B, the knot packer mechanism C, knot transfer mechanism F, bristle distributing and station-to-station knot advancing mechanism G, plug inserting mechanism H, patters I and pulling mechanism J, with its automatic plug hold-back, ferrule register, retainer and compressor mechanisms, have been given in connection with the description of these several features or elements of the machine.

The present invention has been described in all its details as embodied in one particular apparatus, and it will be understood that the invention is not limited to the particular embodiment illustrated in the drawings and set forth in the description, but that the scope of the invention includes such modifications or changes as come within the terms of the appended claims.

I claim:

1. In a brush machine, a knot forming device, means for partially spreading out the knot to suit the width of the ferrule, means for inserting the partially spread knot in a ferrule so that the butt portion projects from the rear of the ferrule, mechanism for opening said butt portion and inserting plug means therein, means intermittently operated for feeding a succession of said ferrules and projecting knots from station-to-station of a series of stations to said plug inserting mechanism, clamping means for alternately engaging and releasing a plurality of said projecting knots, and operating mechanism for said clamping means to cause said means to engage said knots to complete the spreading of the knots to produce uniform distribution of the bristles in the respective ferrules and move with the knots from station-to-station to keep the distributed knots in alignment with the ferrules until the insertion of the plug means, said operating mechanism causing said clamping means to release said knots at the end of each feeding movement.

2. A brush machine as set forth in claim 1 in which the means for partially spreading out the knot is incorporated in the knot forming device.

3. A brush machine as set forth in claim 1 in which the means for partially spreading out the knot is in part incorporated in the knot forming device and in part in the means for inserting the partially spread knot in the ferrule.

4. A brush machine as set forth in claim 1 in which patting mechanism is arranged at one or more of the stations of the series of stations to even up the butt end of the knot and advance it in the ferrule and wherein means to support the overhanging knots beyond the control rails and to control their side flare during patting is arranged to cooperate with the clamping means.

5. A brush machine as set forth in claim 1 in which the knot forming device is constructed and arranged to form knots of a predetermined width for a ferrule substantially wider than said width, and means is provided for feeding bristles to said device in a layer of substantially the same depth of the said knot width.

6. In a brush machine, a knot forming device constructed and arranged to form knots having bristle volume to fill a ferrule substantially wider than the width of the formed knot, means for feeding bristles to said device, means for inserting the knot in a ferrule so that the butt portion projects from the rear of the ferrule, mechanism for opening said butt portion and inserting plug means therein, means intermittently operated for feeding a succession of said ferrules and projecting knots from station-to-station of a series of stations to said plug inserting mechanism, and clamping means for alternately engaging and releasing a plurality of said projecting knots, and operating mechanism for said clamping means to cause said means to engage said knots to complete the spreading of the knots to produce uniform distribution of the bristles in the respective ferrules and move with the knots from station-to-station to keep the distributed knots in alignment with the ferrules until the insertion of the plug means, said operating mechanism causing said clamping means to release said knots at the end of each feeding movement.

7. A brush machine as set forth in claim 6 in which patting mechanism is arranged at one or more of the stations of the series to even up the butt end of the knot and advance it in the ferrule wherein means to support the overhanging knots beyond the control rails and to control their side flare during patting is arranged to cooperate with the clamping means.

8. In a brush machine, a knot forming device, means for partially spreading out the knot, means for inserting the partially spread knot in a ferrule so that the butt portion projects from the rear of the ferrule, mechanism for opening said butt portion and inserting plug means therein, means for feeding a succession of said ferrules and projecting knots from station-to-station of a series of stations to said plug inserting mechanism, clamping means for alternately engaging and releasing a plurality of said projecting knots to complete the spreading of the knots and then maintain them in spread condition until the insertion of the plugging means therein, said means being timed to engage said knots as they move from station-to-station, means for feeding said ferrules and projecting knots from station-to-station of a second series of stations after the insertion of the plugging means, means at each of two adjacent stations of said second series for patting said projecting knot with its plugging means flush with the rear end of said ferrule in two stages, means associated with said second patting means for embracing the knot adjacent thereto to control the flare of the knot to facilitate its entrance into the ferrule, and means at a subsequent station for pulling the knot forward to position it in the ferrule.

9. In a brush machine, means for feeding brush units from station-to-station of a series of stations, each of said units including a ferrule and a bristle knot projecting therefrom with plugging means in said knot, means at one of said stations for patting said projecting knot with its plugging means into said ferrule, means associated with said patting means for embracing the knot adjacent said patting means to control the flare of the knot to facilitate its entrance into the ferrule, and means at a subsequent station for pulling the knot forward to position it in the ferrule.

10. In a brush machine, means for feeding brush units from station-to-station of a series of stations, each of said units including a ferrule and a bristle knot projecting therefrom with plugging means in said knot, means at each of two adjacent stations of said series for patting said projecting knot with its plugging means flush with the rear end of said ferrule in two stages, means associated with said second patting means for embracing the knot adjacent thereto to control the flare of the knot to facilitate its entrance into the ferrule, and means at a subsequent station for pulling the knot forward to position it in the ferrule.

11. In a brush machine, means for feeding brush units from station-to-station of a series of stations, each of said units including a ferrule and a bristle knot projecting therefrom with plugging means in said knot, means at each of two adjacent stations of said series for patting said projecting knot with its plugging means flush with the rear end of said ferrule in two stages, means associated with said second patting means for embracing the knot adjacent thereto to control the flare of the knot to facilitate its entrance into the ferrule, and knot pulling mechanism to complete the brush unit including a ferrule expander to reduce the bristle friction in the ferrule as the knot is being pulled therethrough.

12. In a brush machine, a knot forming device, ferrule feeding means for feeding ferrules from station-to-station throughout a plurality of successive stations, mechanism for transferring the bristle knots successively from the knot forming device to the ferrule at the first of said stations leaving the butt portions projecting, mechanism incorporated in the knot forming device for expanding the width of the knot substantially as it is delivered to the transfer mechanism to partially spread the bristles to the ferrule width, clamping means for alternately engaging and releasing a plurality of said projecting knots to complete the spreading of the knots and then maintain them in spread condition until the insertion of the plugging means therein, said clamping means being timed to engage said knots as they move from station-to-station, mechanism for forming a recess in the butt end of the bristle knot at one of said stations, mechanism for depositing plug means within said recess, said recess-forming mechanism thereafter closing the bristles upon said plugs, means for moving the knot butts and plug means flush with the rear edge of said ferrule, and knot pulling mechanism to draw the knot into final position in the ferrule.

13. A brush machine as set forth in claim 12 in which the knot pulling mechanism includes ferrule expanding means to reduce bristle friction in the ferrule as the knot is drawn therethrough to final position.

14. A brush machine as set forth in claim 13 in which the knot forming device is constructed and arranged to form 2" wide knots for a ferrule substantially wider than 2", and means is provided for feeding bristles to said device in a substantially 2" layer.

15. In a brush machine, a knot forming device, ferrule feeding means for feeding ferrules from station-to-station throughout a plurality of successive stations, mechanism for transferring the bristle knots successively from the knot forming device to the ferrule at the first of said stations leaving the butt portions projecting, mechanism incorporated in the knot forming device for expanding the width of the knot substantially as it is delivered to the transfer mechanism to partially spread the bristles to the ferrule width, clamping means for alternately engaging and releasing a plurality of said projecting knots to complete the spreading of the knots and then maintain them in spread condition until the insertion of the plugging means therein, said clamping means being timed to engage said knots as they move from station-to-station, mechanism for forming a recess in the butt end of the bristle knot at one of said stations, mechanism for depositing plug means within said recess, said recess forming mechanism thereafter closing the bristles upon said plugs, a patter at each of two adjacent succeeding stations, for pushing the bristle butts and plugs flush with the rear edge of said ferrule in two stages, the second of said patters having flare control mechanism associated therewith, and knot pulling mechanism to draw the knot into final position in the ferrule.

16. A brush machine as set forth in claim 15 in which the knot pulling mechanism includes ferrule expanding means to reduce bristle friction in the ferrule as the knot is drawn therethrough to final position.

17. A brush machine as set forth in claim 15 in which the knot forming device is constructed and arranged to form 2" wide knots for a ferrule substantially wider than 2" and means is provided for feeding bristles to said device in a substantially 2" layer.

18. In a brush machine, a knot forming device, ferrule feeding means for feeding ferrules from station-to-station throughout a plurality of successive stations, mechanism for transferring the bristle knots successively from the knot forming device to the ferrule at the first of said stations leaving the butt portions projecting, mechanism incorporated in the knot forming device for expanding the width of the knot substantially as it is delivered to the transfer mechanism to partially spread the bristles to the ferrule width, clamping means for alternately engaging and releasing a plurality of said projecting knots to complete the spreading of the knots and then maintain them in spread condition until the insertion of the plugging means therein, said clamping means being timed to engage said knots as they move from station to station, mechanism for forming a recess in the butt end of the bristle knot at one of said stations, mechanism for depositing plug means within said recess, said recess forming mechanism thereafter closing the bristles upon said plug means, means for moving the knot butts and plugs flush with the rear edge of said ferrule, knot pulling mechanism including a ferrule expander to reduce the bristle friction in the ferrule as the knot is being pulled therethrough to complete the brush unit, automatic ferrule retainers constructed and arranged to engage the front edge of the ferrule substantially centrally of the opposite sides thereof to maintain the position of the ferrule during said pulling operation and an automatic ferrule register device for squaring the ferrule against said retainers prior to the pulling operation to cause the bristles to be pulled evenly from side to side of the ferrule.

19. A brush machine as set forth in claim 18 in which plug hold-back mechanism is associated with the knot pulling mechanism, the plug holdback mechanism having means movable into the knot projecting from the front edge of the ferrule at a predetermined point in the pulling operation to maintain the plugs even with said edge as the pulling operation is continued.

20. A brush machine as set forth in claim 18 in which the knot forming device is constructed and arranged to form 2" wide knots for a ferrule substantially wider than 2", and means is provided for feeding bristles to said device in a substantially 2" layer.

21. In a brush machine, a knot forming device, ferrule feeding means for feeding ferrules from station to station throughout a plurality of successive stations, mechanism for transferring the bristle knots successively from the knot forming device to the ferrule at the first of said stations leaving the butt portions projecting, mechanism incorporated in the knot forming device for expanding the width of the knot substantially as it is delivered to the transfer mechanism to partially spread the bristles to the ferrule width, clamping means for alternately engaging and releasing a plurality of said projecting knots to complete the spreading of the knots and then maintain them in spread condition until the insertion of the plugging means therein, said clamping means being timed to engage said knots as they move from station to station, mechanism for forming two superposed recesses in the end of the bristle knot at one of said stations, mechanism for simultaneously depositing two plugs, one within each of said recesses, said recess forming mechanism thereafter closing the bristles upon said plugs, means for moving the knot butts and plugs flush with the rear edge of said ferrule, knot pulling mechanism including a ferrule expander to reduce the bristle friction in the ferrule as the knot is being pulled therethrough to complete the brush unit, automatic ferrule retainers constructed and arranged to engage the front edge of the ferrule substantially centrally of the opposite sides thereof to maintain the position of the ferrule during said pulling operation, an automatic ferrule register device for squaring the ferrule against said retainers prior to the pulling operation to cause the bristles to be pulled evenly from side to side of the ferrule.

22. A brush machine as set forth in claim 21 in which plug hold-back mechanism is associated with the knot pulling mechanism, the plug holdback mechanism having means movable into the knot projecting from the front edge of the ferrule at a predetermined point in the pulling operation to maintain the plugs even with said edge as the pulling operation is continued.

23. In a brush machine, a knot forming device, ferrule feeding means for feeding ferrules from station to station throughout a plurality of successive stations, mechanism for transferring the bristle knots successively from the knot forming device to the ferrule at the first of said stations leaving the butt portions projecting, mechanism incorporated in the knot forming device for expanding the width of the knot substantially as it is delivered to the transfer mechanism to partially spread the bristles to the ferrule width, clamping means for alternately engaging and releasing a plurality of said projecting knots to complete the spreading of the knots and then maintain them in spread condition until the insertion of the plugging means therein, said clamping means being timed to engage said knots as they move from station to station, mechanism for forming two superposed recesses in the end of the bristle knot at one of said stations, mechanism for simultaneously depositing two plugs, one within each of said recesses, said recess forming mechanism thereafter closing the bristles upon said plugs, a patter at each of two adjacent succeeding stations for pushing the bristle butts and plugs flush with the rear edge of said ferrule in two stages, the second of said patters having flare control mechanism associated therewith, knot pulling mechanism including a ferrule expander to reduce the bristle friction in the ferrule as the knot is being pulled therethrough to complete the brush unit, automatic ferrule retainers constructed and arranged to engage the front edge of the ferrule substantially centrally of the opposite sides thereof to maintain the position of the ferrule during said pulling operation, an automatic ferrule register device for squaring the ferrule against said retainers prior to the pulling operation to cause the bristles to be pulled evenly from side to side of the ferrule and plug holdback means movable into the projecting knot at the front edge of the ferrule at a predetermined point in the pulling operation to maintain the plugs even with said edge.

24. A brush machine as set forth in claim 23 in which the knot forming device is constructed and arranged to form 2" wide knots for a ferrule substantially wider than 2", and means is provided for feeding bristles to said device in a substantially 2" layer.

25. In a brush machine, a knot forming device, means for partially spreading the knot of bristles to suit the ferrule, ferrule feeding means for feeding ferrules from station to station throughout a plurality of successive stations, mechanism for transferring the bristle knots successively from the knot forming device to the ferrule at the first of said stations leaving the butt portions projecting, a pair of longitudinally and vertically movable control rails, said rails being edgewise mounted one above and one below the knots projecting from the ferrules at a plurality of said stations, operating mechanism for said rails to cause them to close on said knots to complete the spreading of the bristles in the respective ferrules, said operating mechanism thereafter causing said closed rails to move with the ferrule feeding means to keep the spread knots in alignment with the ferrules until the insertion of the plug means in the knot, said operating mechanism opening said rails after said feeding movement and then returning the rails to starting position, mechanism for opening said projecting butt portions of successive knots, mechanism for inserting plug means therein, means for moving the knot butts and plug means flush with the rear edge of the ferrule, and knot pulling mechanism to draw the knot into final position in the ferrule.

26. A brush machine as set forth in claim 25 in which the means for partially spreading out the knot is incorporated in the knot forming device.

27. A brush machine as set forth in claim 25 in which the means for partially spreading the knot is in part incorporated in the knot forming device and in part in the transfer mechanism.

28. A brush machine as set forth in claim 25 in which patting mechanism is arranged adjacent the movable control rails to even up the butt end of the knot and advance it in the ferrule, and wherein means to support the overhanging knots beyond the control rails and to control their side flare during such patting is arranged to cooperate with said control rails.

29. A brush machine as set forth in claim 25 in which the means for moving the knot butts and plug means flush with the rear edge of the ferrule includes a patting mechanism having means associated therewith for embracing the knot to control the flare of the knot and facilitate its entrance into the ferrule.

30. A brush machine as set forth in claim 25 in which the means for moving the knot butts and plug means flush with the rear edge of the ferrule comprises a patter at each of two adjacent stations after the plug inserting mechanism, the second patter having associated therewith means for embracing the knot to control the flare of the knot and facilitate entrance into the ferrule.

31. A brush machine as set forth in claim 25 in which the mechanism for opening the bristle knot is arranged to form two superposed recesses therein, and the mechanism for inserting the plug means is arranged to simultaneously deposit two plugs, one with each of said recesses, and said recess forming mechanism being constructed and arranged thereafter to close the bristles upon the plugs to retain them in the knot.

32. A brush machine as set forth in claim 25 in which the knot pulling mechanism includes ferrule expanding means to reduce bristle friction in the ferrule as the knot is drawn therethrough to final position.

33. A brush machine as set forth in claim 25 in which the knot pulling mechanism comprises ferrule expanding means to reduce the bristle friction in the ferrule as the knot is being pulled therethrough to complete the brush unit, automatic ferrule retaining means constructed and arranged to engage the front edge of the ferrule substantially centrally of the opposite sides thereof to maintain the position of the ferrule during said pulling operation and an automatic ferrule register device for squaring the ferrule against said retainers prior to the pulling operation to cause the bristles to be pulled evenly from side to side of the ferrule.

34. A brush machine as set forth in claim 33 in which plug hold-back mechanism is associated with the knot pulling mechanism, the plug holdback mechanism having means movable into the knot projecting from the front edge of the ferrule at a predetermined point in the pulling operation to maintain the plug means even with said edge as the pulling operation is continued.

35. In a brush machine, a knot forming device, ferrule feeding means for feeding ferrules from station-to-station throughout a plurality of successive stations, mechanism for transferring the bristle knots successively from the knot forming device to the ferrule at the first of said stations leaving the butt portions projecting, means for patrially spreading out the knot of bristles, to suit the ferrule, a pair of longitudinally and vertically movable control rails, said rails being edgewise mounted one above and one below the knots projecting from the ferrules at a plurality of said stations, operating mechanism for said rails to cause them to close on said knots to complete the spreading of the bristles in the respective ferrules, said operating mechanism thereafter causing said closed rails to move with the ferrule feeding means to keep the spread knots in alignment with the ferrules, until the insertion of the plug means in the knot, said operating mechanism opening said rails after said feeding movement and then returning the rails to starting position, mechanism for opening said projecting butt portions of successive knots, mechanism for inserting plug means therein, means for moving the knot butts and plug means flush with the rear edge of the ferrule, and knot pulling mechanism to draw the knot into final position in the ferrule.

36. A brush machine as set forth in claim 35 in which the knot forming device is constructed and arranged to form 2" wide knots for a ferrule substantially wider than 2", and means is provided for feeding bristles to said device in a substantially 2" layer.

37. In a brush machine, a knot forming device, ferrule feeding means for feeding ferrules from station to station throughout a plurality of successive stations, mechanism for transferring the bristle knots successively from the knot forming device to the ferrule at the first of said stations, leaving the butt portions projecting, mechanism incorporated in the knot forming device for expanding the width of the knot substantially as it is delivered to the transfer mechanism to partially spread the bristles to the ferrule width, a pair of longitudinally and vertically movable control rails, said rails being edgewise mounted one above and one below the knots projecting from the ferrules at a plurality of said stations, operating mechanism for said rails to cause them to close on said knots to complete the spreading of the bristles in the respective ferrules, said operating mechanism thereafter causing said closed rails to move with the ferrule feeding means to keep the spread knots in alignment with the ferrules, said operating mechanism opening said rails after said feeding movement and means for limiting the side flare of the spread bristle knots caused by the closing of said rails, mechanism for forming two superposed recesses in the end of the bristle knot at one of said stations, mechanism for simultaneously depositing two plugs, one within each of said recesses, said recess forming mechanism thereafter closing the bristles upon said plugs, a patter at each of two adjacent succeeding stations for pushing the bristle butts and plugs flush with the rear edge of said ferrule in two stages, the second of said patters having flare control mechanism associated therewith and knot pulling mechanism including ferrule expanding means so as to reduce the bristle friction in the ferrule as the knot is being pulled therethrough the complete the brush unit, automatic ferrule retaining means constructed and arranged to engage the front edge of the ferrule substantially centrally of the opposite sides thereof to maintain the position of the ferrule during said pulling operation and an automatic ferrule register device for squaring the ferrule against said retainers prior to the pulling operation to cause the bristles to be pulled evenly from side to side of the ferrule.

38. A brush machine as set forth in claim 37 in which plug hold-back mechanism is associated with the knot pulling mechanism, the plug holdback mechanism having means movable into the knot projecting from the front edge of the ferrule at a predetermined point in the pulling operation to maintain the plug means even with said edge as the pulling operation is continued.

39. A brush machine as set forth in claim 37 in which the knot forming device is constructed and arranged to form 2" wide knots for a ferrule substantially wider than 2", and means is provided for feeding bristles to said device in a substantially 2" layer.

40. In a brush machine, a knot forming device including a bristle feed box, a feed finger operating in said box to feed bristles therethrough to said knot forming device, an actuating member for said feed finger, the feeding movement of said finger being arrested when said finger meets a predetermined resistance from the bristle mass, a bristle conveyor for moving bristles into said feed box, intermittent driving means for said conveyor including a driving member which is continuously reciprocated with a uniform stroke and a member intermittently driven thereby, means for inter-engaging said members to cause a step movement of said conveyor, and mechanism to control said inter-engaging means, said mechanism being responsive to the extent of movement of said feed finger.

41. A brush machine as set forth in claim 40 in which the driven member comprises a ratchet wheel operatively connected to drive the bristle conveyor, whereas the driving member comprises a continuously oscillating rock arm, the interengaging means being a pawl pivoted on such rock arm, said pawl being biased against the teeth of the ratchet wheel, and wherein the control mechanism includes a shiftable cam arranged to move the pawl into and out of contact with the ratchet wheel teeth.

42. A brush machine as set forth in claim 40 in which the mechanism to control the interengaging means is connected to the feed finger actuating member so as to position the control mechanism according to the feeding movement of the feed finger at each feeding movement thereof.

43. A brush machine as set forth in claim 41 in which the control mechanism comprises a shield member pivoted on the same center as the ratchet wheel, said shield member having an arcuate edge surface terminating in a cam at its forward end, said cam and arcuate edge of the shield member engaging said pawl of lift and hold the pawl out of engagement with the ratchet wheel teeth, and in which there is an operative connection between said shield member and feed finger actuating member so as to angularly position the shield member according to the movement of the feed finger at each feeding movement thereof.

44. In a brush machine, a bristle knot forming unit comprising a knot carrier having a bristle holding pocket with an expansible side wall, means to operate said carrier to move said pocket alternately between a bristle receiving position and a bristle discharge position, a device to receive the knot from said pocket, said device being wider than said pocket and being closable on a portion of said knot projecting from the pocket to frictionally support the knot, means for closing said device, means for expanding said wall to allow the bristles to spread out in said device to a substantially greater width than the width of said pocket, and means to reset said expansible wall prior to the return of the pocket to receiving position.

45. In a brush machine as set forth in claim 44 wherein a compressing member is associated with the knot carrier, said member being constructed and arranged to compress the knot in the bristle holding pocket in the direction of the expansible side wall of such pocket.

46. A brush machine as set forth in claim 44 in which the means for expanding the side wall oprates just before the device to receive the knot is completely closed.

47. A brush machine as set forth in claim 44 in which the expansible side wall is hingeably mounted on the knot carrier, said wall being biased by a spring to open position, a latch member being also mounted on the carrier to hold said wall in closed position, wherein also the means for expanding the side wall comprises a device for tripping said latch.

48. In a brush machine, a bristle knot forming unit having a bristle holding pocket, means to support a ferrule, and knot transfer mechanism to move a bristle knot from said pocket and insert it in the ferrule, said mechanism including a pair of jaws relatively movable to engage and release said knot, and a pair of bristle camming teeth, one mounted on each of said jaws and each tooth extending crosswise of the knot between the sides of the jaws to shift the bristles of the knot laterally thereof as the jaws close upon the knot.

49. In a brush machine, a knot carrier having a bristle holding pocket, said carrier being movable from a bristle receiving position where said pocket is vertical to a knot discharging position, means for feeding bristles into said pocket at the receiving position, in a layer of substantially the same thickness as the entrance to the pocket means for removing the knot from said pocket at the discharge position and inserting it in a ferrule, said pocket having a side wall undercut to provide a pocket body substantially wider than its entrance so that the knot is of sufficient size for a ferrule which is substantially wider than the thickness of said bristle feed layer.

50. In a brush machine, reciprocating ferrule feeding means for feeding ferrules from station-to-station throughout a series of successive stations, mechanism for inserting bristle knots successively into the ferrule at the first of said stations leaving the butt portions projecting, a pair of control rails disposed one above and one below the knots projecting from the ferrules at a plurality of said stations, and reciprocating operating mechanism for said control rails comprising a carriage mounted for movement parallel with said series of stations, means on said carriage to support said rails for opening and closing movement to clamp the projecting bristle knots, means for closing said rails before a feeding movement of said ferrule feeding means and for opening them at the end of said movement, means for moving said carriage in unison with said feeding means during each feeding movement thereof, and means for returning said carriage with a different motion from that of the ferrule feeding means.

51. A brush machine as set forth in claim 50 in which the lower bristle control rail is provided with bristle camming teeth for spreading out the bristles in the knots.

52. A brush machine as set forth in claim 50 in which the upper bristle control rail is provided with thin plate members mounted thereon for yielding resilient vertical movement to individually clamp respective bristle knots.

53. A brush machine as set forth in claim 50 in which a horizontally movable bar is supported adjacent the lower control rail, said bar having thereon means to support the overhanging bristle knots, and gathering devices on said bar to limit the side flare of certain of said knots.

54. In a brush machine, reciprocating ferrule feeding means for feeding ferrules from station-to-station throughout a series of successive stations, mechanism for inserting bristle knots successively into the ferrule at the first of said stations leaving the butt portions projecting, a pair of control rails disposed one above and one below the knots projecting from the ferrules at a plurality of said stations, and reciprocating operating mechanism for said control rails comprising a carriage mounted for movement parallel with said series of stations, means on said carriage to support said rails for opening and closing movement to clamp the projecting bristle knots, means for closing said rails before a feeding movment of said ferrule feeding means and for opening them at the end of said movement, means for causing said carriage to dwell at the end of said movement, said feeding means commencing its return stroke, and means independent of said feeding means for returning said carriage.

55. A brush machine as set forth in claim 53 in which the means for returning the carriage causes it to overtake the ferrule feeding means.

56. In a brush machine, brush unit feeding means for feeding brush units from station-to-station of a series of successive stations, said units each comprising a ferrule having the butt portion of a bristle knot projecting therefrom, and mechanism for opening a recess in said knot for the insertion of plug means therein, said mechanism comprising a stationary blade-like device having a vertically movable section, said device being tapered at its front end to facilitate entrance into the bristle knot during a feeding movement of said feeding means, and means operable while each brush unit is in stationary position at one of said stations to actuate said movable section so as to open a plug-receiving recess in the knot.

57. A brush machine as set forth in claim 56 in which the recess opening mechanism comprises a pair of stationary blade-like devices each having its vertically movable section, said devices being mounted in superposed relation, and the movable section of the upper device moving upwardly and that of the lower device moving downwardly, and means for simultaneously actuating said movable sections to open two superposed plug-receiving recesses in the knot.

58. In a brush machine, brush unit feeding means for feeding brush units from station-to-station of a series of successive stations, said units each comprising a ferrule having the butt portion of a bristle knot projecting therefrom, an expansible knot for opening device at one of said stations, the projecting knots passing onto said device as they approach said station, means operative while the brush unit is in stationary position at said station for expanding said device to open a recess in the projecting knot, and mechanism at said station for depositing plug means in said recess.

59. In a brush machine, brush unit feeding means for feeding brush units from station-to-station of a series of successive stations, said units each comprising a ferrule having the butt portion of a bristle knot projecting therefrom, mechanism at one of said stations for opening two superposed recesses in the bristle knot at such station, and plug inserting mechanism comprising a magazine for holding two upright stacks of preformed plugs, horizontal guiding devices at the bottom of said magazine for supporting two plugs in vertically spaced relation, and mechanism for simultaneously feeding a plug from the bottom of each stack along said guides and into the respective recesses in said knot.

60. In a brush machine, means for feeding brush units from station-to-station throughout a series of successive stations, each of said units consisting of a ferrule and a bristle knot projecting therefrom, a patter mechanism at one of said stations for pushing the knot into the ferrule, bristle gathering devices for limiting the flare of said knot during patting, a support for said devices, and operating mechanism for said support to cause said gathering devices to engage the sides of the knot substantially as patting commences and to cause them to withdraw out of the path of the patter as the patting is continued.

61. In a brush machine, means for feeding brush units from station-to-station throughout a series of successive stations, each of said units consisting of a ferrule and a projecting knot with plug means inserted therein, a patter mechanism for pushing the knot and plug means into the ferrule, a pair of cooperating flare control plates movable to embrace the knot, and operating mechanism for moving said plates into knot embracing position substantially as the patting commences, and to move the plates forward in unison with the patter mechanism.

62. A brush machine as set forth in claims 61 in which the flare control plate operating mechanism removes the plates to permit the patter to push the rear of the plug flush with the ferrule.

63. In a brush machine, means for feeding brush units from station-to-station throughout a series of successive stations, each of said units consisting of a ferrule and a bristle knot with inserted plugs having its flag end projecting from the front of the ferrule, mechanism at one of said stations for pulling the flag end of the knot to draw the knot to final position in the ferrule, said mechanism including mechanism for compressing the sides of the ferrule during said pulling to expand the faces of the ferrule and reduce bristle friction therein.

64. A brush machine as set forth in claim 63 in which automatic ferrule retaining devices are provided for engaging the front of the ferrule.

65. A brush machine as set forth in claim 64 in which an automatic ferrule register device is provided to square the ferrule against the ferrule retaining devices, a pair of plug hold-back needles being movable vertically into the bristle knot substantially at the front edge of the ferrule, and mechanism being provided to move said needles into said position during the pulling movement and substantially as the front faces of the plugs reach the front edge of the ferrule.

66. In a brush machine, means for feeding brush units from station-to-station throughout a series of successive stations, each of said units consisting of a ferrule and a bristle knot with inserted plugs having its flag end projecting from the front of the ferrule, mechanism at one of said stations for pulling the flag end of the knot to draw the knot to final position in the ferrule, said mechanism comprising upper and lower jaws movable to clampingly engage the projecting knot, and mechanism for causing said jaws to close on said knot substantially equidistant from the center line of the ferrule so as to reduce and equalize shifting of the bristles in the ferrule during the clamping of the knot.

67. In a brush machine means for feeding brush units from station-to-station of a series of successive stations, said units each comprising a ferrule having the butt portion of a bristle knot projecting therefrom, and mechanism for opening a recess in said knot for the insertion of plug means therein, said mechanism comprising a pair of stationary blade-like devices each having a vertically movable section and being tapered at its front end to facilitate entrance into the bristle knot during a feeding movement of said feeding means, said devices being mounted in superposed relation and vertically spaced from one another to allow the entrance of bristles between said devices, the movable section of said upper device being arranged to move upwardly and that of the lower device downwardly, and means operable while each brush unit is in stationary position at one of said stations for simultaneously actuating said movable sections to open two superposed spaced plug receiving recesses in the knot.

68. A brush machine as set forth in claim 58 in which the plug depositing mechanism comprises a horizontal guiding device deposited at the level of the recess opened in the knot, a resiliently mounted finger acting on the top of the plug above the end of said guiding device to support the plug in precise horizontal position, and a plug feeding mechanism which operates with a dwell, first moving the plug to the end of said guiding device and thereafter pushing it in precise horizontal position into said recess.

69. A brush machine as set forth in claim 58 in which the expansible knot opening device is arranged to open two superposed recesses in the knot, and two plugs are deposited by the depositing mechanism, one in each of said recesses, the expansible devices thereupon being contracted to allow the knot to close upon the plugs, and substantially simultaneously with such contraction a plug aligner is moved to engage the rear surface of said plugs to place them parallel to one another.

70. A brush machine as set forth in claim 59 in which the horizontal guiding devices of the plug magazine are each provided with cooperating resiliently mounted fingers acting on the tops of the respective plugs above the ends of the respective guides to support each plug precisely in horizontal position, and in which the plug feeding mechanism operates with a dwell, first moving the plugs to the ends of their guides and thereafter pushing the plugs in precise horizontal position into the recesses of the knot.

71. A brush machine as set forth in claim 61 in which the flare control plates are arranged one above and one below the knot, each plate having a pair of tooth-like portions opposite the sides of the knot, and wherein the operating mechanism moves the plates into engagement respectively with the upper and lower surfaces of the knot with the tooth-like portions overlapping one another and embracing the sides of the knot.

MELVIN J. FIRST.

REFERENCES CITED

The following references are of record in the file of this patent:

UNITED STATES PATENTS

| Number | Name | Date |
|---|---|---|
| 2,033,258 | Simms | Mar. 10, 1936 |
| 2,513,016 | First | June 27, 1950 |